United States Patent
Lee et al.

(10) Patent No.: US 10,009,618 B2
(45) Date of Patent: Jun. 26, 2018

(54) VIDEO ENCODING METHOD AND APPARATUS THEREFOR USING MODIFICATION VECTOR INDUCEMENT, VIDEO DECODING METHOD AND APPARATUS THEREFOR

(71) Applicant: SAMSUNG ELECTRONICS CO., LTD., Suwon-si (KR)

(72) Inventors: Jin-young Lee, Hwaseong-si (KR); Ho-cheon Wey, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 202 days.

(21) Appl. No.: 14/904,508

(22) PCT Filed: Jul. 14, 2014

(86) PCT No.: PCT/KR2014/006333
§ 371 (c)(1),
(2) Date: Jan. 12, 2016

(87) PCT Pub. No.: WO2015/005750
PCT Pub. Date: Jan. 15, 2015

(65) Prior Publication Data
US 2016/0173900 A1    Jun. 16, 2016

Related U.S. Application Data

(60) Provisional application No. 61/845,591, filed on Jul. 12, 2013.

(51) Int. Cl.
*H04N 7/12* (2006.01)
*G06K 9/36* (2006.01)
(Continued)

(52) U.S. Cl.
CPC .......... *H04N 19/44* (2014.11); *H04N 19/109* (2014.11); *H04N 19/136* (2014.11);
(Continued)

(58) Field of Classification Search
CPC ...... H04N 19/44; H04N 19/52; H04N 19/109; H04N 19/136; H04N 19/176; H04N 19/597
See application file for complete search history.

(56) References Cited

U.S. PATENT DOCUMENTS

| 8,311,118 B2 | 11/2012 | Lee et al. |
| 9,131,243 B2 | 9/2015 | Yamori |

(Continued)

FOREIGN PATENT DOCUMENTS

| JP | 2012-182616 A | 9/2012 |
| JP | 2013-106312 A | 5/2013 |

(Continued)

OTHER PUBLICATIONS

Communication dated Sep. 27, 2016, issued by the Korean Intellectual Property Office in counterpart Korean Application No. 10-2015-7011649.

(Continued)

*Primary Examiner* — Tsion B Owens
(74) *Attorney, Agent, or Firm* — Sughrue Mion, PLLC

(57) ABSTRACT

A video decoding method according to an embodiment may include: determining whether a neighboring block adjacent to a current block has a direction vector indicating a specific location in an image; when the neighboring block does not have the direction vector, generating a disparity vector of a neighboring block indicating a specific location in an image having a different view from a view of an image of the neighboring block.

15 Claims, 42 Drawing Sheets

(51) Int. Cl.
| | |
|---|---|
| *H04N 19/44* | (2014.01) |
| *H04N 19/597* | (2014.01) |
| *H04N 19/52* | (2014.01) |
| *H04N 19/109* | (2014.01) |
| *H04N 19/136* | (2014.01) |
| *H04N 19/176* | (2014.01) |

(52) U.S. Cl.
CPC ........... *H04N 19/176* (2014.11); *H04N 19/52* (2014.11); *H04N 19/597* (2014.11)

(56) References Cited

U.S. PATENT DOCUMENTS

| | | | |
|---|---|---|---|
| 9,319,683 B2* | 4/2016 | Lim | H04N 19/176 |
| 9,521,406 B1* | 12/2016 | Lim | H04N 19/52 |
| 9,648,329 B2* | 5/2017 | Lim | H04N 19/52 |
| 2009/0010323 A1 | 1/2009 | Su et al. | |
| 2009/0279608 A1 | 11/2009 | Jeon et al. | |
| 2012/0189060 A1 | 7/2012 | Lee et al. | |
| 2013/0114707 A1* | 5/2013 | Seregin | H04N 19/11 375/240.12 |
| 2013/0230105 A1 | 9/2013 | Song et al. | |
| 2014/0153648 A1 | 6/2014 | Lee et al. | |
| 2014/0376626 A1* | 12/2014 | Lee | H04N 19/196 375/240.12 |
| 2015/0208087 A1* | 7/2015 | Park | H04N 19/56 375/240.16 |
| 2015/0350657 A1* | 12/2015 | Heo | H04N 19/159 375/240.12 |
| 2016/0134857 A1* | 5/2016 | An | H04N 19/597 348/43 |

FOREIGN PATENT DOCUMENTS

| | | |
|---|---|---|
| KR | 10-2008-0036910 A | 4/2008 |
| KR | 10-2008-0092359 A | 10/2008 |
| KR | 10-2012-0025111 A | 3/2012 |
| KR | 10-2012-0084629 A | 7/2012 |
| KR | 10-2013-0004181 A | 1/2013 |
| KR | 10-2013-0065672 A | 6/2013 |

OTHER PUBLICATIONS

Communication dated Oct. 17, 2014 issued by the Int. Searching Authority in counterpart Application No. PCT/KR2014/006333 (PCT/ISA/210 & PCT/ISA/237).

Communication dated Apr. 11, 2016, issued by the Korean Intellectual Property Office in counterpart Korean Patent Application No. 10-2015-7011649.

Communication dated Nov. 7, 2017, from the European Patent Office in counterpart European Application No. 14822810.9.

Jin Young Lee et al.," 3D-CE5.a related results on temporal motion vector prediction in dependent view", Joint Collaborative Team on 3D Video Coding Extension Development of ITU-T SG 16 WP 3 and ISO/IEC JTC 1/SC 29/WG 11, 2nd Meeting: Shanghai, CN, Oct. 13-19, 2012 Document: JCT3V-B0153, (4 Pages Total) (Date Saved: Oct. 13, 2012).

Jian-Liang Lin et al., "3D-CE5.a results on the motion vector competition-based Skip/Direct mode with explicit signaling", Joint Collaborative Team on 3D Video Coding Extension Development of ITU-T SG 16 WP 3 and ISO/IEC JTC 1/SC 29/WG 11, 1st Meeting: Stockholm, SE, Jul. 16-20, 2012 Document: JCT2-A0045, (4 Pages Total).

Yichen Zhang et al., "CE2.h related: Enhanced Disparity Vector Prediction", Joint Collaborative Team on 3D Video Coding Extensions of ITU-T SG 16 WP 3 and ISO/IEC JTC 1/SC 29/WG 11, 4th Meeting: Incheon, KR, Apr. 20-26, 2013, Document: JCT3V-D0170, (5 Pages Total).

Min Woo Park et al., "3D-CE3 related: Simplification of DV Derivation and Default DV Improvement", Joint Collaborative Team on 3D Video Coding Extensions of ITU-T SG 16 WP 3 and ISO/IEC JTC 1/SC 29/WG 11, 7th Meeting: San Jose, US, Jan. 11-17, 2014 Document: JCT3V-G0073, (3 Pages Total).

Min Woo Park et al., "3D-CE2.h related: Simplified NBDV and improved disparity vector derivation", Joint Collaborative Team on 3D Video Coding Extensions of ITU-T SG 16 WP 3 and ISO/IEC JTC 1/SC 29/WG 11, 5th Meeting: Vienna, AT, Jul. 27-Aug. 2, 2013 Document: JCT3V-E0142, (9 pages Total).

Jin Young Lee et al., "3D-CE5.a results on joint proposal for an improved depth-based motion vector prediction method by Samsung and Sharp", International Organisation for Standardisation Organisation Internationale De Normalisation ISO/IEC JTC1/SC29/WG11 Coding of Moving Pictures and Audio, ISO/IEC JTC1/SC29/WG11 MPEG2012/M24824, May 2012, Geneva, Switzerland (4 Pages Total).

Jian-Liang Lin et al., "3D-CE5.A related motion vector competition-based Skip/Direct mode with explicit signaling", International Organisation for Standardisation Organisation Internationale De Normalisation ISO/IEC JTC1/SC29WG11 Coding of Moving Pictures and Audio ISO/IEC JTC1/SC29/WG11 MPEG2012/ M24847 May 2012, Geneva, Switzerland (5 Pages Total).

Communication dated Jan. 23, 2018, from the State Intellectual Property Office of People's Republic of China in counterpart Application No. 201480050574.8.

Jin Young Lee et al., "3D-CE5.s related results on temporal motion vector prediction in dependent view", Joint Collaborative Team on 3D Video Coding Extension Development of ITU-T SG 16 WP 3 and ISO/IEC JTC 1/SC 29/WG 11, 2nd Meeting: Shanghai, CN, Oct. 13-19, 2012 Document: JCT3V-B0153, (3 Pages Total) (Date Saved: 0000-00-00).

* cited by examiner

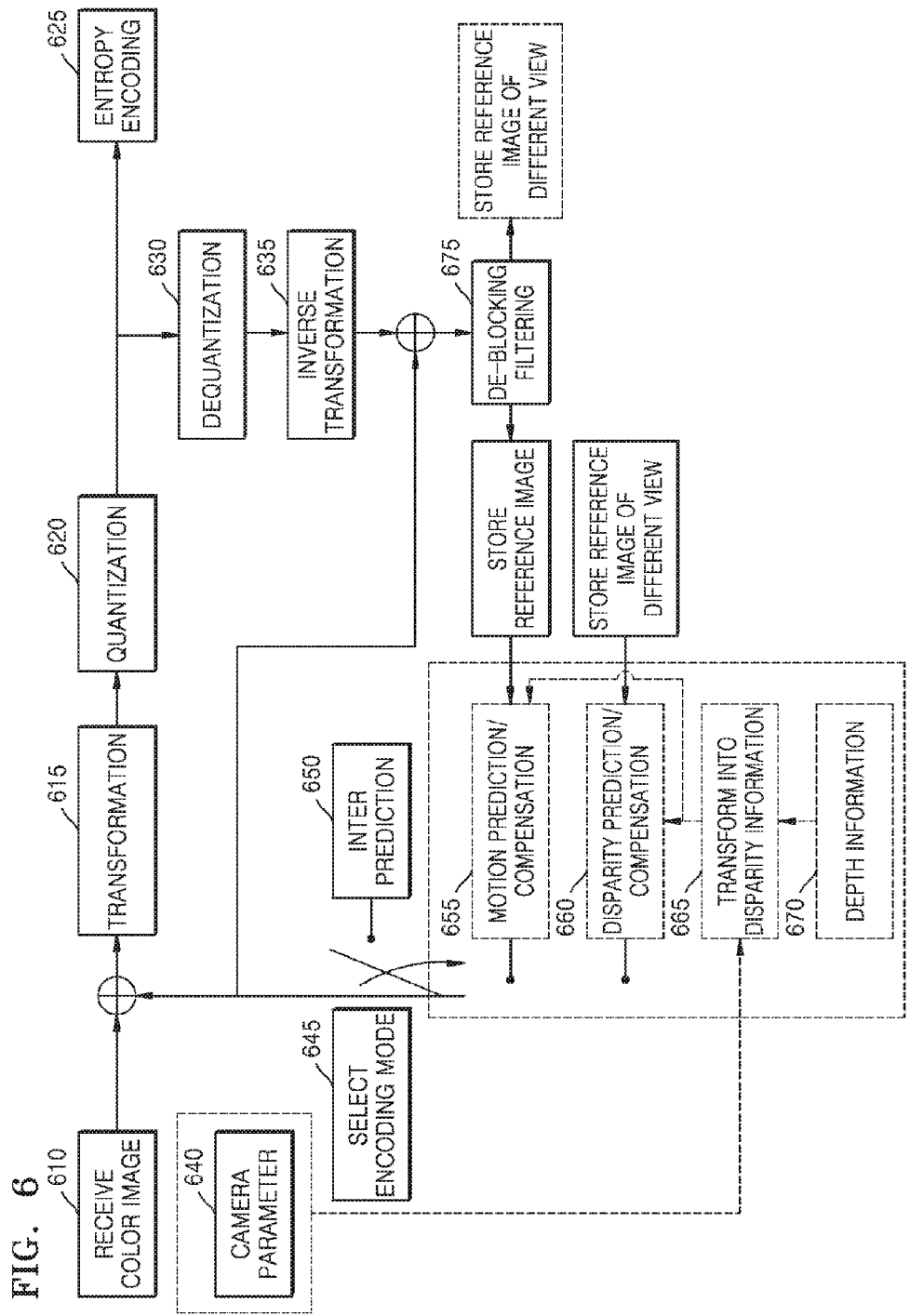

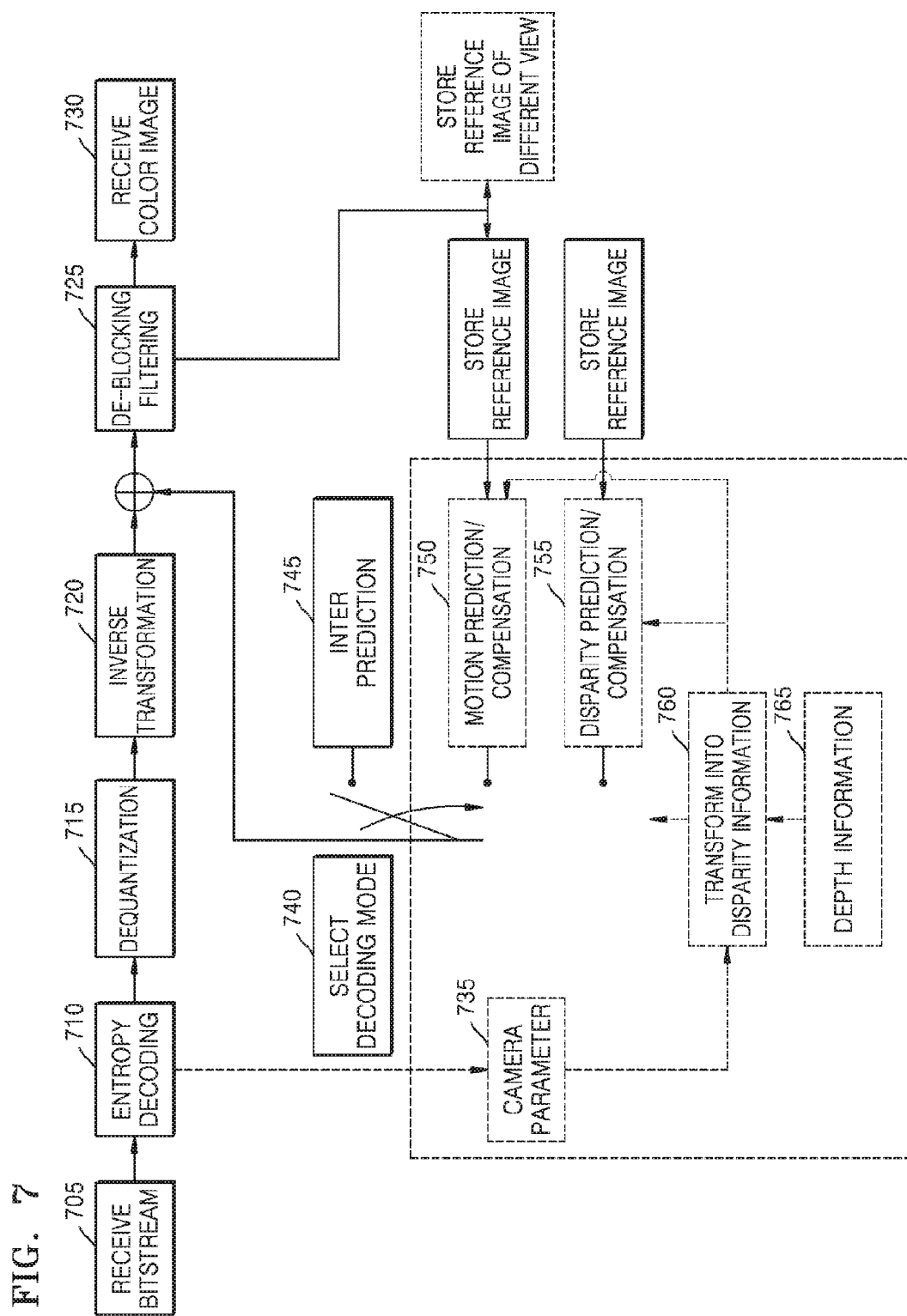

CODING UNIT (1710)

VIDEO ENCODING METHOD AND APPARATUS THEREFOR USING MODIFICATION VECTOR INDUCEMENT, VIDEO DECODING METHOD AND APPARATUS THEREFOR

TECHNICAL FIELD

The present invention relates to video encoding and decoding methods. more particularly, the present invention relates to a method of deriving a disparity vector.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a coding unit having a predetermined size.

Image data of the space domain is transformed into coefficients of the frequency domain via frequency transformation. According to a video codec, an image is split into blocks having a predetermined size, discrete cosine transformation (DCT) is performed on each block, and frequency coefficients are encoded in block units, for rapid calculation of frequency transformation. Conventional compression systems perform block-based prediction so as to remove redundancy between color images.

DETAILED DESCRIPTION OF THE INVENTION

Technical Problem

Provided are an encoding apparatus and a decoding apparatus which perform video compression with an improved coding rate.

Technical Solution

According to an embodiment of the present invention, video decoding method, which is performed by a video decoding apparatus, includes: obtaining a bitstream of an encoded image; determining a prediction mode of a current block by using prediction mode information of the current block that is included in the bitstream; determining a type of a reference vector, which indicates a reference block used for decoding the current block according to the prediction mode of the current block, as one of a motion vector type and a disparity vector type; when a neighboring block adjacent to the current block does not have the determined type of the reference vector, generating a reference vector of the neighboring block having the determined type; determining the reference vector of the current block indicating the reference block by using the generated reference vector of the neighboring block; obtaining information of the reference block by using the reference vector of the current block; and decoding the current block by using the information of the reference block.

The determining of the type of the reference vector, which indicates the reference block used for decoding the current block according to the prediction mode of the current block, as one of the motion vector type and the disparity vector type may include, when the prediction mode of the current block is an inter-view prediction mode, determining the type of the reference vector of the current block as the disparity vector type.

The determining of the type of the reference vector, which indicates the reference block used for decoding the current block according to the prediction mode of the current block, as one of the motion vector type and the disparity vector type may include, when the prediction mode of the current block is an inter prediction mode, determining the type of the reference vector of the current block as the disparity vector type.

The generating of the reference vector of the neighboring block may further include: when the type of the reference vector used for decoding the current block is the motion vector type, generating a motion vector of the neighboring block; and generating the generated motion vector of the neighboring block as the reference vector of the neighboring block.

The generating of the motion vector of the neighboring block may further include: generating a disparity vector of the neighboring block indicating a block having a different view from the neighboring block; and generating the motion vector of the neighboring block by using the disparity vector of the neighboring block.

The generating of the motion vector of the neighboring block by using the disparity vector of the neighboring block may include determining a motion vector of a block indicated by the disparity vector of the neighboring block as the motion vector of the neighboring block.

The generating of the reference vector of the neighboring block may include: generating a depth value of the neighboring block by using a preset value; generating a disparity vector of the neighboring block by using the depth value; and generating the reference vector of the neighboring block by using the disparity vector of the neighboring block.

The preset value may be 0, 128, or a settable maximum depth value.

The generating of the reference vector of the neighboring block may include: determining a disparity vector of a block having a decoding order one ahead of a decoding order of the current block, a disparity vector of a recently decoded block, or a zero vector, as the disparity vector of the neighboring block; and generating the reference vector of the neighboring block by using the disparity vector of the neighboring block.

In addition, according to an embodiment of the present invention, a video encoding method, which is performed by a video encoding apparatus, includes: determining a prediction mode of a current block; determining a type of a reference vector, which indicates a reference block used for encoding the current block according to the prediction mode of the current block, as one of a motion vector type and a disparity vector type; when a neighboring block adjacent to the current block does not have the determined type of the reference vector, generating a reference vector of the neighboring block having the determined type; determining the reference vector of the current block indicating the reference block by using the generated reference vector of the neighboring block; obtaining information of the reference block by using the reference vector of the current block; encoding the current block by using the information of the reference block; and generating a bitstream of the encoded current block.

The generating of the reference vector of the neighboring block may include: generating a depth value of the neighboring block by using a preset value; generating a disparity vector of the neighboring block by using the depth value;

and generating the reference vector of the neighboring block by using the disparity vector of the neighboring block.

The generating of the reference vector of the neighboring block may include: determining a disparity vector of a block having an encoding order one ahead of an encoding order of the current block, a disparity vector of a recently decoded block, or a zero vector, as the disparity vector of the neighboring block; and generating the reference vector of the neighboring block by using the disparity vector of the neighboring block.

In addition, according to an embodiment of the present invention, a video decoding apparatus includes: a bitstream obtainer configured to obtain a bitstream of an encoded image; and a video decoder configured to: determine a prediction mode of a current block by using prediction mode information of the current block that is included in the bitstream; determine a type of a reference vector, which indicates a reference block used for decoding the current block according to the prediction mode of the current block, as one of a motion vector type and a disparity vector type; when a neighboring block adjacent to the current block does not have the determined type of the reference vector, generate the reference vector of the neighboring block having the determined type; determine the reference vector of the current block indicating the reference block by using the generated reference vector of the neighboring block; obtain the information of the reference block by using the reference vector of the current block; and decode the current block by using the information of the reference block.

In addition, according to an embodiment of the present invention, a video encoding apparatus includes: a video encoder configured to: determine a prediction mode of a current block; determine a type of a reference vector, which indicates a reference block used for encoding the current block according to the prediction mode of the current block, as one of a motion vector type and a disparity vector type; when a neighboring block adjacent to the current block does not have the determined type of the reference vector, generate a reference vector of the neighboring block having the determined type; determine the reference vector of the current block indicating the reference block by using the generated reference vector of the neighboring block; obtain information of the reference block by using the reference vector of the current block; and encode the current block by using the information of the reference block; and a bitstream generator configured to generate a bitstream of the encoded current block.

In addition, according to an embodiment of the present invention, a computer-readable recoding medium having recorded thereon a computer program for executing the decoding method according to an embodiment.

Advantageous Effects of the Invention

Encoding and decoding apparatuses according to embodiments have an effect of performing video compression with a further improved coding rate.

DESCRIPTION OF THE DRAWINGS

FIG. 6 is a diagram for describing an operation of an encoding apparatus in detail, according to an embodiment.

FIG. 7 is a diagram for describing an operation of a decoding apparatus in detail, according to an embodiment.

BEST MODE

Figure 1A:
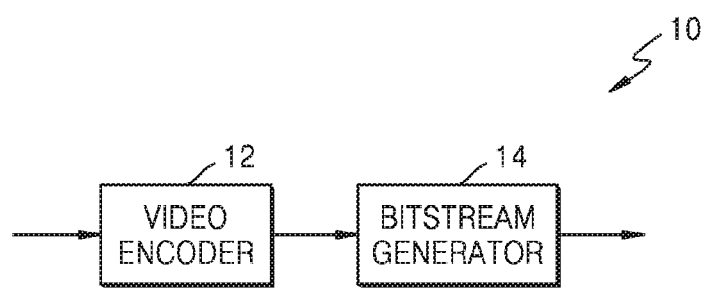
FIG. 1A is a block diagram of a video encoding apparatus, according to various embodiments.

Hereinafter, a video encoding method and a video decoding method of determining a disparity vector or motion vector prediction method based on characteristics of neighboring blocks adjacent to a current block, according to various embodiments, will be described with reference to FIGS. 1A through 7.

A video encoding method and video decoding method based on coding units having a tree structure according to various embodiments that are applicable to the video encoding method and the video decoding method will be described with reference to FIGS. 8 through 20. Various embodiments to which the video encoding method and the video decoding method are applicable will be described with reference to FIGS. 21 through 27.

Hereinafter, an 'image' may denote a still image or a moving image of a video, or a video itself.

Hereinafter, a 'sample' that is data allocated to a sampling location of an image may mean data that is a processing target. For example, pixels in an image of a spatial domain may be samples.

A current block (current color block) means a block of a color image to be encoded or decoded.

A current color image means a color image including a current block. Specifically, the current color image represents a color image including a block to be encoded or decoded.

A depth image corresponding to a current block (corresponding depth image) means a depth image corresponding to a color image (current color image) including a current block. For example, a corresponding depth image is an image representing a depth value of the color image including a current image.

A neighboring block (neighboring block around the current block) represents at least one encoded or decoded block adjacent to a current block. For example, the neighboring block may be located at an upper end of the current block, a right upper end of the current block, a left side of the current block, or a left upper end of the current block.

A corresponding depth block (colocated depth block in the corresponding depth map) means a depth image block included in a depth image corresponding to a current block. For example, the corresponding block may include a block located at the same location as a current block in a depth image corresponding to a color block.

A macroblock (colocated depth macroblock) means a depth image block of an upper concept including a corresponding block of a depth image.

A neighboring color image (neighboring color image around the color image comprising the current color block) means a color image having a view different from a view of a color image including a current block. The neighboring color image may be a color image encoded or decoded before an image processing process for the current block is performed.

A video encoding apparatus and method and a video decoding apparatus and method according to an embodiment will now be described with reference to FIGS. 1A through 7.

A stereoscopic image refers to a three-dimensional (3D) image that simultaneously provides shape information about a depth and a space together. Unlike a stereo image that simply provides images of different views to left and right eyes of a user, images taken from many different views are needed so as to provide an image seen as if viewed from different directions as the user varies the user's point of view. Since the images taken from different views have a great amount of data, it is almost impossible to compress the images using an encoding apparatus optimized for a single-view video coding, such as MPEG-2 or H.264.AVC, in consideration of a network infrastructure, a terrestrial bandwidth, and the like. Therefore, instead of compressing all videos of different views before transmission, if a depth image is created and is compressed and transmitted together with images of some views among the images of different views, an amount of data generated during compression may be reduced. Since the depth image is an image in which a distance between an object and a viewer in a color image is represented by a value of 0 to 255, characteristics of the depth image are similar to those of a color image. Generally, a 3D video includes color images and depth images of different views. However, 3D videos have temporal redundancy between temporally continuous images and inter-view redundancy between images of different views. If data is compressed by an encoding system that can efficiently remove these redundancies and is optimized to the 3D videos, a smaller amount of data can be transmitted. The present invention proposes a 3D video encoding/decoding system that efficiently reduces redundancy between views.

In order to remove redundancy between color images, conventional compression systems perform block-based prediction. In the present invention, in order to efficiently remove the temporal redundancy and the inter-view redundancy, a depth image is used for improving performance of a conventional motion vector prediction method. The temporal redundancy and the inter-view redundancy are removed by using neighboring block information, a depth image corresponding to a relevant color image, and images of different views.

FIG. 1A is a block diagram of a video encoding apparatus 10, according to various embodiments. The video encoding apparatus 10 according to various embodiments may include a video encoder 12 and a bitstream generator 14.

The video encoder 12 may determine a prediction mode of a current block and encode the current block. The prediction mode of the current block includes a skip/direct prediction mode that uses information of a reference block referred to for encoding the current block, an intra prediction mode that allows only spatial reference, an inter prediction mode that references blocks of different temporal images by using a motion vector, and an inter-view prediction mode that references blocks of images of different views by using a disparity vector (inter-view motion vector).

The video encoder 12 may perform encoding on the current block according to a plurality of prediction modes so as to encode the current block, and generate encoded data of the current block by using a prediction mode having the best coding rate. The video encoder 12 may generate information about the prediction mode used for encoding the current block.

The video encoder 12 may determine a type of a reference vector, which indicates the reference block used for encoding the current block according to the prediction mode of the current block, as one of a motion vector type and a disparity vector type.

If the neighboring block adjacent to the current block does not have the determined type of the reference vector, the video encoder 12 may generate the reference vector of the neighboring block having the determined type. The video encoder 12 may determine the reference vector of the current block indicating the reference block by using the generated reference vector of the neighboring block.

The video encoder 12 may obtain the information of the reference block by using the reference vector of the current block and encode the current block by using the information of the reference block.

When the prediction mode of the current block is the skip prediction mode or the direct prediction mode, the video encoder 12 may determine the type of the reference vector of the current block as the motion vector type or the disparity vector type.

When the prediction mode of the current block is the inter-view prediction mode, the video encoder 12 may determine the type of the reference vector of the current block as the disparity vector type.

When the prediction mode of the current block is the inter prediction mode, the video encoder 12 may determine the type of the reference vector of the current block as the motion vector type.

When the type of the reference vector used for encoding the current block is the motion vector type, the video encoder 12 may generate the motion vector of the neighboring block and generate the generated motion vector of the neighboring block as the reference vector of the neighboring block. For example, when the type of the reference vector used for encoding the current block is the motion vector type, the video encoder 12 may determine the motion vector of the neighboring block as the reference vector of the neighboring block.

The video encoder 12 may generate the disparity vector of the neighboring block indicating a block having a different view from the neighboring block, and generate the motion vector of the neighboring block by using the disparity vector of the neighboring block.

The video encoder 12 may determine the motion vector of the block indicated by the disparity vector of the neighboring block as the motion vector of the neighboring block.

The video encoder 12 may generate a depth value of the neighboring block by using a preset value, generate a disparity vector of the neighboring block by using the depth value, and generate a reference vector of the neighboring block by using the disparity vector of the neighboring block. The preset value is a real number between 0 and a settable maximum depth value. For example, the preset value may be 0, 128, or the settable maximum depth value.

The video encoder 12 may determine a disparity vector of a block having an encoding order one ahead of an encoding order of the current block, a disparity vector of a recently encoded block, or a zero vector, as the disparity vector of the neighboring block, and generate the reference vector of the neighboring block by using the disparity vector of the neighboring block.

The bitstream generator 14 may generate a bitstream corresponding to the encoded current block. For example, the bitstream generator 14 may generate a bitstream including encoded image data of the current block and prediction mode information of the current block.

Figure 1B:
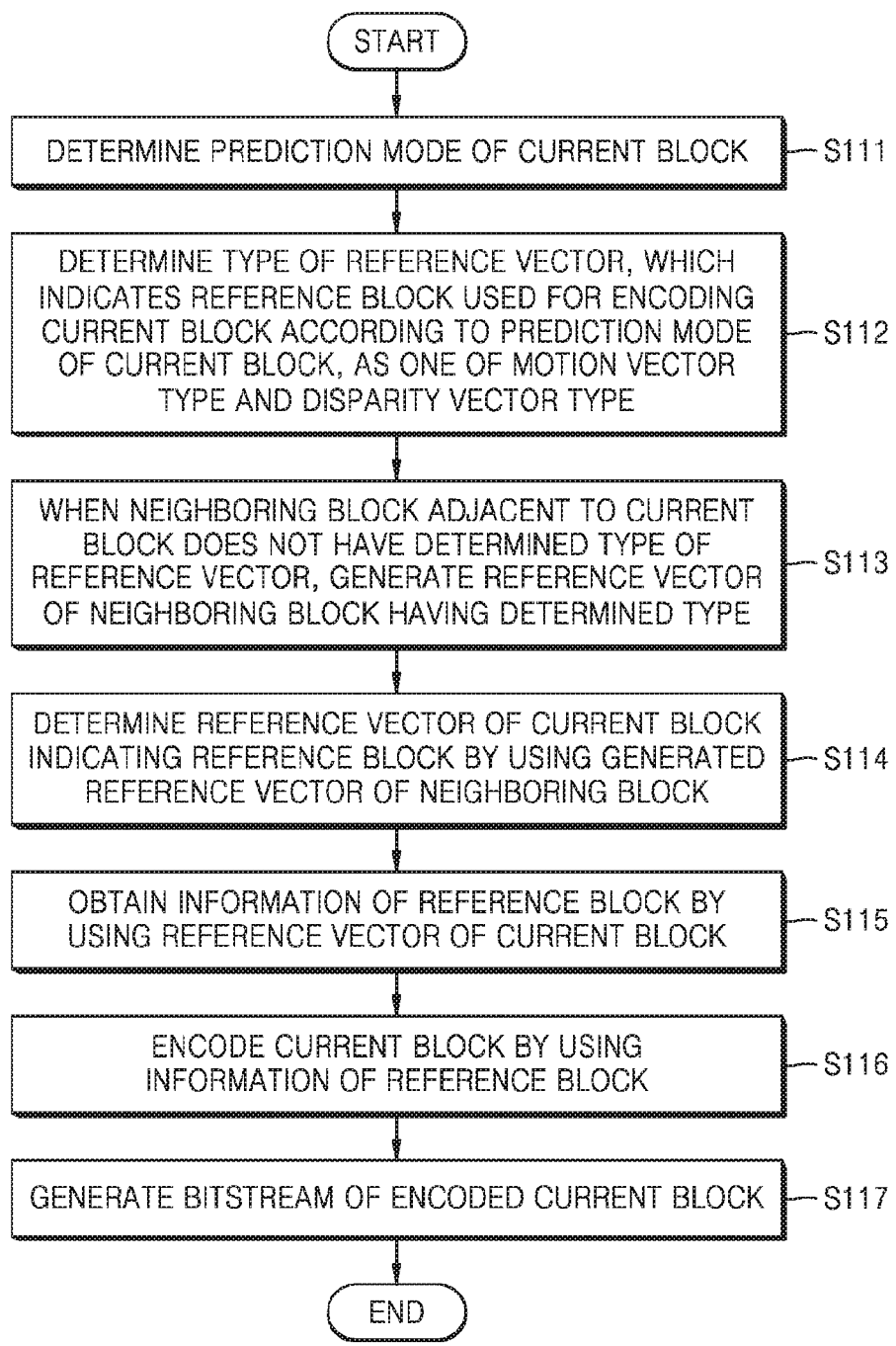
FIG. 1B is a flowchart of a video encoding method, which is performed by a video encoding apparatus, according to various embodiments.

FIG. 1B is a flowchart of a video encoding method, which is performed by the video encoding apparatus 10, according to various embodiments.

First, the video encoding apparatus 10 may determine a prediction mode of a current block (S111).

Then, the video encoding apparatus 10 may determine a type of a reference vector, which indicates a reference block used for encoding the current block according to a prediction mode of the current block, as one of a motion vector type and a disparity vector type (S112).

When the prediction mode of the current block is a skip prediction mode or a direct prediction mode, the video encoding apparatus 10 may determine the type of the reference vector of the current block as the motion vector type or the disparity vector type.

When the prediction mode of the current block is the inter-view prediction mode, the video encoding apparatus 10 may determine the type of the reference vector of the current block as the disparity vector type.

When the prediction mode of the current block is the inter prediction mode, the video encoding apparatus 10 may determine the type of the reference vector of the current block as the motion vector type.

Then, if the neighboring block adjacent to the current block does not have the determined type of the reference vector, the video encoding apparatus 10 may generate the reference vector of the neighboring block having the determined type (S113).

When the type of the reference vector used for encoding the current block is the motion vector type, the video encoding apparatus 10 may generate the motion vector of the neighboring block and generate the generated motion vector of the neighboring block as the reference vector of the neighboring block.

The video encoding apparatus 10 may generate the disparity vector of the neighboring block indicating a block having a different view from the neighboring block, and generate the motion vector of the neighboring block by using the disparity vector of the neighboring block.

The video encoding apparatus 10 may determine the motion vector of the block indicated by the disparity vector of the neighboring block as the motion vector of the neighboring block.

The video encoding 10 may generate a depth value of the neighboring block by using a preset value and generate a disparity vector of the neighboring block by using the depth value. The video encoding apparatus 10 may generate a reference vector of the neighboring block by using the disparity vector of the neighboring block. The preset value may be 0, 128, or a settable maximum depth value.

The video encoding apparatus 10 may determine a disparity vector of a block having an encoding order one ahead of an encoding order of the current block, a disparity vector of a recently encoded block, or a zero vector, as the disparity vector of the neighboring block. The video encoding apparatus 10 may generate a reference vector of the neighboring block by using the disparity vector of the neighboring block.

Then, the video encoding apparatus 10 may determine the reference vector of the current block indicating the reference block by using the generated reference vector of the neighboring block (S114).

Then, the video encoding apparatus 10 may obtain information of the reference block by using the reference vector of the current block (S115).

Then, the video encoding apparatus 10 may encode the current block by using the information of the reference block (S116).

Then, the video encoding apparatus 10 generates a bitstream of the encoded image (S117).

Figure 2A:
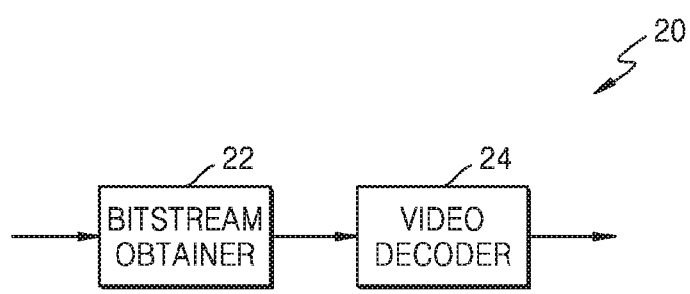
FIG. 2A is a block diagram of a video decoding apparatus, according to various embodiments.

FIG. 2A is a block diagram of a video decoding apparatus 20, according to various embodiments. The video decoding apparatus 20 according to various embodiments may include a bitstream obtainer 22 and a video decoder 24.

The bitstream obtainer 22 may obtain a bitstream of an encoded image and obtain syntax elements from the bitstream. For example, the bitstream obtainer 22 may obtain encoded image data of an encoded block and prediction mode information of the encoded block from the bitstream.

The video decoder 24 may determine a prediction mode of the current block by using prediction mode information of the current block included in the bitstream. The video decoder 24 may determine a type of a reference vector, which indicates a reference block used for decoding the current block according to the prediction mode of the current block, as one of a motion vector type and a disparity vector type. If a neighboring block adjacent to the current block does not have the determined type of the reference vector, the video decoder 24 may generate the reference vector of the neighboring block having the determined type. The video decoder 24 may determine the reference vector of the current block indicating the reference block by using the generated reference vector of the neighboring block. The video decoder 24 may obtain the information of the reference block by using the reference vector of the current block and decode the current block by using the information of the reference block.

When the prediction mode of the current block is a skip prediction mode or a direct prediction mode, the video decoder 24 may determine the type of the reference vector of the current block as a motion vector type or a disparity vector type.

When the prediction mode of the current block is the inter-view prediction mode, the video decoder 24 may determine the type of the reference vector of the current block as the disparity vector type.

When the prediction mode of the current block is the inter prediction mode, the video decoder 24 may determine the type of the reference vector of the current block as the motion vector type.

When the type of the reference vector used for decoding the current block is the motion vector type, the video decoder 24 may generate the motion vector of the neighboring block and generate the generated motion vector of the neighboring block as the reference vector of the neighboring block.

The video decoder 24 may generate the disparity vector of the neighboring block indicating a block having a different view from the neighboring block, and generate the motion vector of the neighboring block by using the disparity vector of the neighboring block.

The video decoder 24 may determine the motion vector of the block indicated by the disparity vector of the neighboring block as the motion vector of the neighboring block.

The video decoder 24 may generate a depth value of the neighboring block by using a preset value, generate a disparity vector of the neighboring block by using the depth value, and generate a reference vector of the neighboring block by using the disparity vector of the neighboring block. The preset value is a real number between 0 and a settable maximum depth value. For example, the preset value may be 0, 128, or the settable maximum depth value.

When the type of the reference vector of the neighboring block is the disparity vector type, the video decoder 24 may determine the disparity vector of the neighboring block as the reference vector of the neighboring block.

The video decoder 24 may determine a disparity vector of a block having a decoding order one ahead of a decoding order of the current block, a disparity vector of a recently decoded block, or a zero vector, as the disparity vector of the neighboring block, and generate the reference vector of the neighboring block by using the disparity vector of the neighboring block.

Figure 2B:
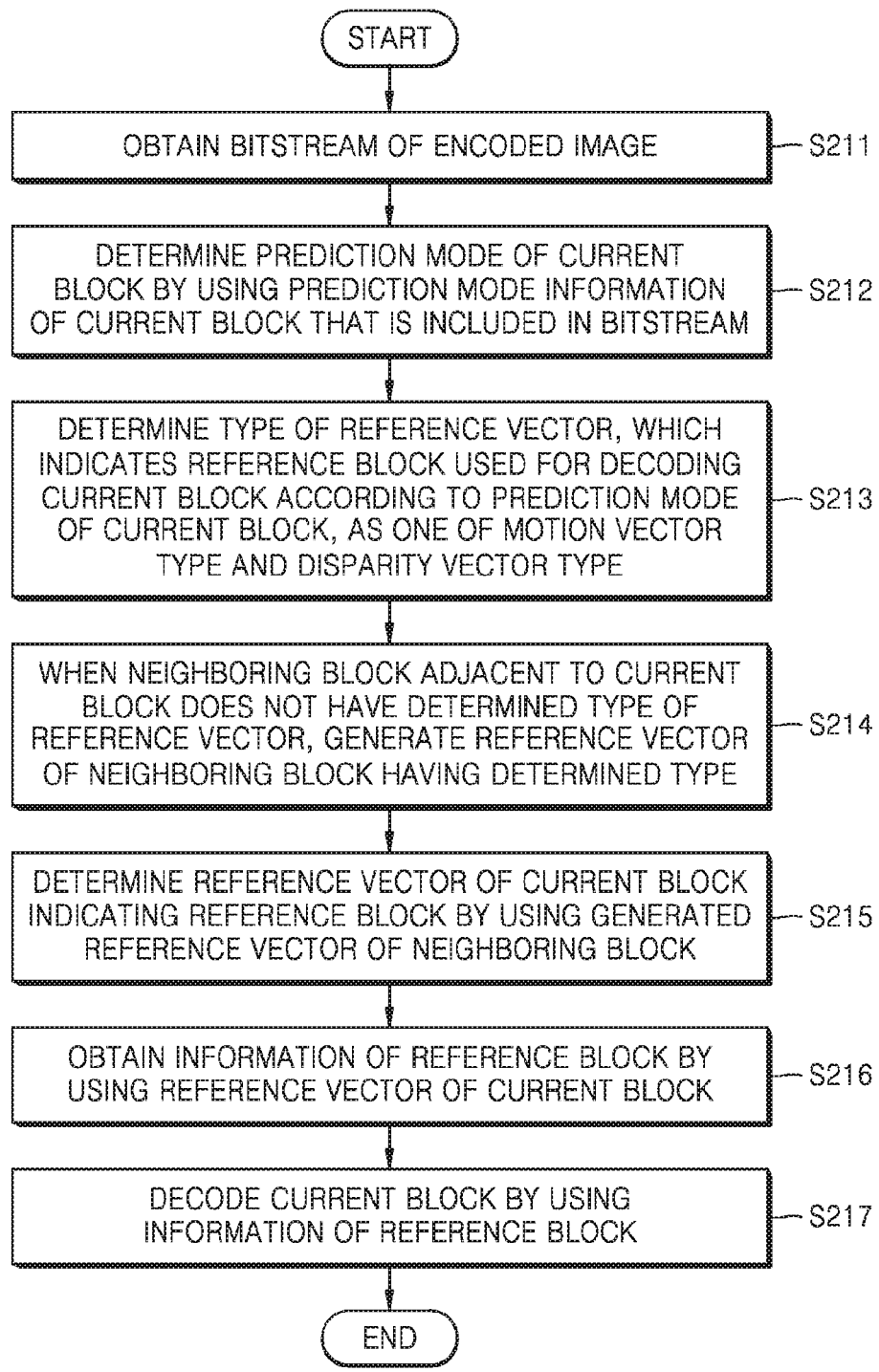
FIG. 2B is a flowchart of a video decoding method, which is performed by a video decoding apparatus, according to various embodiments.

FIG. 2B is a flowchart of a video decoding method, which is performed by the video decoding apparatus 20, according to various embodiments.

First, the video decoding apparatus 20 obtains a bitstream of an encoded image (S211).

Then, the video decoding apparatus 20 may determine a prediction mode of a current block by using prediction mode information of the current block included in the bitstream (S212).

Then, the video decoding apparatus 20 may determine a type of a reference vector, which indicates a reference block used for decoding the current block according to the prediction mode of the current block, as one of a motion vector type and a disparity vector type (S213).

When the prediction mode of the current block is a skip prediction mode or a direct prediction mode, the video decoding apparatus 20 may determine the type of the reference vector of the current block as the motion vector type or the disparity vector type.

When the prediction mode of the current block is the inter-view prediction mode, the video decoding apparatus 20 may determine the type of the reference vector of the current block as the disparity vector type.

When the prediction mode of the current block is the inter prediction mode, the video decoding apparatus 20 may determine the type of the reference vector of the current block as the motion vector type.

Then, if a neighboring block adjacent to the current block does not have the determined type of the reference vector, the video decoding apparatus 20 may generate the reference vector of the neighboring block having the determined type (S214).

When the type of the reference vector used for decoding the current block is the motion vector type, the video decoding apparatus 20 may generate the motion vector of the neighboring block and generate the generated motion vector of the neighboring block as the reference vector of the neighboring block.

The video decoding apparatus 20 may generate the disparity vector of the neighboring block indicating a block having a different view from the neighboring block, and generate the motion vector of the neighboring block by using the disparity vector of the neighboring block.

The video decoding apparatus 20 may determine the motion vector of the block indicated by the disparity vector of the neighboring block as the motion vector of the neighboring block.

The video decoding apparatus 20 may generate a depth value of the neighboring block by using a preset value and generate a disparity vector of the neighboring block by using the depth value. The video decoding apparatus 20 may generate a reference vector of the neighboring block by using the disparity vector of the neighboring block. The preset value may be 0, 128, or a settable maximum depth value.

The video decoding apparatus 20 may determine a disparity vector of a block having a decoding order one ahead of a decoding order of the current block, a disparity vector of a recently decoded block, or a zero vector, as the disparity vector of the neighboring block. The video decoding apparatus 20 may generate a reference vector of the neighboring block by using the disparity vector of the neighboring block.

Then, the video decoding apparatus 20 may determine the reference vector of the current block indicating the reference block by using the generated reference vector of the neighboring block (S215).

Then, the video decoding apparatus 20 may obtain information of the reference block by using the reference vector of the current block (S216).

Then, the video decoding apparatus 20 may decode the current block by using the information of the reference block (S217). When the current block is encoded in the inter or inter-view prediction mode, the video decoding apparatus 20 may decode the current block by using image data of the reference block.

When the current block is encoded in the skip/direct prediction mode, the video decoding apparatus 20 may decode the current block by using the decoded image of the reference block as the decoded image of the current block.

Figure 3A:
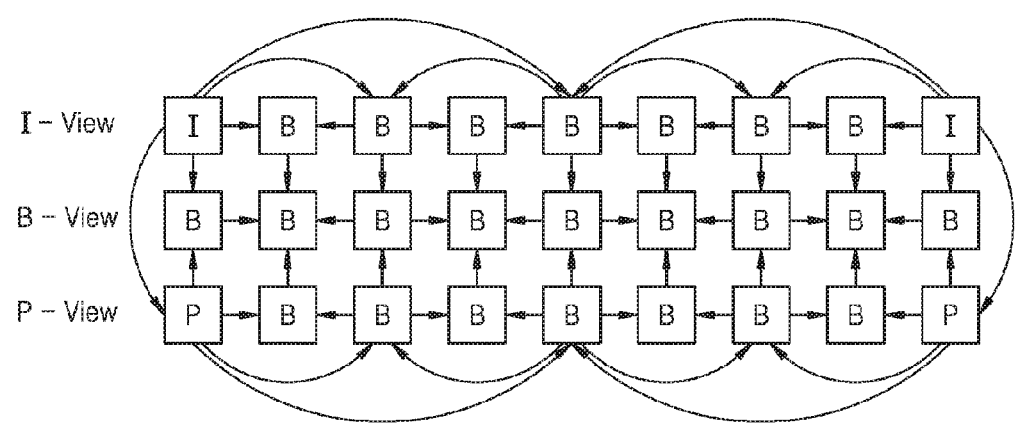
FIG. 3A is a diagram illustrating a structure of a multi-view video, according to an embodiment.

FIG. 3A is a diagram illustrating a structure of a multi-view video, according to an embodiment.

FIG. 3A illustrates a multi-view video coding (MVC) method of performing encoding using a group of picture (GOP) "8" when images of three views (a left view, a center view, and a right view) are received according to an embodiment. The GOP means a group of continuous images starting from an I-frame.

Since the concept of a hierarchical B picture or a hierarchical B frame is used for a temporal axis and a view axis during a multi-view image encoding process, the redundancy between images may be reduced.

The encoding apparatus 10 of FIG. 1A may encode images corresponding to three views by sequentially encoding a left image (a left picture (I-view)), a right image (a right picture (P-view)), and a center image (a center picture (B-view)), based on the structure of the multi-view image illustrated in FIG. 3A. The decoding apparatus 20 of FIG. 2A may decode images in the same manner as the encoding apparatus.

During a process of encoding the left image, an area similar to the left image may be estimated from previous images through a motion estimation and temporal redundancy may be reduced by using information about the estimated area. Since the right image to be encoded after the left image is encoded by referring to the encoded left image, inter-view redundancy using a disparity estimation as well as the temporal redundancy using the motion estimation may also be reduced. Additionally, since the center image is encoded through the disparity estimation by referring to both the left image and the right image that are already encoded, the inter-view redundancy may be reduced.

Referring to FIG. 3A, during the multi-view image encoding process, an image, such as the left image, which is encoded without using an image of a different view may be defined as an I-view image. An image, such as the right image, which is encoded by unidirectionally predicting an image of a different view may be defined as a P-view image. An image, such as the center image, which is encoded by bidirectionally predicting images of different views may be defined as a B-view image.

Figure 3B:
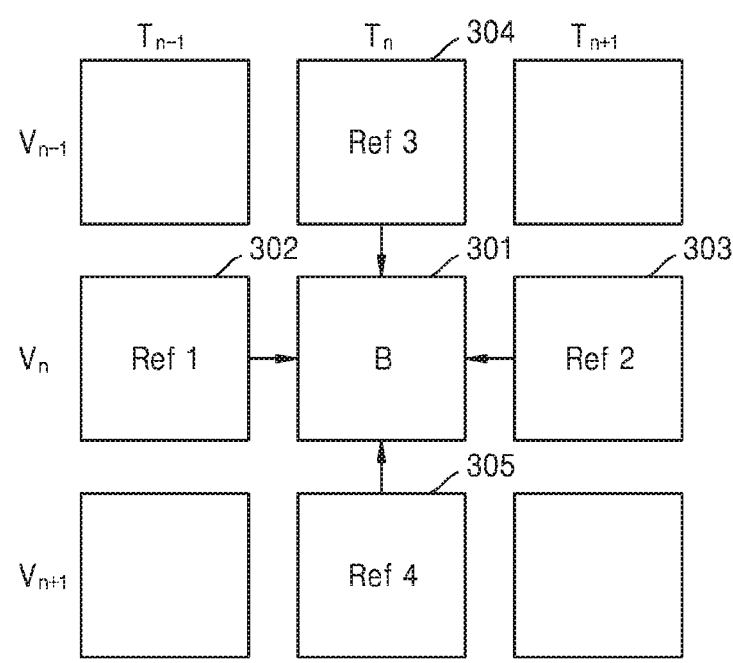
FIG. 3B is a diagram illustrating a reference image used for encoding a current block, according to an embodiment.

FIG. 3B is a diagram illustrating a reference image used for encoding a current block, according to an embodiment.

When encoding a current block included in a current color image, an image processing apparatus may use neighboring color images 302 to 305 as reference images. For example, the image processing apparatus may identify a similar block most similar to the current block from among the neighboring color images 302 to 305, and may encode a residual signal (residue) between the current block and the similar block. In the case of H.264/AVC, an encoding mode for estimating a similar block using a reference image may include SKIP (P Slice Only)/Direct (B Slice Only), 16×16, 16×8, 8×16, P8×8 modes, and the like. In the case of high efficiency video coding (HEVC), an encoding mode for estimating a similar block using a reference image may include SKIP, MERGE, 2N×2N, 2N×N, N×2N modes, and the like.

During the process of encoding the current block, the image processing apparatus may use the reference images 302 and 303 around the current color image based on a time in order to reduce the temporal redundancy. In addition, the image processing apparatus may use the reference images 304 and 305 around the current color image based on a time in order to reduce the inter-view redundancy. The image processing apparatus may use the Ref1 image 302 and the Ref2 image 303 so as to obtain motion information, and may use the Ref3 image 304 and the Ref4 image 305 so as to obtain disparity information.

In a process of predicting a motion vector or a disparity vector, the encoding apparatus and the decoding apparatus according to embodiments may perform motion and disparity prediction by using one value of the motion or disparity vectors of the neighboring blocks as a predicted vector, regardless of the type of the vector. The prediction is a concept including estimation and compensation. In the case of the motion prediction, the encoding apparatus may perform prediction by finding an optimal prediction block from reference pictures through a motion estimation and generating a prediction block through a motion compensation process. The encoding apparatus may perform transformation, quantization, and entropy encoding on a difference signal, which is a difference value between a prediction block generated from an inter prediction and a source block.

When a current block is inter-predicted, the decoding apparatus may generate a prediction block through only a motion compensation process by using reference picture information and reference block information transmitted by the encoding apparatus, without any motion estimation process on a prediction block. The decoding apparatus may reconstruct an image by summing the generated prediction block and residual signals generated through entropy decoding, dequantization, inverse transformation processes. The decoding apparatus may a corresponding picture as a reference picture by applying an in-loop filter according to a type of a codec and finally storing a reconstructed picture again in a DPB. Hereinafter, a method by which the decoding apparatus decodes a current block according to a value of a disparity vector of a neighboring block, according to an embodiment, will be described. A decoding method performed by the decoding apparatus, according to an embodiment, may be equally applied to an encoding method performed by the encoding apparatus.

The decoding apparatus according to an embodiment may predict a prediction vector by using only the same type of a motion vector as the prediction currently performed among neighboring blocks during a process of predicting motion and disparity vectors. That is, during a motion prediction process at a P-view and a B-view, a prediction motion vector of a current block may be predicted by using only motion vectors among neighboring blocks. In addition, during a disparity prediction process, a prediction disparity vector of a current block may be predicted by using only disparity vectors among neighboring blocks.

The decoding method according to an embodiment may predict a motion vector of a current block by using at least one of motion vector information of neighboring blocks, different-view image decoding information, a depth image corresponding to a color image being currently decoded. The decoding method according to an embodiment may predict a disparity vector of a current block by using at least one of disparity vectors of neighboring blocks, different-view image decoding information, a depth image corresponding to a color image being currently decoded.

The decoding method according to an embodiment provides a method of efficiently predicting motion vectors and disparity vectors at a P-view and a B-view and a method of predicting skip and direct motion vectors. The motion vector means a temporal MV and the disparity vector means a disparity vector or an inter-view MV. The decoding method according to an embodiment may be applied to any video encoding/decoding system, including MPEG-x, H.264/AVC, and HEVC.

The decoding method according to an embodiment includes Skip/Direct motion vector prediction (MVP) that predicts a motion vector in a skip/direct mode so as to perform prediction, a temporal MVP that predicts a motion vector between images having a temporal difference, and an inter-view (disparity) MVP that predicts a motion vector between images having an inter-view difference. The temporal MVP and the inter-view MVP are prediction processes for inter modes other than the skip and direct modes.

As described below, when the motion and disparity vectors of the image are predicted, the decoding method according to an embodiment may use a depth image according to the presence or absence of a depth image corresponding to a current color image. The image may be a color image. Alternatively, when the motion and disparity vectors of the image are predicted, the decoding method according to an embodiment may use any depth value or may use a global disparity vector.

When the motion and disparity vectors of the color image are predicted, the encoding method according to an embodiment may convert any depth value into a disparity vector if the depth image is not present. The encoding apparatus may insert the disparity vector generated using any depth value into a header of a sequence level, a header of a picture level, or a header of a slice level, and then, transmit the disparity vector to the encoding apparatus. The disparity vector may be included in the bitstream. When the disparity vector is not transmitted, the decoding apparatus may generate the disparity vector by a method used by the encoding apparatus.

If the depth image is not present when the motion and disparity vectors of the color image are predicted, the decoding apparatus according to an embodiment may use the global disparity vector as the disparity vector. The global disparity vector may be inserted into the header of the sequence level, the header of the picture level, or the header of the slice level before transmission. The global disparity vector may be included in the bitstream. When the global disparity vector is not transmitted, the decoding apparatus may generate the disparity vector by a method used by the encoding apparatus.

Figure 3C:
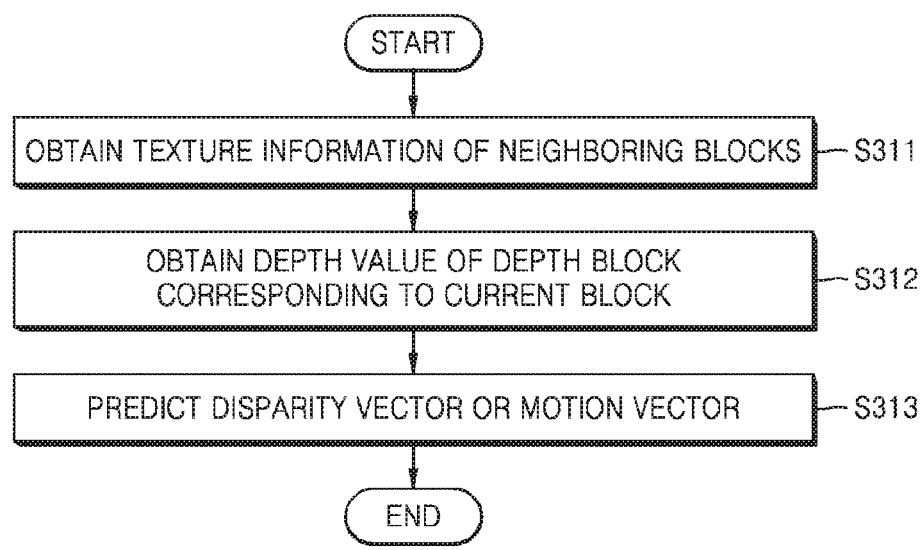
FIG. 3C is a diagram for describing a method by which a decoding apparatus predicts motion and disparity vectors when a depth image is present, according to an embodiment.

FIG. 3C is a diagram for describing a method by which a decoding apparatus predicts motion and disparity vectors when a depth image is present, according to an embodiment.

The decoding apparatus according to an embodiment obtains texture information of neighboring blocks (S311). The texture information is encoding information of a block used for performing encoding and decoding. For example, the texture information includes encoding mode information, a motion vector, a disparity vector, and depth information of a block.

Figure 3D:
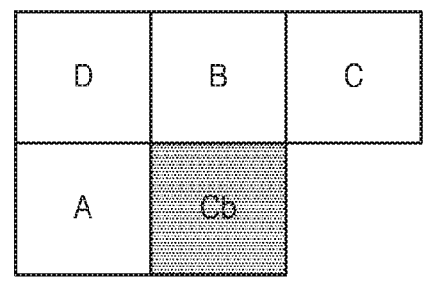
FIG. 3D is a conceptual diagram illustrating a current block Cb and neighboring blocks A, B, C, and D adjacent to the current block Cb.

FIG. 3D is a conceptual diagram illustrating a current block Cb and neighboring blocks A, B, C, and D adjacent to the current block Cb. Referring to FIG. 3D, the decoding apparatus may obtain texture information with respect to at least one of one or more neighboring blocks A, B, C, and D.

Then, the decoding apparatus obtains a depth value of a depth block corresponding to the current block (S312). In a case where the depth image block corresponding to the current block is present, when predicting motion and disparity vectors of the current block, the decoding apparatus may predict at least one of the disparity vector and the motion vector by using information of the depth block corresponding to the current block.

For example, the decoding apparatus may identify the depth image corresponding to the current block of the image. The image may be a color image. In a case where the depth image corresponding to the image is not present, the decoding apparatus may estimate a depth image corresponding to the current block by using neighboring blocks adjacent to the current block, a neighboring color image of a color image including the current block, or other depth image.

The decoding apparatus may determine the disparity vector of the current block by using depth information of the depth image corresponding to the current block. The decoding apparatus may identify at least one of pixels included in the depth image and convert the largest depth value among depth values of the identified pixels into the disparity vector of the current block.

For example, the decoding apparatus may determine the disparity vector of the current block based on the depth value of the pixel included in the corresponding block of the depth image corresponding to the current block. The decoding apparatus may identify at least one of the pixels included in the corresponding block of the depth image corresponding to the current block. The decoding apparatus may convert the largest depth value among the depth values of the identified pixels into the disparity vector and determine the converted disparity vector as the disparity vector of the current block.

The decoding apparatus may convert the largest depth value into the disparity vector of the current block among depth values of the entire pixels included in the corresponding block of the depth image. Alternatively, the decoding apparatus may take into consideration only some pixels among the pixels included in the corresponding block of the depth image and may convert the largest depth value into the disparity vector among the depth values of some pixels. According to an example, the decoding apparatus may identify pixels located in a preset area within the depth image and convert the largest depth value into the disparity vector of the current block among the depth values of the identified pixels. For example, the decoding apparatus may identify pixels located at corners of the corresponding block that is the area preset within the depth image, and convert the largest depth value into the disparity vector of the current block among the depth values of the identified pixels. Alternatively, the decoding apparatus may convert the largest depth value into the disparity vector of the current block among the depth values of the pixels located at the corners of the corresponding block and the depth value at the center of the corresponding block.

Figure 3E:
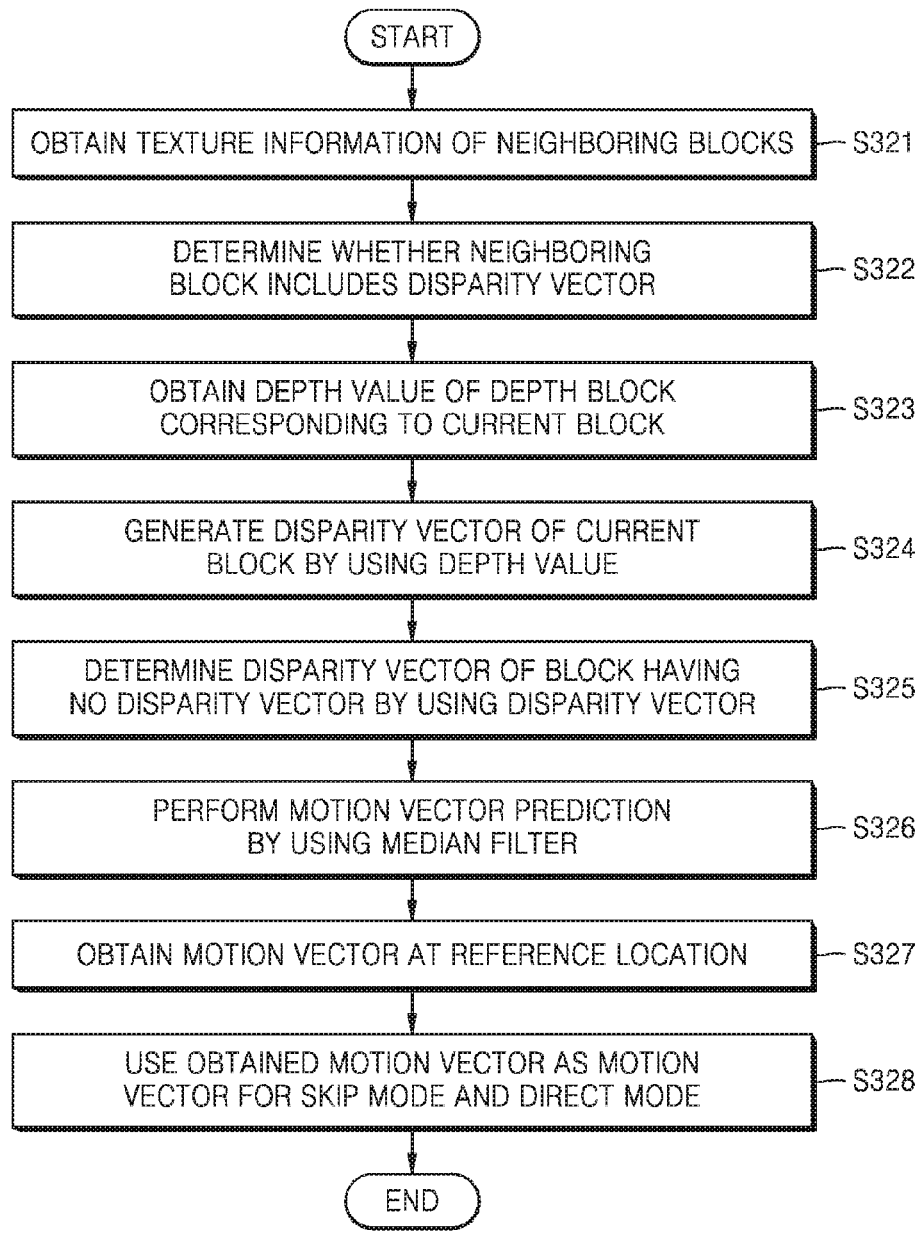
FIG. 3E is a diagram for describing a method by which a decoding apparatus performs motion vector prediction using depth images with respect to a skip mode and a direct mode, according to an embodiment.

FIG. 3E is a diagram for describing a method by which the decoding apparatus performs motion vector prediction using depth images with respect to a skip mode and a direct mode, according to an embodiment. When encoding/decoding P-view images and B-view images, an I-view image being in the same time zone is already encoded/decoded, and thus, information of the already encoded/decoded I-view image may be used for predicting skip and direct motion vectors. On the other hand, when P-view and B-view images of different views are already encoded/decoded, the P-view and B-view images as well as the I-view image may be used. Hereinafter, the method of predicting the motion vector by using the depth image in the skip mode and the direct mode by using the neighboring blocks A, B, and C will be described.

First, the decoding apparatus according to an embodiment obtains texture information of the neighboring blocks A, B, and C of the current block Cb (S321). Since the neighboring blocks A, B, and C are earlier encoded than the current block, the encoding apparatus may obtain texture information of the neighboring blocks from encoding information of the earlier encoded neighboring blocks. The decoding apparatus may obtain the encoding information of the neighboring blocks from the bitstream that the encoding apparatus generates by performing the encoding, and obtain the texture information of the neighboring blocks from the encoding information.

Then, the decoding apparatus determines whether the neighboring blocks include disparity vectors (S322). When the neighboring block includes the disparity vector, the decoding apparatus performs motion vector prediction by applying a median filter to the disparity vectors of the neighboring blocks.

On the other hand, some of the disparity vectors required for performing the motion vector prediction may not have values. For example, the block C among the neighboring blocks A, B, and C may not have the value of the disparity vector. In this case, the decoding apparatus may generate the value of the disparity vector of the neighboring block C whose disparity vector is absent. Hereinafter, operation by which the decoding apparatus generates the value of the disparity vector of the neighboring block C will be described.

The decoding apparatus obtains a depth value of a depth block corresponding to a current block (S323). For example, the decoding apparatus may find the depth block corresponding to the current block by using mapping information of the color image block and the depth image block obtained from the bitstream. The mapping information of the color image block and the depth image block may be generated when the encoding apparatus encodes the corresponding color image block, and may be included in the bit stream. The decoding apparatus may obtain the mapping information of the color image block and the depth image block from the bitstream and obtain the depth value of the depth block representing the depth value of the current block by using the mapping information.

Then, the decoding apparatus generates the disparity vector of the current block by using the depth value (S324). The decoding apparatus may generate the disparity vector of the current block by using the depth value in the above-described manner. Then, the decoding apparatus determines a disparity vector of a block having no disparity vector by using the disparity vector of the current block (S325). For example, the decoding apparatus may determine the generated disparity vector of the current block as the disparity vector of the block C having no disparity vector.

Operations S323 to S325 of determining the disparity vector will be described in more detail. When the neighboring blocks have no disparity vectors, the decoding apparatus may convert the largest depth value into the disparity vector among the depth values within the depth block corresponding to the current block and use the disparity vector instead. When calculating the largest depth value within the depth block, the large value among some pixels in the depth block, not the entire pixels, may be used. For example, the largest depth value may be taken among depth values of four pixels located at the different corners of the rectangular depth block and pixels located at the center of the depth block. For example, any one pixel within the depth block may be used. For example, the largest depth value may be used among the depth values of the pixels included in the depth block and the neighboring blocks of the depth block. Alternatively, the largest depth value may be used among the depth values of the pixels within the upper depth block (macroblock) of the depth block in which the depth block is included. For example, the largest depth value may be used among the corner pixels within the upper depth block (macroblock) including the depth block. The decoding apparatus may convert the depth value into the disparity vector by using camera parameter information.

For example, the decoding apparatus may determine a disparity vector by using a depth value of a depth image as expressed in the following equation.

Disparity vector=($s$*depth value+$o$,0)     [Equation 1]

For convenience of description, it is assumed that y component (i.e., vertical component) of a disparity vector is 0. That is, it is assumed that a location of an object in an image is changed in only a horizontal direction according to a change of a view in a multi-view image. On the other hand, x component of the disparity vector may be calculated by multiplying a depth value by s and adding o. At this time, s is a scale factor, depth value means a depth value of a specific pixel in a depth image, and o means an offset. The scale factor and the offset may be determined from camera parameter of a referred layer image. For example, the camera parameter may include a focal length and baseline information of a camera. The baseline information of the camera means information about a distance between lenses of the camera.

The depth image may store a depth value with respect to a predetermined pixel of a layer color image. The depth value may include information about a distance between the camera and the object. For example, a maximum distance and a minimum distance in a depth image having a bit depth of 8 bits may be mapped from 0 to 255. Since a distance and a displacement of the object are inversely proportional, a displacement of each pixel may be estimated by using the depth value and an image of a new view may be virtually generated based on the estimated displacement. That is, the depth image may be used for a method of providing images of various views by synthesizing virtual views with images of less views.

For convenience, it is assumed that the y component (i.e., the vertical component) of the disparity vector is 0, but it is not limited thereto. The vertical component may have a non-zero value. In this case, the y component may be calculated in the same manner as the calculation of the x component in Equation 1.

Then, the decoding apparatus performs motion vector prediction by using a median filter (S326). The decoding apparatus may generate the motion vector by performing motion vector prediction by using the disparity vector determined using the median filter in the disparity vectors of the neighboring blocks A, B, and C.

For example, the decoding apparatus may obtain a motion vector of a block corresponding to a location of a reference image indicated by the disparity vector determined using the median filter (S327). The decoding apparatus may use the obtained motion vector as a motion vector for a skip mode and/or a direct mode (S328).

Figure 3F:
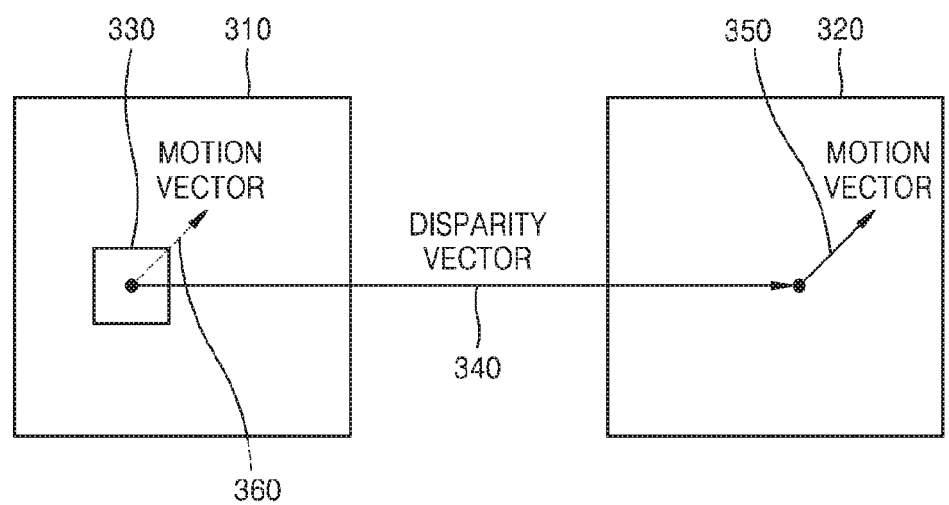
FIG. 3F is a diagram illustrating a process by which a decoding apparatus predicts a motion vector of a current block by using a disparity vector, according to an embodiment.

FIG. 3F is a diagram illustrating a process by which the decoding apparatus predicts a motion vector of a current block by using a disparity vector, according to an embodiment.

Referring to FIG. 3F, the decoding apparatus may determine a motion vector 360 of a current block 330 by using a disparity vector 340 of the current block 330 in a view image 310 of the current block 330. For example, the decoding apparatus may apply a median filter to disparity vectors of neighboring blocks so as to determine the disparity vector 340 of the current block 330. The decoding apparatus may identify a location within a reference image 320 indicated by a median-filtered disparity vector (median-filtered disparity) 340 and determine a motion vector 350 at the identified location as the motion vector 360 of the current block 330.

The decoding apparatus may use a motion vector and a reference image index of the reference block of the location indicated by the median-filtered disparity vector, as a motion vector and a reference image index of the current block in the skip and direct modes. When the median-filtered disparity vector indicates an I-view image, a block of a location indicated by the disparity vector may be found in the I-view image of the same time zone as the current image, and all motion information corresponding to the block of the location may be used for skip and direct motion vector prediction of the current block.

According to another embodiment, the decoding apparatus may use a motion vector and a reference image index of a reference block of a location indicated by a disparity vector obtained in a depth image with respect to a disparity vector of a neighboring block, without any median filter, as a motion vector and a reference image index of the current block in the skip and direct modes.

For example, the decoding apparatus may use a motion vector and a reference image index of a reference block of a location indicated by a disparity vector generated using a depth value of a depth block corresponding to a current block, as a motion vector and a reference image index of a current block in skip and direct modes.

When the disparity vector obtained in the depth image indicates an I-view image, the decoding apparatus may find a block of a location indicated by the disparity vector in the I-view image of the same time zone as the current image, and use all motion information corresponding to the block of the location for skip and direct motion vector prediction of the current block.

When a motion vector at a final location is absent, the decoding apparatus may use the motion vectors of the neighboring blocks A, B, and C of the current block, without using the I-view image. The reference image index of the current block may use the smallest index among reference image indices of the blocks A, B, and C, or may use 0 index.

When the reference indices indicate images of the same view, the decoding apparatus may use the median-filtered motion vectors of the blocks A, B, and C as the final motion vector in the skip mode and the direct mode. When the neighboring blocks have no motion vectors, the decoding apparatus generates the motion vectors of the neighboring blocks by using the depth image.

When the reference indices indicate images of different views, the decoding apparatus may use the median-filtered disparity vectors of the blocks A, B, and C as the final motion vector of the current block in the skip mode and the direct mode. When the neighboring blocks have no disparity vectors, the decoding apparatus generates the disparity vectors of the neighboring blocks by using the depth image. Except for the two cases, the decoding apparatus uses a zero vector.

Figure 3G:
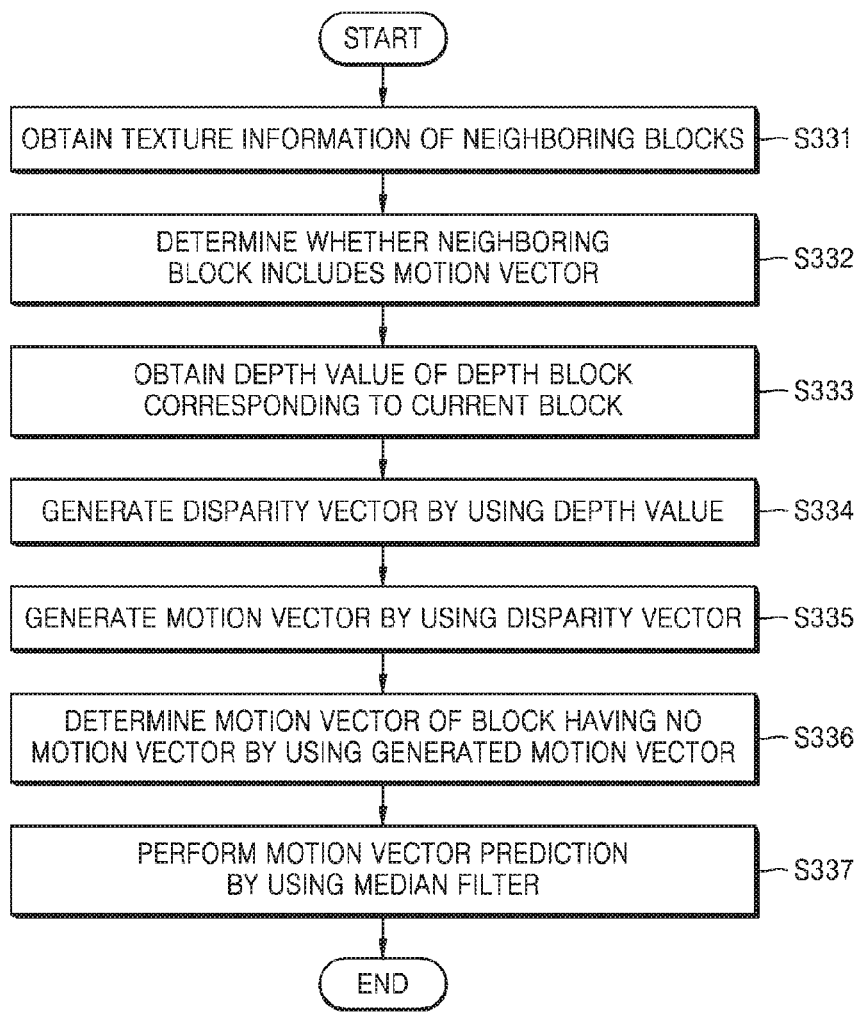
FIG. 3G is a flowchart of a method by which a decoding apparatus performs motion prediction using a depth image for an inter mode, according to an embodiment.

FIG. 3G is a flowchart of a method by which the decoding apparatus performs motion prediction by using a depth image for an inter mode, according to an embodiment.

A method by which the decoding apparatus performs motion prediction by using a depth image for an inter mode, according to an embodiment, will be described with reference to FIG. 3G. In the following, the descriptions about operations described with reference to FIG. 3E will be applied to operations corresponding to operations described with reference to FIG. 3E.

First, the decoding apparatus according to an embodiment obtains texture information of neighboring blocks of a current block (S331). For example, the decoding apparatus obtains texture information of neighboring blocks A, B, and C of a current block Cb. Since the neighboring blocks A, B, and C are earlier encoded than the current block, the encoding apparatus may obtain texture information of the neighboring blocks from encoding information of the earlier encoded neighboring blocks. The decoding apparatus may obtain the encoding information of the neighboring blocks from the bitstream that the encoding apparatus generates by performing the encoding, and obtain the texture information of the neighboring blocks from the encoding information.

Then, the decoding apparatus determines whether the neighboring blocks include motion vectors (S332). When the neighboring block includes the motion vector, the decoding apparatus uses median-filtered motion vectors of the neighboring blocks as a final prediction motion vector.

On the other hand, some of the motion vectors required for performing the motion vector prediction may not have values. For example, the block C among the neighboring blocks A, B, and C may not have the value of the motion vector. In this case, the decoding apparatus may generate the value of the motion vector of the neighboring block C whose motion vector is absent. Hereinafter, operation by which the decoding apparatus generates the value of the motion vector of the neighboring block C will be described.

The decoding apparatus may determine the motion vector found in the images of different views as the motion vector of the neighboring block having no motion vector among the neighboring blocks. In order to refer to the images of different views, the decoding apparatus obtains a depth value of a depth block corresponding to the current block (S333). Then, the decoding apparatus generates the disparity vector by using the depth value (S334). The decoding apparatus may generate the disparity vector by using the depth value in the above-described manner. Then, the decoding apparatus generates the motion vector by using the generated disparity vector (S335).

For example, the decoding apparatus may obtain a motion vector of a block corresponding to a location of a view image indicated by the generated disparity vector.

When finding the motion vector in the images of different views, the decoding apparatus may generate a disparity vector by using a maximum depth value among depth values within a depth block corresponding to the current block, and generate a motion vector by using the generated disparity vector.

The decoding apparatus may determine the maximum depth value in consideration of only some pixels within the depth block, instead of the entire pixels within the depth block. For example, the decoding apparatus may determine the maximum depth value in consideration of only depth values of four pixels belonging to different corners of the depth block and pixels of a middle location. For example, the decoding apparatus may determine the maximum depth value by using any one pixel within the depth block. For example, the decoding apparatus may determine the maximum depth value among the depth values of the pixels belonging to the depth block and the neighboring depth blocks of the depth block. For example, the decoding apparatus may determine the maximum depth value among the depth values of the pixels belonging to the upper depth block (macroblock) including the depth block corresponding to the current block. For example, the decoding apparatus may determine the maximum depth value among the depth values of the corner pixels within the upper depth block (macroblock) including the depth block corresponding to the current block. The decoding apparatus may convert the depth value into the disparity vector by using camera parameter information.

As illustrated in FIG. 3F, the decoding apparatus may directly use a motion vector (MV) of a location indicated by the disparity vector. When a reference index of the current block does not match a reference index taken from the images of different views, the decoding apparatus may use the zero vector as the motion vector. When the disparity vector converted by the depth value indicates an I-view image, the decoding apparatus may find a location indicated by the disparity vector in the I-view image of the same time zone as the current image, and may perform motion vector prediction of the current block by using all motion information corresponding to the found location. When the motion vector is not found, the decoding apparatus may determine the zero vector as the motion vector.

Then, the decoding apparatus determines a motion vector of a block having no motion vector by using the generated motion vector (S336). For example, the decoding apparatus may determine the generated motion vector as the motion vector of the neighboring block C.

Then, the decoding apparatus performs motion vector prediction by using a median filter (S336). The decoding apparatus may apply a median filter to the motion vectors of the neighboring blocks A, B, and C and determine the median-filtered motion vectors as the final prediction motion vector. In order to find the final motion vector, the prediction motion vector provides an initial point during motion estimation with respect to an inter mode. For example, the encoding apparatus may encode the motion vector of the current block Cb based on the value of the median-filtered motion vector. The encoding apparatus may determine a difference between the motion vector value of the current block Cb and the value of the median-filtered motion vector as a residual of the motion vector value and transmit a residual vector to the decoding apparatus. The decoding apparatus may decode the motion vector of the current block Cb based on the value of the median-filtered motion vector. The decoding apparatus may determine the motion vector value of the current block Cb by adding the residual vector transmitted by the encoding apparatus to the value of the median-filtered motion vector.

Figure 3H:
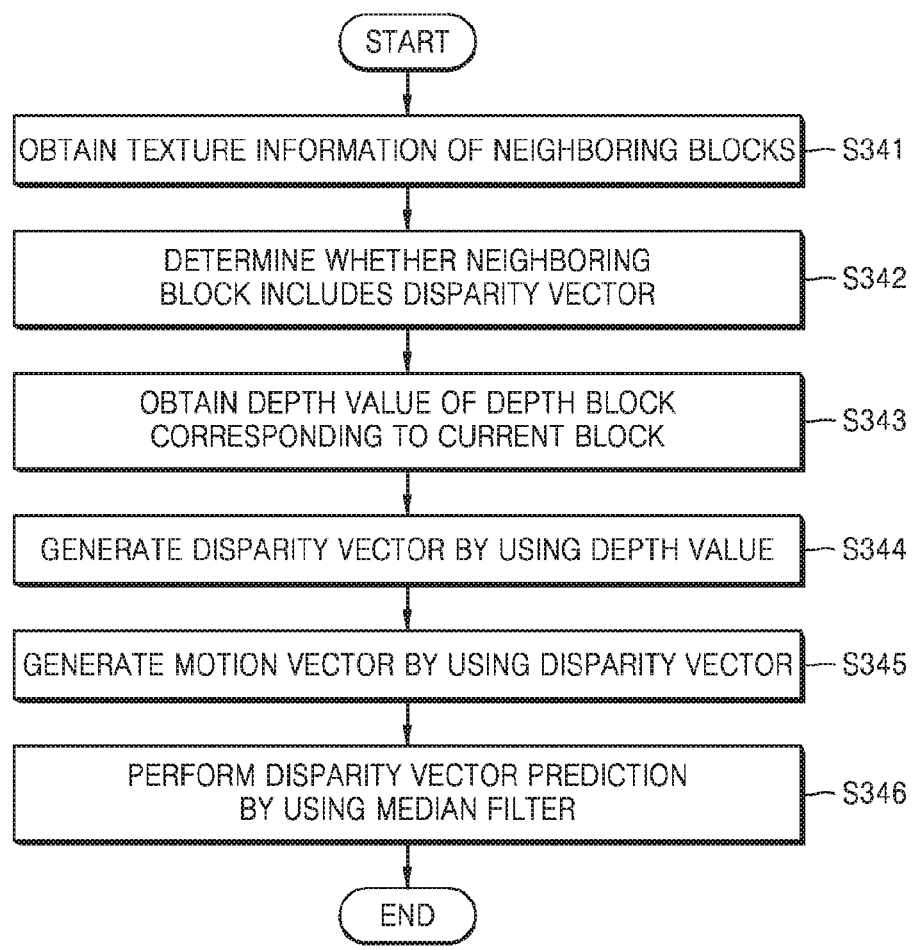
FIG. 3H is a diagram for describing a method by which a decoding apparatus predicts a disparity vector (inter-view MV) using a depth image for an inter mode, according to an embodiment.

FIG. 3H is a diagram for describing a method by which the decoding apparatus predicts a disparity vector (inter-view MV) using a depth image for an inter mode, according to an embodiment.

A method by which the decoding apparatus predicts a disparity vector (inter-view MV) using a depth image for an inter mode, according to an embodiment, will be described with reference to FIG. 3H.

First, the decoding apparatus according to an embodiment obtains texture information of neighboring blocks of a current block (S341). For example, the decoding apparatus may obtain texture information of neighboring blocks A, B, and C of a current block Cb. Since the neighboring blocks A, B, and C are earlier encoded than the current block, the encoding apparatus may obtain texture information of the neighboring blocks from encoding information of the earlier encoded neighboring blocks. The decoding apparatus may obtain the encoding information of the neighboring blocks from a bitstream that the encoding apparatus generates by performing the encoding, and obtain the texture information of the neighboring blocks from the encoding information.

Then, the decoding apparatus determines whether the neighboring blocks include disparity vectors (S342). When the neighboring block includes the disparity vector, the decoding apparatus may omit operations S343, S344, and S345 and perform disparity vector prediction by applying a median filter to the disparity vectors of the neighboring blocks (S356). For example, when the neighboring blocks are blocks A, B, and C, the decoding apparatus may predict the disparity vector of the current block Cb by performing median filtering on the disparity vectors of the blocks A, B, and C and determining the median-filtered vector as the final prediction disparity vector.

On the other hand, some of the disparity vectors required for performing the disparity vector prediction may not have values. For example, the block C among the neighboring blocks A, B, and C may not have the value of the disparity vector. In this case, the decoding apparatus may generate the value of the disparity vector of the neighboring block C whose disparity vector is absent. Hereinafter, operation by which the decoding apparatus generates the value of the disparity vector of the neighboring block C will be described.

The decoding apparatus obtains a depth value of a depth block corresponding to a current block (S343). Then, the decoding apparatus generates the disparity vector by using the depth value (S344). The decoding apparatus may generate the disparity vector by using the depth value in the above-described manner. Then, the decoding apparatus determines a disparity vector of a block having no disparity vector by using the generated disparity vector (S345). For example, the decoding apparatus may determine the generated disparity vector as the disparity vector of the block C having no disparity vector.

Operations S343 to S345 of determining the disparity vector will be described in more detail. When the neighboring blocks have no disparity vectors, the decoding apparatus may convert the largest depth value into the disparity vector among the depth values within the depth block corresponding to the current block and use the disparity vector instead. When calculating the largest depth value within the depth block, the large value among some pixels in the depth block, not the entire pixels, may be used. For example, the largest depth value may be taken among depth values of four pixels located at the different corners of the rectangular depth block and pixels located at the center of the depth block. For example, any one pixel within the depth block may be used. For example, the largest depth value may be used among the depth values of the pixels included in the depth block and the neighboring blocks of the depth block. Alternatively, the largest depth value may be used among the depth values of the pixels within the upper depth block (macroblock) of the depth block in which the depth block is included. For example, the largest depth value may be used among the corner pixels within the upper depth block (macroblock) including the depth block. The decoding apparatus may convert the depth value into the disparity vector by using camera parameter information.

Then, the decoding apparatus performs disparity vector prediction by using a median filter (S346). The decoding apparatus may determine the final prediction disparity vector of the current block by using a median filter in the disparity vectors of the neighboring blocks A, B, and C. In order to find the disparity vector of the current block, the prediction disparity vector provides an initial point during disparity estimation with respect to an inter mode. The decoding apparatus may perform inter-view mode prediction on the current block Cb by using the obtained final prediction disparity vector.

For example, the encoding apparatus may encode the disparity vector of the current block Cb based on the value of the median-filtered disparity vector. The encoding apparatus may determine a difference between the disparity vector value of the current block Cb and the value of the median-filtered disparity vector as a residual of the disparity vector value and transmit a residual vector to the decoding apparatus. The decoding apparatus may decode the disparity vector of the current block Cb based on the value of the median-filtered disparity vector. The decoding apparatus may determine the disparity vector value of the current block Cb by adding the residual vector transmitted by the encoding apparatus to the value of the median-filtered disparity vector.

Figure 4A:
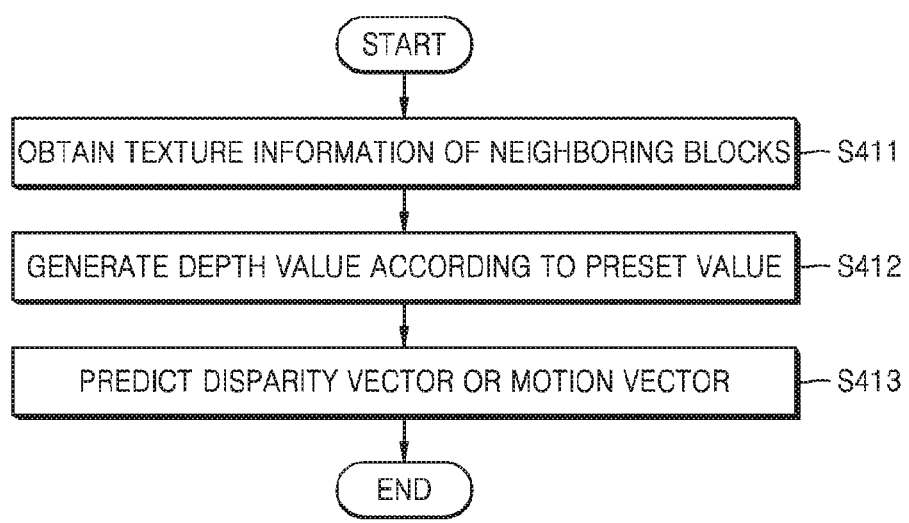
FIG. 4A is a flowchart of a method by which a decoding apparatus performs motion and disparity vector prediction when a depth image is absent, according to an embodiment.

FIG. 4A is a flowchart of a method by which the decoding apparatus performs motion and disparity vector prediction when a depth image is absent, according to an embodiment.

In order to perform motion and disparity vector prediction when a depth image is absent, the decoding apparatus according to an embodiment obtains texture information of neighboring blocks (S411), generates a depth value according to a preset value (S412), and predicts a disparity vector or predicts a motion vector by using the texture information of the neighboring blocks and the generated depth value (S413).

When a depth image block corresponding to a current block is absent, the decoding apparatus according to an embodiment may use the depth value determined as an arbitrary value when the motion and disparity vector prediction of the current block is performed.

Figure 4B:
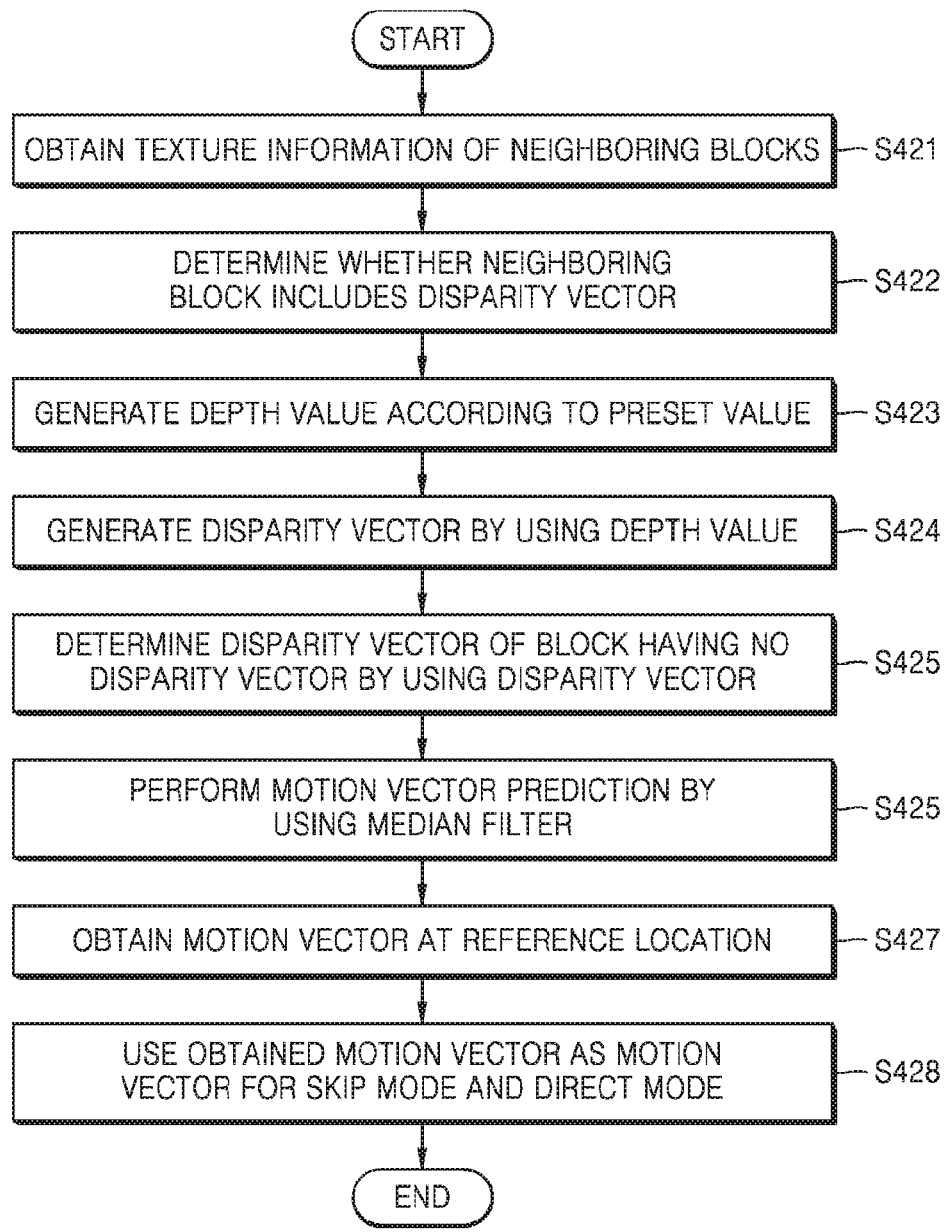
FIG. 4B is a diagram for describing a method by which a decoding apparatus performs motion vector prediction using depth images with respect to a skip mode and a direct mode, according to an embodiment.

FIG. 4B is a diagram for describing a method by which the decoding apparatus performs motion vector prediction using depth images for a skip mode and a direct mode, according to an embodiment. When encoding/decoding P-view images and B-view images, an I-view image being in the same time zone is already encoded/decoded, and thus, information of the already encoded/decoded I-view image may be used for predicting skip and direct motion vectors. On the other hand, when P-view and B-view images of different views are already encoded/decoded, the P-view and B-view images as well as the I-view image may be used. Hereinafter, in a case where the depth image is absent, the method by which the decoding apparatus predicts the motion vector in the skip mode and the direct mode by using the neighboring blocks A, B, and C will be described.

First, the decoding apparatus according to an embodiment obtains texture information of the neighboring blocks A, B, and C of the current block Cb (S421). Since the neighboring blocks A, B, and C are earlier encoded than the current block, the encoding apparatus may obtain texture information of the neighboring blocks from encoding information of the earlier encoded neighboring blocks. The decoding apparatus may obtain the encoding information of the neighboring blocks from a bitstream that the encoding apparatus generates by performing the encoding, and obtain the texture information of the neighboring blocks from the encoding information.

Then, the decoding apparatus determines whether the neighboring blocks include disparity vectors (S422). When the neighboring block includes the disparity vector, the decoding apparatus perform motion vector prediction by applying a median filter to the disparity vectors of the neighboring blocks.

For example, the decoding apparatus may use a motion vector and/or reference index information of a block of a location indicated by the median-filtered disparity vectors of the neighboring blocks, as a motion vector and reference index information of the current block.

On the other hand, some of the disparity vectors required for performing the motion vector prediction may not have values. For example, the block C among the neighboring blocks A, B, and C may not have the value of the disparity vector. In this case, the decoding apparatus may generate the value of the disparity vector of the neighboring block C whose disparity vector is absent. Hereinafter, operation by which the decoding apparatus generates the value of the disparity vector of the neighboring block C will be described.

The decoding apparatus generates a depth value according to a preset value (S423). Then, the decoding apparatus generates a disparity vector by using the generated depth value (S424). For example, the decoding apparatus sets a depth pixel value to 128 when the preset value is 128, and generates the disparity vector by using the set depth pixel value. The decoding apparatus perform motion vector prediction of the current block by using the generated disparity vector. The preset value may be 0 or a maximum depth pixel value that is expressible by a pixel.

The decoding apparatus may generate the disparity vector of the current block by using the depth value in the above-described manner. For example, the decoding apparatus may convert the depth value into the disparity vector by using camera parameter information.

Then, the decoding apparatus determines a disparity vector of a block having no disparity vector by using the generated disparity vector (S425). For example, the decoding apparatus may determine the generated disparity vector as the disparity vector of the block C having no disparity vector.

Then, the decoding apparatus performs motion vector prediction by using a median filter (S426). The decoding apparatus may generate the motion vector by performing motion vector prediction by using the disparity vector determined using the median filter in the disparity vectors of the neighboring blocks A, B, and C.

For example, the decoding apparatus may obtain a motion vector of a block corresponding to a location of a reference image indicated by the disparity vector determined using the median filter (S427). The decoding apparatus may use the obtained motion vector as a motion vector for a skip mode and/or a direct mode (S428).

The decoding apparatus may determine motion information used during the skip and direct motion vector prediction of the current block by the method described above with reference to FIG. 3F. For example, the decoding apparatus may apply a median filter to the disparity vectors of the neighboring blocks so as to determine the disparity vector of the current block. The decoding apparatus may identify a location within a reference image indicated by a median-filtered disparity vector (median-filtered disparity) and determine a motion vector at the identified location as the motion vector of the current block.

The decoding apparatus may use a motion vector and a reference image index of the reference block of the location indicated by the median-filtered disparity vector, as a motion vector and a reference image index of the current block in the skip and direct modes.

When the median-filtered disparity vector indicates an I-view image, a location indicated by the disparity vector may be found in the I-view image of the same time zone as the current image, and all motion information corresponding to the location may be used for current block skip and direct motion vector prediction.

According to another embodiment, the decoding apparatus may use a motion vector and a reference image index of a reference block of a location indicated by a disparity vector obtained in a depth image with respect to a disparity vector of a neighboring block, without any median filter, as a motion vector and a reference image index of a current block in skip and direct modes.

For example, the decoding apparatus may use a motion vector and a reference image index of a reference block of a location indicated by a disparity vector generated using a preset depth value, as a motion vector and a reference image index of a current block in skip and direct modes.

When the disparity vector obtained in the depth image indicates an I-view image, the decoding apparatus may find a block of a location indicated by the disparity vector in the I-view image of the same time zone as the current image, and use all motion information corresponding to the block of the location for current block skip and direct motion vector prediction.

When a motion vector at a final location is absent, the decoding apparatus may use the motion vectors of the neighboring blocks A, B, and C of the current block, without using the I-view image. The reference image index of the current block may use the smallest index among reference image indices of the blocks A, B, and C, or may use 0 index.

When the reference indices indicate images of the same view, the decoding apparatus may use the median-filtered motion vectors of the blocks A, B, and C as the final motion vector in the skip mode and the direct mode. When the neighboring block has no motion vector, the decoding apparatus generates the motion vector by using the depth image. The decoding apparatus may predict the motion vector by using a motion vector predicting method to be described below with reference to FIG. 4C.

When the reference indices indicate images of different views, the decoding apparatus may use the median-filtered disparity vectors of the blocks A, B, and C as the final motion vector of the current block in the skip mode and the direct mode. When the neighboring block has the motion vector, the decoding apparatus generates the disparity vector by using the depth image. The decoding apparatus may predict the disparity vector by using a disparity vector predicting method to be described below with reference to FIG. 4D. Except for the two cases, the decoding apparatus uses a zero vector.

Figure 4C:
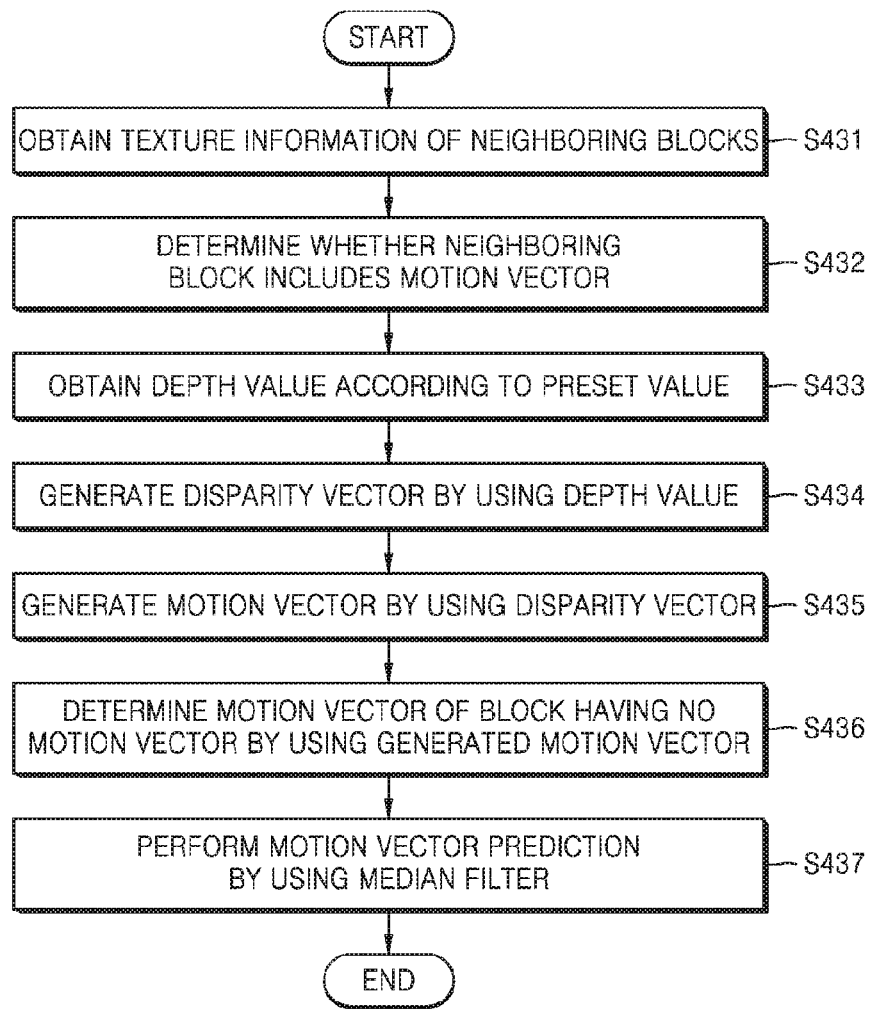
FIG. 4C is a flowchart of a method by which a decoding apparatus performs motion prediction without using a depth image for an inter mode, according to an embodiment.

FIG. 4C is a flowchart of a method by which the decoding apparatus performs motion prediction without using a depth image for an inter mode, according to an embodiment.

A method by which the decoding apparatus performs motion prediction without using a depth image for an inter mode, according to an embodiment, will be described with reference to FIG. 4C.

First, the decoding apparatus according to an embodiment obtains texture information of neighboring blocks of a current block (S431). For example, the decoding apparatus obtains texture information of neighboring blocks A, B, and C of a current block Cb. Since the neighboring blocks A, B, and C are earlier encoded than the current block, the encoding apparatus may obtain texture information of the neighboring blocks from encoding information of the earlier encoded neighboring blocks. The decoding apparatus may obtain the encoding information of the neighboring blocks from a bitstream that the encoding apparatus generates by performing the encoding, and obtain the texture information of the neighboring blocks from the encoding information.

Then, the decoding apparatus determines whether the neighboring blocks include motion vectors (S432). When the neighboring block includes the motion vector, the decoding apparatus uses median-filtered motion vectors of the neighboring blocks as a final prediction motion vector.

On the other hand, some of the motion vectors required for performing the motion vector prediction may not have values. For example, the block C among the neighboring blocks A, B, and C may not have the value of the motion vector. In this case, the decoding apparatus may generate the value of the motion vector of the neighboring block C whose motion vector is absent. Hereinafter, operation by which the decoding apparatus generates the value of the motion vector of the neighboring block C will be described.

The decoding apparatus may determine the motion vector found in the images of different views as the motion vector of the neighboring block having no motion vector among the neighboring blocks.

The decoding apparatus generates a depth value by using a preset value (S433). The preset value may be 0, 128, or a maximum depth value that is expressible by a depth pixel.

Then, the decoding apparatus generates the disparity vector by using the depth value (S434). The decoding apparatus may generate the disparity vector by using the depth value in the above-described manner. For example, the decoding apparatus may set a depth value to 128 when the preset value is 128, and generate the disparity vector according to the depth value. When the disparity vector is generated by converting the depth value into the disparity vector, the decoding apparatus may use camera parameter information.

Then, the decoding apparatus generates the motion vector by using the generated disparity vector (S435). For example, the decoding apparatus may obtain a motion vector of a block corresponding to a location of a view image indicated by the generated disparity vector.

As illustrated in FIG. 3F, the decoding apparatus may use a motion vector (MV) of a location indicated by the disparity vector. When a reference index of the current block does not match a reference index taken from the images of different views, the decoding apparatus may use a zero vector. When the disparity vector converted by the depth value indicates an I-view image, the decoding apparatus may find a location indicated by the disparity vector in the I-view image of the same time zone as the current image, and may perform motion vector prediction of the current block by using all motion information corresponding to the found location. When the motion vector is not found, the decoding apparatus may determine the zero vector as the motion vector.

Then, the decoding apparatus determines a motion vector of a block having no motion vector by using the generated motion vector (S436). For example, the decoding apparatus may determine the generated motion vector as the motion vector of the neighboring block C.

Then, the decoding apparatus performs motion vector prediction by using a median filter (S437). The decoding apparatus may apply a median filter to the motion vectors of the neighboring blocks A, B, and C and determine the median-filtered motion vectors as the final prediction motion vector. In order to find the final motion vector, the prediction motion vector provides an initial point during motion estimation with respect to an inter mode. For example, the encoding apparatus may encode the motion vector of the current block Cb based on the value of the median-filtered motion vector. The encoding apparatus may determine a difference between the motion vector value of the current block Cb and the value of the median-filtered motion vector as a residual of the motion vector value and transmit a residual vector to the decoding apparatus. The decoding apparatus may decode the motion vector of the current block Cb based on the value of the median-filtered motion vector. The decoding apparatus may determine the motion vector value of the current block Cb by adding the residual vector transmitted by the encoding apparatus to the value of the median-filtered motion vector.

Figure 4D:
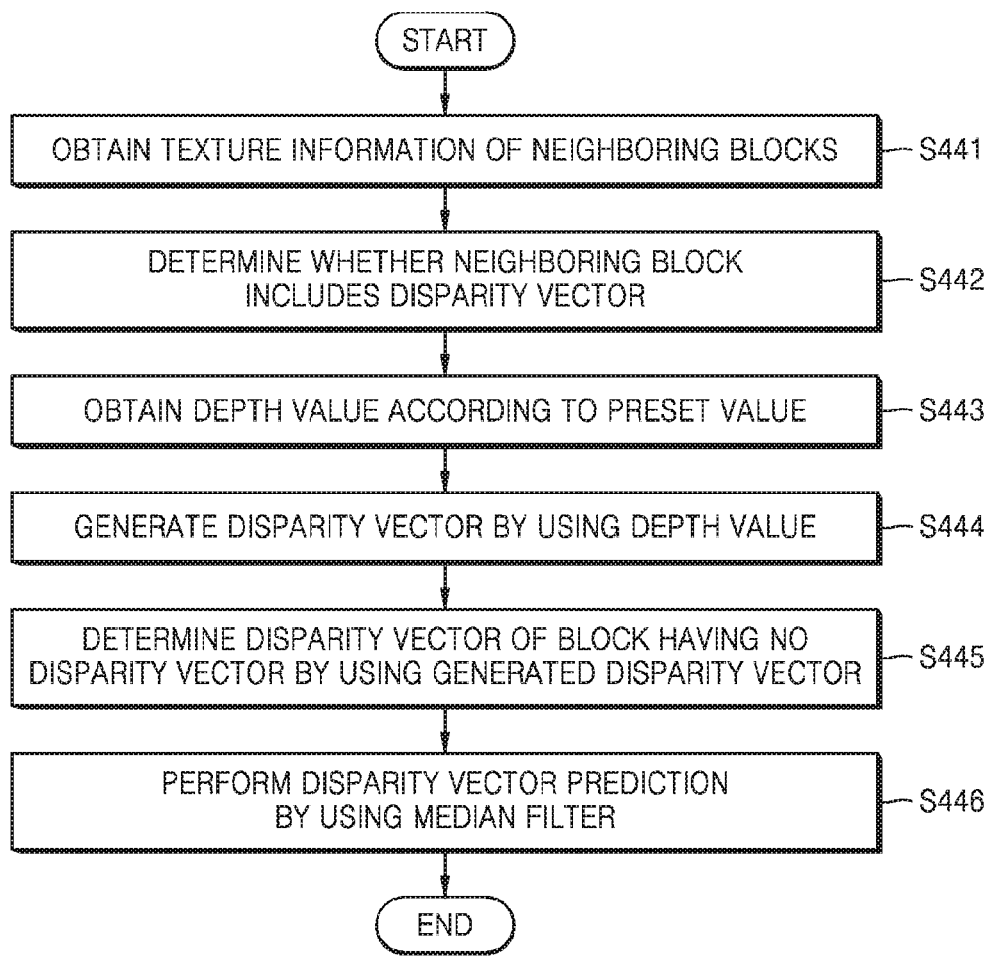
FIG. 4D is a diagram for describing a method by which a decoding apparatus predicts a disparity vector (inter-view MV) for an inter mode without using a depth image, according to an embodiment.

FIG. 4D is a diagram for describing a method by which the decoding apparatus predicts a disparity vector (inter-view MV) for an inter mode without using a depth image, according to an embodiment.

A method by which the decoding apparatus predicts a disparity vector (inter-view MV) for an inter mode without using a depth image, according to an embodiment, will be described with reference to FIG. 4D.

First, the decoding apparatus according to an embodiment obtains texture information of neighboring blocks of a current block (S441). For example, the decoding apparatus may obtain texture information of neighboring blocks A, B, and C of a current block Cb. Since the neighboring blocks A, B, and C are earlier encoded than the current block, the encoding apparatus may obtain texture information of the neighboring blocks from encoding information of the earlier encoded neighboring blocks. The decoding apparatus may obtain the encoding information of the neighboring blocks from a bitstream that the encoding apparatus generates by performing the encoding, and obtain the texture information of the neighboring blocks from the encoding information.

Then, the decoding apparatus determines whether the neighboring blocks include disparity vectors (S442). When the neighboring block includes the disparity vector, the decoding apparatus may omit operations S443, S444, and S445 and perform disparity vector prediction by applying a median filter to the disparity vectors of the neighboring blocks (S446). For example, when the neighboring blocks are blocks A, B, and C, the decoding apparatus may predict the disparity vector of the current block Cb by performing median filtering on the disparity vectors of the blocks A, B, and C and determining the median-filtered vector as the final prediction disparity vector.

On the other hand, some of the disparity vectors required for performing the disparity vector prediction may not have values. For example, the block C among the neighboring blocks A, B, and C may not have the value of the disparity vector. In this case, the decoding apparatus may generate the value of the disparity vector of the neighboring block C whose disparity vector is absent. Hereinafter, operation by which the decoding apparatus generates the value of the disparity vector of the neighboring block C will be described. The decoding apparatus generates a depth value by using a preset value (S443). The preset value may be 0, 128, or a maximum depth value that is expressible by a depth pixel.

Then, the decoding apparatus generates the disparity vector by using the depth value (S444). The decoding apparatus may generate the disparity vector by using the depth value in the above-described manner. For example, the decoding apparatus may set a depth value to 128 when the preset value is 128, and generate the disparity vector according to the depth value. When the disparity vector is generated by converting the depth value into the disparity vector, the decoding apparatus may use camera parameter information.

Then, the decoding apparatus determines a disparity vector of a block having no disparity vector by using the generated disparity vector (S445). For example, the decoding apparatus may determine the generated disparity vector as the disparity vector of the block C having no disparity vector.

Then, the decoding apparatus performs disparity vector prediction by using a median filter (S446). The decoding apparatus may determine the final prediction disparity vector of the current block by using a median filter in the disparity vectors of the neighboring blocks A, B, and C. In order to find the disparity vector of the current block, the prediction disparity vector provides an initial point during disparity estimation with respect to an inter mode. The decoding apparatus may perform inter-view mode prediction on the current block Cb by using the obtained final prediction disparity vector.

For example, the encoding apparatus may encode the disparity vector of the current block Cb based on the value of the median-filtered disparity vector. The encoding apparatus may determine a difference between the disparity vector value of the current block Cb and the value of the median-filtered disparity vector as a residual of the disparity vector value and transmit a residual vector to the decoding apparatus. The decoding apparatus may decode the disparity vector of the current block Cb based on the value of the median-filtered disparity vector. The decoding apparatus may determine the disparity vector value of the current block Cb by adding the residual vector transmitted by the encoding apparatus to the value of the median-filtered disparity vector.

Figure 5A:
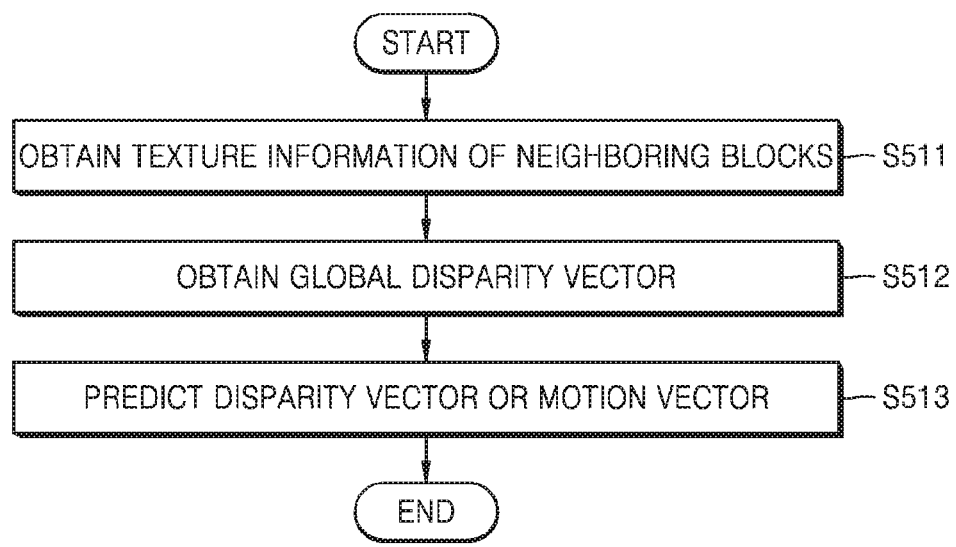
FIG. 5A is a flowchart of a method by which a decoding apparatus performs motion and disparity vector prediction when a depth image is not present, according to an embodiment.

FIG. 5A is a flowchart of a method by which the decoding apparatus performs motion and disparity vector prediction when a depth image is absent, according to an embodiment.

In order to perform motion and disparity vector prediction when a depth image is absent, the decoding apparatus according to an embodiment obtains texture information of neighboring blocks (S511), generates a global disparity vector (S512), and predicts a disparity vector or predicts a motion vector by using the texture information of the neighboring blocks and the generated global disparity vector (S513).

In the present specification, the global disparity vector is a disparity vector decoded before a current block is decoded, and may be a disparity vector of a block or a picture decoded before the current block is decoded. Similarly, the global disparity vector is a disparity vector encoded before the current block is encoded, and may be a disparity vector of a block or a picture encoded before the current block is encoded. The global disparity vector may be included in a header of a sequence level, a header of a picture level, or a header of a slice level. The decoding apparatus may generate the disparity vector by the method used by the encoding apparatus.

When a depth image block corresponding to a current block is absent, the decoding apparatus according to an embodiment may obtain a global disparity vector and use the obtained vector when the motion and disparity vector prediction of the current block is performed.

Figure 5B:
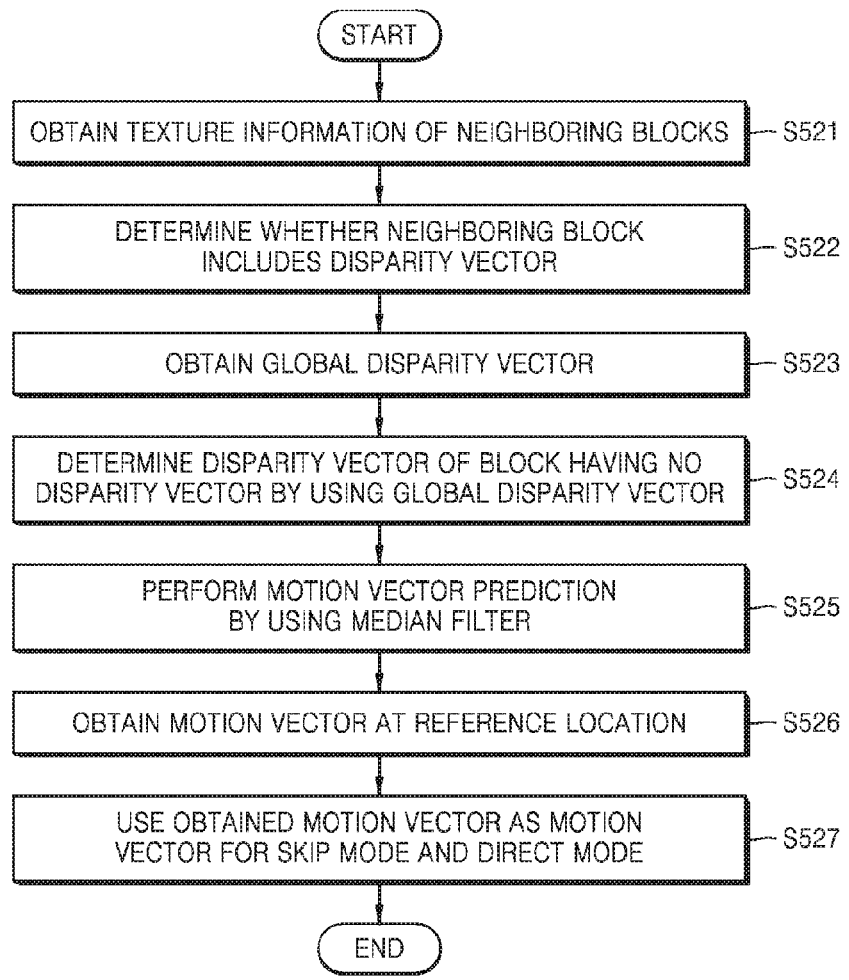
FIG. 5B is a diagram for describing a method by which a decoding apparatus performs motion vector prediction with respect to a skip mode and a direct mode by using a global disparity vector, according to an embodiment.

FIG. 5B is a diagram for describing a method by which the decoding apparatus performs motion vector prediction for a skip mode and a direct mode by using a global disparity vector, according to an embodiment.

When encoding/decoding P-view images and B-view images, an I-view image being in the same time zone is already encoded/decoded, and thus, information of the already encoded/decoded I-view image may be used for predicting skip and direct motion vectors. On the other hand, when P-view and B-view images of different views are already encoded/decoded, the P-view and B-view images as well as the I-view image may be used. Hereinafter, the method by which the decoding apparatus predicts the motion vector in the skip mode and the direct mode by using the neighboring blocks A, B, and C will be described.

First, the decoding apparatus according to an embodiment obtains texture information of the neighboring blocks A, B, and C of the current block Cb (S521). Since the neighboring blocks A, B, and C are earlier encoded than the current block, the encoding apparatus may obtain texture information of the neighboring blocks from encoding information of the earlier encoded neighboring blocks. The decoding apparatus may obtain the encoding information of the neighboring blocks from a bitstream that the encoding apparatus generates by performing the encoding, and obtain the texture information of the neighboring blocks from the encoding information.

Then, the decoding apparatus determines whether the neighboring blocks include disparity vectors (S522). When the neighboring block includes the disparity vector, the decoding apparatus perform motion vector prediction by applying a median filter to the disparity vectors of the neighboring blocks.

For example, the decoding apparatus may use a motion vector and/or reference index information of a block of a location indicated by the median-filtered disparity vectors of the neighboring blocks, as a motion vector and reference index information of the current block.

On the other hand, some of the disparity vectors required for performing the motion vector prediction may be absent. For example, the block C among the neighboring blocks A, B, and C may not have the disparity vector. In this case, the decoding apparatus may obtain a global disparity vector (S523) and determine the global disparity vector as the disparity vector of the neighboring block C whose disparity vector is absent (S524).

An example of determining the global disparity vector as the disparity vector of the neighboring block C whose disparity vector is absent will be described. For example, the decoding apparatus may use a zero disparity vector as the disparity vector of the neighboring block C. The decoding apparatus may use a disparity vector encoded/decoded in a previous block or a previous frame as the disparity vector of the neighboring block C. The decoding apparatus may use an average disparity vector as the disparity vector of the neighboring block C, the average disparity vector being determined by averaging a plurality of disparity vectors encoded/decoded in the previous block or the previous frame. The decoding apparatus may use a disparity vector having a maximum disparity value among disparity vectors encoded/decoded in the previous block or the previous block, as the disparity vector of the neighboring block C. The decoding apparatus may use a disparity vector having a medium value among a plurality of disparity vectors encoded/decoded in the previous block or the previous block, as the disparity vector of the neighboring block C.

In addition, the decoding apparatus may use a disparity vector obtained through block matching with images of different views as the disparity vector of the neighboring block C. The block matching is a method of finding a block whose block value is most similar to a specific block by comparing the specific block with a plurality of blocks.

In addition, the decoding apparatus may use a disparity vector most recently encoded/decoded in a previous block or frame as the disparity vector of the neighboring block C. The decoding apparatus may use a disparity vector most recently encoded/decoded among disparity vectors of previous blocks located on the left of the current block as the disparity vector of the neighboring block C. At this time, when there is no disparity vector most recently encoded/decoded, the decoding apparatus may use a zero disparity vector. On the other hand, when there is no disparity vector most recently encoded/decoded in a previous block or frame, the decoding apparatus may use any disparity vector as the disparity vector of the neighboring block C. In addition, as described above, the decoding apparatus may convert any depth value into a disparity vector by using camera parameter information and use the disparity vector as the disparity vector of the neighboring block C.

Then, the decoding apparatus performs motion vector prediction by using a median filter (S525). The decoding apparatus may generate the motion vector by performing motion vector prediction by using the disparity vector determined using the median filter in the disparity vectors of the neighboring blocks A, B, and C.

For example, the decoding apparatus may obtain a motion vector of a block corresponding to a location of a reference image indicated by the disparity vector determined using the median filter (S526). The decoding apparatus may use the obtained motion vector as a motion vector for a skip mode and/or a direct mode (S527).

The decoding apparatus may determine motion information used during the skip and direct motion vector prediction of the current block by the method described above with reference to FIG. 3F. For example, the decoding apparatus may apply a median filter to the disparity vectors of the neighboring blocks so as to determine the disparity vector of the current block. The decoding apparatus may identify a location within a reference image indicated by a median-filtered disparity vector (median-filtered disparity) and determine a motion vector at the identified location as the motion vector of the current block.

The decoding apparatus may use a motion vector and a reference image index of the reference block of the location indicated by the median-filtered disparity vector, as a motion vector and a reference image index of the current block in the skip and direct modes.

When the median-filtered disparity vector indicates an I-view image, a location indicated by the disparity vector may be found in the I-view image of the same time zone as the current image, and all motion information corresponding to the block of the location may be used for skip and direct motion vector prediction of the current block.

According to another embodiment, the decoding apparatus may use a motion vector and a reference image index of a reference block of a location indicated by a global disparity vector obtained with respect to a disparity vector of a neighboring block, without any median filter, as a motion vector and a reference image index of a current block in skip and direct modes.

For example, the decoding apparatus may select one global disparity vector from among the above-described global disparity vectors and use a motion vector and a reference image index of a reference block of a location indicated by the selected global disparity vector, as a motion vector and a reference image index of a current block in skip and direct modes.

When the global disparity vector indicates an I-view image, the decoding apparatus may find a block of a location indicated by the global disparity vector in the I-view image of the same time zone as the current image, and use all motion information corresponding to the block of the location for skip and direct motion vector prediction of the current block.

When a motion vector at a final location is absent, the decoding apparatus may use the motion vectors of the neighboring blocks A, B, and C of the current block, without using the I-view image. The reference image index of the current block may use the smallest index among reference image indices of the blocks A, B, and C, or may use 0 index.

When the reference indices indicate images of the same view, the decoding apparatus may use the median-filtered motion vectors of the blocks A, B, and C as the final motion vector in the skip mode and the direct mode. When the neighboring block has no motion vector, the decoding apparatus generates the motion vector by using the depth image. The decoding apparatus may predict the motion vector by using a motion vector predicting method to be described below with reference to FIG. 5C.

When the reference indices indicate images of different views, the decoding apparatus may use the median-filtered disparity vectors of the blocks A, B, and C as the final motion vector of the current block in the skip mode and the direct mode. When the neighboring block has the motion vector, the decoding apparatus generates the disparity vector by using the depth image. The decoding apparatus may predict the disparity vector by using a disparity vector predicting method to be described below with reference to FIG. 5D. Except for the two cases, the decoding apparatus uses a zero vector.

Figure 5C:
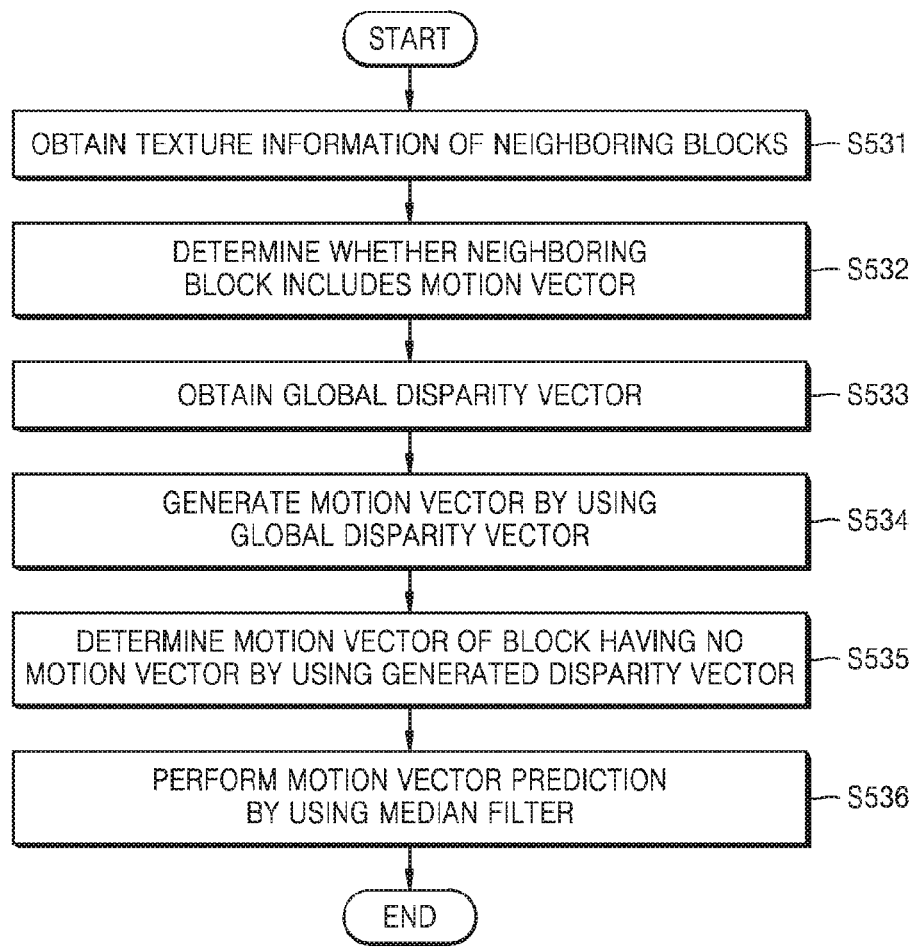
FIG. 5C is a flowchart of a method by which a decoding apparatus performs motion prediction without using a depth image for an inter mode, according to an embodiment.

FIG. 5C is a flowchart of a method by which the decoding apparatus performs motion prediction without using a depth image for an inter mode, according to an embodiment.

A method by which the decoding apparatus performs motion prediction without using a depth image for an inter mode, according to an embodiment, will be described with reference to FIG. 5C.

First, the decoding apparatus according to an embodiment obtains texture information of neighboring blocks of a current block (S531). For example, the decoding apparatus obtains texture information of neighboring blocks A, B, and C of a current block Cb. Since the neighboring blocks A, B, and C are earlier encoded than the current block, the encoding apparatus may obtain texture information of the neighboring blocks from encoding information of the earlier encoded neighboring blocks. The decoding apparatus may obtain the encoding information of the neighboring blocks from a bitstream that the encoding apparatus generates by performing the encoding, and obtain the texture information of the neighboring blocks from the encoding information.

Then, the decoding apparatus determines whether the neighboring blocks include motion vectors (S532). When the neighboring block includes the motion vector, the decoding apparatus uses median-filtered motion vectors of the neighboring blocks as a final prediction motion vector.

On the other hand, some of the motion vectors required for performing the motion vector prediction may not have values. For example, the block C among the neighboring blocks A, B, and C may not have the value of the motion vector. In this case, the decoding apparatus may generate the value of the motion vector of the neighboring block C whose motion vector is absent. Hereinafter, operation by which the decoding apparatus generates the value of the motion vector of the neighboring block C will be described.

The decoding apparatus may determine the motion vector found in the images of different views as the motion vector of the neighboring block having no motion vector among the neighboring blocks.

The decoding apparatus obtains a global disparity vector for finding a motion vector at a different view by using the obtained global disparity vector (S533). The decoding apparatus may determine the global disparity vector as follows. For example, the decoding apparatus may determine a zero disparity vector as the global disparity vector. The decoding apparatus may determine a disparity vector encoded/decoded in a previous block or a previous frame as the global disparity vector. The decoding apparatus may determine an average disparity vector as the global disparity vector, the average disparity vector being determined by averaging a plurality of disparity vectors encoded/decoded in a previous block or a previous frame. The decoding apparatus may determine a disparity vector, which has a maximum disparity value among disparity vectors encoded/decoded in a previous block or a previous frame, as the global disparity vector. The decoding apparatus may determine a disparity vector, which has a medium value among a plurality of disparity vectors encoded/decoded in a previous block or a previous frame, as the global disparity vector.

In addition, the decoding apparatus may determine a disparity vector obtained through block matching with images of different views as the global disparity vector. The block matching is a method of finding a block whose block value is most similar to a specific block by comparing the specific block with a plurality of blocks.

In addition, the decoding apparatus may determine a disparity vector most recently encoded/decoded in a previous block or frame as the global disparity vector. The decoding apparatus may determine a disparity vector, which is most recently encoded/decoded among disparity vectors of previous blocks located on the left of the current block, as the global disparity vector. At this time, when there is no disparity vector most recently encoded/decoded, the decoding apparatus may determine a zero disparity vector as the global disparity vector. On the other hand, when there is no disparity vector most recently encoded/decoded, the decoding apparatus may determine any disparity vector as the global disparity vector. In addition, as described above, the decoding apparatus may convert any depth value into a disparity vector by using camera parameter information and use the disparity vector as the global disparity vector.

Then, the decoding apparatus determines the motion vector by using the global disparity vector (S534). For example, the decoding apparatus may obtain a motion vector of a block corresponding to a location of a view image indicated by the global disparity vector.

As illustrated in FIG. 3F, the decoding apparatus may use a motion vector (MV) of a location indicated by the disparity vector. When a reference index of the current block does not match a reference index taken from the images of different views, the decoding apparatus may use a zero vector. When the disparity vector converted by the depth value indicates an I-view image, the decoding apparatus may find a location indicated by the disparity vector in the I-view image of the same time zone as the current image, and may perform motion vector prediction of the current block by using all motion information corresponding to the found location. When the motion vector is not found, the decoding apparatus may determine the zero vector as the motion vector.

Then, the decoding apparatus determines a motion vector of a block having no motion vector by using the generated motion vector (S535). For example, the decoding apparatus may determine the generated motion vector as the motion vector of the neighboring block C.

Then, the decoding apparatus performs motion vector prediction by using a median filter (S536). The decoding apparatus may apply a median filter to the motion vectors of the neighboring blocks A, B, and C and determine the median-filtered motion vectors as the final prediction motion vector. In order to find the final motion vector, the prediction motion vector provides an initial point during motion estimation with respect to an inter mode. For example, the encoding apparatus may encode the motion vector of the current block Cb based on the value of the median-filtered motion vector.

The encoding apparatus may determine a difference between the motion vector value of the current block Cb and the value of the median-filtered motion vector as a residual of the motion vector value and transmit a residual vector to the decoding apparatus. The decoding apparatus may decode the motion vector of the current block Cb based on the value of the median-filtered motion vector. The decoding apparatus may determine the motion vector value of the current block Cb by adding the residual vector transmitted by the encoding apparatus to the value of the median-filtered motion vector.

Figure 5D:
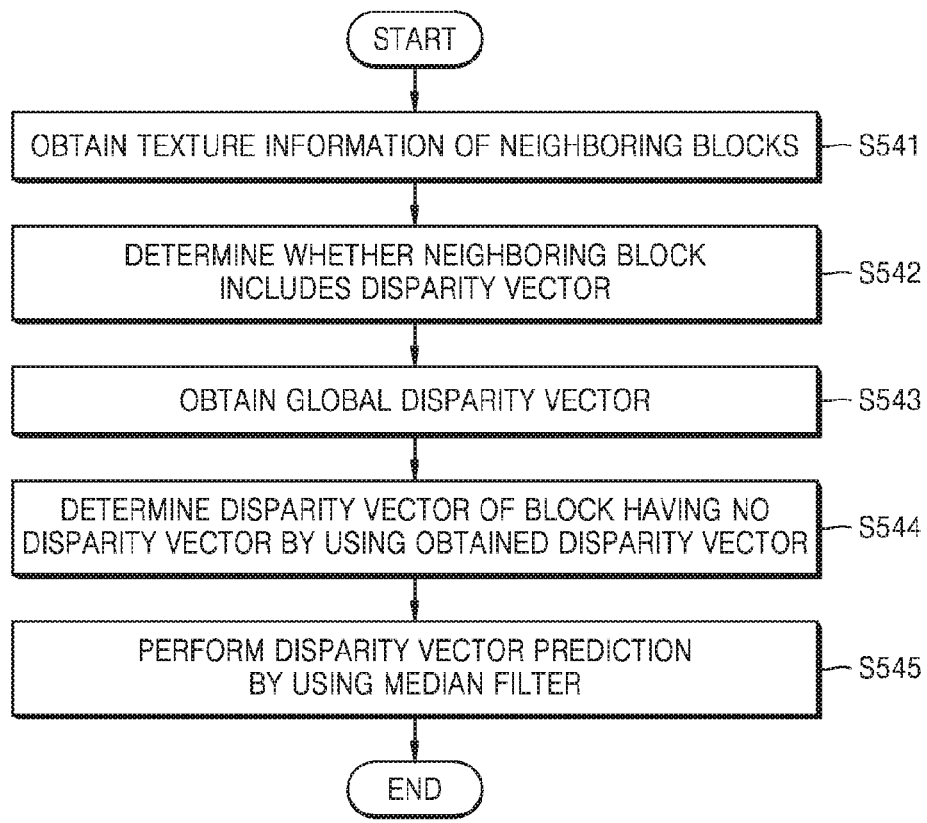
FIG. 5D is a diagram for describing a method by which a decoding apparatus predicts a disparity vector (inter-view MV) without using a depth image for an inter mode, according to an embodiment.

FIG. 5D is a diagram for describing a method by which the decoding apparatus predicts a disparity vector (inter-view MV) without using a depth image for an inter mode, according to an embodiment.

A method by which the decoding apparatus predicts a disparity vector (inter-view MV) without using a depth image for an inter mode, according to an embodiment, will be described with reference to FIG. 5D.

First, the decoding apparatus according to an embodiment obtains texture information of neighboring blocks of a current block (S541). For example, the decoding apparatus may obtain texture information of neighboring blocks A, B, and C of a current block Cb. Since the neighboring blocks A, B, and C are earlier encoded than the current block, the encoding apparatus may obtain texture information of the neighboring blocks from encoding information of the earlier encoded neighboring blocks. The decoding apparatus may obtain the encoding information of the neighboring blocks from a bitstream that the encoding apparatus generates by performing the encoding, and obtain the texture information of the neighboring blocks from the encoding information.

Then, the decoding apparatus determines whether the neighboring blocks include disparity vectors (S542). When the neighboring block includes the disparity vector, the decoding apparatus may omit operations S543 and S544 and perform disparity vector prediction by applying a median filter to the disparity vectors of the neighboring blocks (S545). For example, when the neighboring blocks are blocks A, B, and C, the decoding apparatus may predict the disparity vector of the current block Cb by performing median filtering on the disparity vectors of the blocks A, B, and C and determining the median-filtered vector as the final prediction disparity vector.

On the other hand, some of the disparity vectors required for performing the disparity vector prediction may not have values. For example, the block C among the neighboring blocks A, B, and C may not have the value of the disparity vector. In this case, the decoding apparatus may generate the value of the disparity vector of the neighboring block C, whose disparity vector is absent, by using the global disparity vector. Hereinafter, operation by which the decoding apparatus generates the value of the disparity vector of the neighboring block C will be described.

The decoding apparatus obtains the global disparity vector so as to determine the value of the global disparity vector as the value of the disparity vector of the neighboring block C (S533). The decoding apparatus may determine the global disparity vector as follows. For example, the decoding apparatus may determine a zero disparity vector as the global disparity vector. The decoding apparatus may determine a disparity vector encoded/decoded in a previous block or a previous frame as the global disparity vector. The decoding apparatus may determine an average disparity vector as the global disparity vector, the average disparity vector being determined by averaging a plurality of disparity vectors encoded/decoded in a previous block or a previous frame. The decoding apparatus may determine a disparity vector, which has a maximum disparity value among disparity vectors encoded/decoded in a previous block or a previous frame, as the global disparity vector. The decoding apparatus may determine a disparity vector, which has a medium value among a plurality of disparity vectors encoded/decoded in a previous block or a previous frame, as the global disparity vector.

In addition, the decoding apparatus may determine a disparity vector obtained through block matching with images of different views as the global disparity vector. The block matching is a method of finding a block whose block value is most similar to a specific block by comparing the specific block with a plurality of blocks.

In addition, the decoding apparatus may determine a disparity vector most recently encoded/decoded in a previous block or frame as the global disparity vector. The decoding apparatus may determine a disparity vector, which is most recently encoded/decoded among disparity vectors of previous blocks located on the left of the current block, as the global disparity vector. At this time, when there is no disparity vector most recently encoded/decoded, the decoding apparatus may determine a zero disparity vector as the global disparity vector. On the other hand, when there is no disparity vector most recently encoded/decoded, the decoding apparatus may determine any disparity vector as the global disparity vector. In addition, as described above, the decoding apparatus may convert any depth value into a disparity vector by using camera parameter information and use the disparity vector as the global disparity vector.

Then, the decoding apparatus determines a disparity vector of a block having no disparity vector by using the obtained global disparity vector (S544). For example, the decoding apparatus may determine the obtained global disparity vector as the disparity vector of the block C having no disparity vector.

Then, the decoding apparatus performs disparity vector prediction by using a median filter (S545). The decoding apparatus may determine the final prediction disparity vector of the current block by using a median filter in the disparity vectors of the neighboring blocks A, B, and C. In order to find the disparity vector of the current block, the prediction disparity vector provides an initial point during disparity estimation with respect to an inter mode. The decoding apparatus may perform inter-view mode prediction on the current block Cb by using the obtained final prediction disparity vector.

For example, the encoding apparatus may encode the disparity vector of the current block Cb based on the value of the median-filtered disparity vector. The encoding apparatus may determine a difference between the disparity vector value of the current block Cb and the value of the median-filtered disparity vector as a residual of the disparity vector value and transmit a residual vector to the decoding apparatus. The decoding apparatus may decode the disparity vector of the current block Cb based on the value of the median-filtered disparity vector. The decoding apparatus may determine the disparity vector value of the current block Cb by adding the residual vector transmitted by the encoding apparatus to the value of the median-filtered disparity vector.

As described below, the encoding/decoding methods according to an embodiments may be used for encoding and decoding the 3D image. The following description will be given about an embodiment in which, when there is no depth image block corresponding to a current block, a depth value is set to 128, this value is converted into a disparity vector by using camera parameter, and the disparity vector is used for a motion and disparity vector prediction part of a current block.

When inter prediction, inter-view prediction, view synthesis prediction, and adaptive luma compensation are applied during a 3D video compression, CorDepthFlag may be defined as follows.

TABLE 1 srcIndex = ViewIdTo3DVAcquisitionParamIndex(srcViewId)
CorDepthFlag = depth_preceding_texture_flag[srcIndex]

ViewIdTo3DVAcquisitionParamIndex(viewId) is a function of converting an i value of view_id_3dv[i] that is the same as viewId in an active sequence parameter set.

view_id_3d is a view_id arrangement syntax element that the encoding apparatus transmits to the decoding apparatus via the bitstream. view_id_3d may be included in the sequence parameter set.

srcViewId is a view_id value of a texture view component
A disparity vector defaultDV is defined as follows.

TABLE 2 srcIndex = ViewIdTo3DVAcquisitionParamIndex(srcViewId)
refIndex = ViewIdTo3DVAcquisitionParamIndex(refViewId)
defaultDV[0] = Disparity(depthSample, srcIndex, refIndex)
defaultDV[1] = 0

A Disparity function is a function of generating a disparity vector by using a depth-value sample value depthSample, a source image index srcIndex, and a reference image index refIndex.

A function DisparityForBlock(depthPic, x1, y1, b1Width, b1Height, srcViewId, refViewId) is specified as steps according to the following order to convert maxDisp.

A variable maxDepth is specified as follows.

TABLE 3 maxDepth = INT_MIN
for(j = 0; j < blHeight; j + = (blHeight − 1))
  for(i = 0; i < blWidth; i + = (blWidth − 1))
    if(depthPic[x1 + i, y1 + j] > maxDepth)
      maxDepth = depthPic[x1 + i, y1 + j]

A variable maxDisp is specified as follows.

TABLE 4 srcIndex = ViewIdTo3DVAcquisitionParamIndex(srcViewId)
refIndex = ViewIdTo3DVAcquisitionParamIndex(refViewId)
maxDisp = Disparity(maxDepth, srcIndex, refIndex)

If DepthFlag is equal to 0, dmvp_flag is equal to 1, and CorDepthFlag is equal to 1, the variables DepthRefPicList1, DepthRefPicList0, and DepthCurrPic for B slices are specified as follows.

The variable DepthRefPicList0 is specified to consist of the depth view components of the view component pairs for which the texture view components are in RefPicList0 in the order that RefPicList0[i] and DepthRefPicList0[i] form a view component pair for any value of i=0 . . . num_ref_idx_10_active_minus1.

num_ref_idx_10_active_minus1 is a syntax element indicating a value obtained by subtracting 1 from the number of active reference indices. The encoding apparatus may include num_ref_idx_10_active_minus1 in a bitstream before transmission to the decoding apparatus.

The variable DepthRefPicList1 is specified for B slices to consist of the depth view components of the view component pairs for which the texture view components are in RefPicList1 in the order that RefPicList1[i] and DepthRefPicList1[i] form a view component pair for any value of i=0 . . . num_ref_idx_11_active_minus1.

The variable DepthCurrPic is specified to be the upsampled decoded sample array of the depth view component of the view component pair for which the texture view component is the current texture view component.

If DepthFlag is equal to 0, dmvp_flag is equal to 1, and CorDepthFlag is equal to 0, the variables DepthRefPicList1, DepthRefPicList0, and DepthCurrPic for a B slice are specified to consist of a blank component (blank variable).

In a derivation process for motion vector components and reference indices, an input may include a macroblock partition mbPartIdx and a sub-macroblock partition subMbPartIdx.

If ChromaArrayType is not equal to 0, an output may include luma motion vectors mvL0 and mvL1, chroma motion vectors mvCL0 and mvCL1, reference indices refIdxL0 and refIdxL1, prediction list utilization flags predFlagL0 and predFlagL1, and a motion vector count variable subMvCnt.

For the derivation of the variables refIdxL0, refIdxL1, mvL0, and mvL1, the following may apply. If mb_type is equal to P_Skip and MbVSSkipFlag is equal to 0, the following may apply. If nal_unit_type is equal to 21 and DepthFlag is equal to 0 and dmvp_flag is equal to 1, the depth-based derivation process for luma motion vectors for skipped macroblock in P and SP slices is invoked with the output being the luma motion vectors mvL0 and reference indices refIdxL0, and predFlagL0 is set equal to 1.

Otherwise (nal_unit_type is not equal to 21 or DepthFlag is equal to 1 or dmvp_flag is equal to 0), the derivation process for luma motion vectors for skipped macroblock in P and SP slices is invoked with the output being the luma motion vectors mvL0 and reference indices refIdxL0, and predFlagL0 is set equal to 1.

If MbVSSkipFlag is equal to 1, the derivation process for luma motion vectors for VSP skipped macroblock in P and SP slices is invoked with the output being the luma motion vectors mvL0 and reference indices refIdxL0, and predFlagL0 is set equal to 1.

If mvL1 and refIdxL1 are marked as not available and predFlagL1 is set equal to 0, the motion vector count variable subMvCnt is set equal to 1.

if mb_type is equal to B_Skip or B_Direct_16x16 or sub_mb_type [mbPartIdx] is equal to B_Direct_8x8, the following may apply.

a) The variable vspFlag is specified as shown in the following Table.

TABLE 5

| vspFlag = ! ((mb_type = = B_Skip && MbVSSkipFlag = = 0) \| \| ((mb_type = = B_Direct_16x16 \| \| sub_type[mbPartIdx] = = B_Direct_8x8) && !mb_direct_type_flag)) |
|---|

If vspFlag is equal to 0 and nal_unit_type is equal to 21 and DepthFlag is equal to 0 and dmvp_flag is equal to 1, the depth-based derivation process for luma motion vectors for B_Skip, B_Direct_16x16, and B_Direct_8x8 in B slices is invoked with mbPartIdx and subMbPartIdx as the input and the output being the luma motion vectors mvL0 and mvL1, the reference indices refIdxL0 and refIdxL1, the motion vector count variable subMvCnt, and the prediction utilization flags predFlagL0 and predFlagL1.

c) If vspFlag is equal to 0 either nal_unit_type is not equal to 21 or DepthFlag is equal to 1 or dmvp_flag is equal to 0, the derivation process for luma motion vectors for B_Skip, B_Direct_16x16, and B_Direct_8x8 in B slices is invoked with mbPartIdx and subMbPartIdx as the input and the output being the luma motion vectors mvL0 and mvL1, the reference indices refIdxL0 and refIdxL1, the motion vector count variable subMvCnt, and the prediction utilization flags predFlagL0 and predFlagL1.

d) If vspFlag is equal to 1, the derivation process for luma motion vectors for B_Skip, B_Direct_16x16, and B_Direct_8x8 in B slices is invoked.

When predFlagLX is equal to 1, DepthFag is equal to 0, and dmvp_flag is equal to 1, the derivation process for luma motion vector prediction is invoked with mbPartIdx subMbPartIdx, refIdxLX, and currSubMbType as the inputs and the output being mvpLX. When predFlagLX is equal to 1 and DepthFlag is equal to 1 or dmvp_flag is equal to 0, the derivation process for luma motion vector prediction is invoked with mbPartIdx subMbPartIdx, refIdxLX, and currSubMbType as the inputs and the output being mvpLX.

The derivation process for luma motion vectors for skipped macroblocks in P slices and SP slices will be described. This process is involved when mb_type is equal to P_Skin, nal_unit_type is equal to 21, DepthFlag is equal to 0, dmvp_flag is equal to 1, and MbVSSkipFlag is equal to 0. The output is the motion vector mvL0 and the reference index refIdxL0.

For the derivation of the motion vector mvL0 and refIdxL0 of a P_Skip macroblock type, the following ordered steps are specified.

a. The derivation process for inter-view motion vector in the inter-view reference is invoked with mbPartIdx set equal to 0, subMbPartIdx set equal to 0, currSubMbType set equal to "na", and listSuffixFlag equal to 0 as input. The output is assigned to the motion vector mvL0 and the reference index refIdxL0.

b. In case where refIdxL0 is equal to −1:

The reference index refIdxL0 for skipped macroblocks is derived as refIdxL0=0. The derivation process for luma motion vector prediction is invoked with mbPartIdx set equal to 0, subMbPartIdx set equal to 0, refIdxL0, and currSubMbType=¡°na¡± as the inputs and the output being mvL0.

The derivation process for luma motion vectors for VSP skipped macroblocks in P slices and SP slices will be described. This process is invoked when mb_type is equal to P_Skip, nal_unit_type is equal to 21, DepthFlag is equal to 0, and MbVSSkipFlag is equal to 1. Outputs of this process are the motion vector mvL0 and the reference index refIdxL0. The reference index refIdxL0 for a VSP skipped macroblock is derived as the synthetic picture that appears first in RefPicList0.

The derivation process for luma motion vectors for B_Skip, B_Direct_16x16, and B_Direct_8x8 will be described. Inputs to this process are current macroblock partition indices mbPartIdx and subMbPartIdx. Outputs of this process are the reference indices refIdxL0 and refIdxL1, the motion vectors mvL0 and mvL1, the motion vector count variable subMvCnt, and the prediction list utilization flags predFlagL0 and predFlagL1.

For the derivation of output, the following ordered steps are specified.

1. The variable currSubMbType is set equal to sub_mb_type[mbPartIdx].

2. The derivation process for inter-view motion vector in the inter-view reference is invoked with mbPartIdx set equal to 0, subMbPartIdx set equal to 0, and currSubMbType and listSuffixFlag equal to 0 as input. The output is assigned to the motion vector mvL0 and the reference index refIdxL0.

3. The derivation process for inter-view motion vector in the inter-view reference is invoked with mbPartIdx set equal to 0, subMbPartIdx set equal to 0, and currSubMbType and listSuffixFlag equal to 1 as input. The output is assigned to the motion vector mvL1 and the reference index refIdxL1.

4. When both reference indices refIdxL0 and refIdxL1 are equal to −1, the following applies.

The reference indices refIdxL0 is set to 0. The derivation process for luma motion vector prediction is invoked with mbPartIdx set equal to 0, subMbPartIdx set equal to 0, refIdxLX (X is 0 or 1) and currSubMbType. mvLX is assigned as the output.

The derivation process for the disparity vector and the inter-view reference will be described. Inputs to this process are depth reference view component depthPic, the location of a top-left sample (dbx1, dby1) of a partition and the listSuffixFlag. Outputs of this process are a picture InterViewPic, an offset vector dv and a variable InterViewAvailable.

InterViewAvailable is set equal to 0. The following Table applies to derive an inter-view reference picture or inter-view only reference picture, InterViewPic, with X set to 1 when listFuffixFlag is 1 or 0 otherwise.

TABLE 6 for(cIdx = 0;cIdx<num_ref_idx_l0_active_minus1 + 1
&& !InterViewAvailable; cIdx + + )
    if (view order index of RefPicList0[cIdx] is equal to 0) {
        InterViewPic = RefPicList0[cIdx]
        InterViewAvailable = 1
    }

When InterViewAvailable is equal to 1, the following steps apply in order.

The derivation process for motion data of neighboring partitions is invoked with mbPartIdx set equal to 0, subMbPartIdx set equal to 0, currSubMbType set equal to "na", and listSuffixFlag set equal to 0 as input. Reference indices refIdxCandL0[i] and the motion vectors mvCandL0[i] are set as outputs with i equal to 0, 1, and 2 corresponding to neighboring partition A, B, and C, respectively.

The derivation process for motion data of neighboring partitions is invoked with mbPartIdx set equal to 0, subMbPartIdx set equal to 0, currSubMbType set equal to "na", and listSuffixFlag set equal to 1 as input. Reference indices refIdxCandL1[i] and the motion vectors mvCandL1[i] are set as outputs with i equal to 0, 1, and 2 corresponding to neighboring partition A, B, and C, respectively.

The variable dv is derived as specified by the following ordered steps.

DvAvailable[i] and mvCand[i] are set based on the following table with i equal to 0, 1, or 2 corresponding to neighboring partition A, B, and C, respectively.

TABLE 7 for(i = 0; i < 3; i+ + )
    if(view order index of RefPicList0[refIdxCandL0[i]] is equal to 0) {
        DvAvailable[i] = 1
        mvCand[i] = mvCandL0[i]
    } else if(view order index of RefPicList1[refIdxCandL1[i]] is equal to 0) {
        DvAvailable[i] = 1
        mvCand[i] = mvCandL1[i]
    } else
        DvAvailable[i] = 0

If DvAvailable[0]+DvAvailable[1]+DvAvailable[2] is equal to 1, the following applies.

TABLE 8 dv[0] = mvCandLX[i][0]
dv[1] = mvCandLX[i][1]

When CorDepthFlag is equal to 1, the following steps apply in order.

1. The variable maxDepth is set as shown in the following table.

TABLE 9 maxDepth = INT_MIN
for(j = 0; j < partHeight; j += (partHeight − 1))
    for(i = 0; i < partWidth; i += (partWidth − 1))
        if(depthPic[dbx1 + i, dby1 + j] > maxDepth)
            maxDepth = depthPic[dbx1 + i, dby1 + j]

2. The variable dispVector is set as shown in the following table.

TABLE 10 currIndex = ViewIdTo3DVAcquisitionParamIndex(view_id of the current view)
refIndex = ViewIdTo3DVAcquisitionParamIndex(view_id of the InterViewPic)
dispVector[0] = Disparity(maxDepth, currIndex, refIndex)
dispVector[1] = 0

3. For each value of i equal to 0, 1, and 2, when DvAvailable[i] is equal to 0, mvCand[i] is set to dispVector.

4. Each component of the variable dv is given by a median value of vector components corresponding to motion vectors mvCandLX[0], mvCandLX[1], and mvCandLX[2].

TABLE 11 dv[0] = Median(mvCand[0][0], mvCand[1][0], mvCand[2][0])
dv[1] = Median(mvCand[0][1], mvCand[1][1], mvCand[2][1])

Otherwise, for each value of i equal to 1 and 2, when DvAvailable[i] is equal to 0, mvCand[i] is set to defaultDV if CorDepthFlag is equal to 0. Each component of the variable dv is derived as follows.

TABLE 12 dv[0] = Median(mvCand[0][0], mvCand[1][0], mvCand[2][0])
dv[1] = Median(mvCand[0][1], mvCand[1][1], mvCand[2][1])

The derivation process for the inter-view motion vector in inter-view reference will be described. Inputs to this process are mbPartIdx, subMbPartIdx, and listSuffixFlag. Outputs of this process are the motion vector mvCorrespond and the reference index refIdxCorrespond. Inter-view reference picture InterViewPic and an offset vector dv are derived as specified by the following ordered steps.

First, the inverse macroblock scanning process is invoked with CurrMbAddr as the input and the output is assigned to (x1, y1).

Then, the inverse macroblock partition scanning process is invoked with mbPartIdx as the input and the output assigned to (dx1, dy1).

Then, the inverse sub-macroblock partition scanning process is invoked with mbPartIdx and subMbPartIdx as the input and the output assigned to (dx2, dy2).

Then, the derivation process for the disparity vector and the inter-view reference is invoked with DepthCurrPic, dbx1 set to x1+dx1+dx2, dby1 set to y1+dy1+dy2, and listSuffixFlag as input and InterViewPic, an offset vector dv and an variable InterViewAvailable as outputs.

The refIdxCorrespond and mvCorrespond may be set as follows. If InterViewAvailable is equal to 0, refIdxCorrespond is set to −1, and mvCorrespond [0] and mvCorrespond [1] are both set to 0. Otherwise, the following steps apply in order. First, the variable luma4x4BlkIdx is derived as (4*mbPartIdx+subMbPartIdx). The inverse 4×4 luma block scanning process is invoked with luma4×4BlkIdx as the input and (x, y) as the output. In addition, (xCorrespond, yCorrespond) is set equal to (x+(dv[0]>>4), y+(dv[1]>>4)) and mbAddrCorrespond is set equal to ((CurrMbAddr/PicWidthInMbs)+(dv[1]>>6))*PicWidthInMbs+(CurrMbAddr % PicWidthInMbs)+(dv[0]>>6).

mbTypeCorrespond is set to the syntax element mb_type of the macroblock with address mbAddrCorrespond inside the picture InterViewPic. When mbTypeCorrespond is equal to P_8×8, P_8×8ref0, or B_8×8, subMbTypeCorrespond is set to be the syntax element sub_mb_type of the macroblock with address mbAddrCorrespond inside the picture InterViewPic.

mbPartIdxCorrespond is set to the macroblock partition index of the corresponding partition and subMbPartIdxCorrespond is set to the sub-macroblock partition index of the corresponding sub-macroblock partition. The derivation process for macroblock and sub-macroblock partition indices is invoked with the luma location equal to (xCorrespond, yCorrespond), the macroblock type equal to mbTypeCorrespond, and when mbTypeCorrespond is equal to P_8×8, P_8×8ref0, or B_8×8, the list of sub-macroblock types subMbTypeCorrespond as the inputs. The outputs are assigned to the macroblock partition index mbPartIdxCorrespond and the sub-macroblock partition index subMbPartIdxCorrespond.

The motion vector mvCorrespond and the reference index refIdxCorrespond are derived as follows.

If the macroblock mbAddrCorrespond is coded in an Intra prediction mode, components of mvCorrespond are set equal to 0 and refIdxCorrespond is set equal to −1.

Otherwise (the macroblock mbAddrCorrespond is not coded as Intra prediction mode), the prediction utilization flags predFlagLXCorrespond is set equal to PredFlagLX[mbPartIdxCorrespond], the prediction utilization flag of the macroblock partition mbAddrCorrespond\mbPartIdxCorrespond of the picture InterViewPic. In addition, the following applies.

When predFlagLXCorrespond is equal to 1, the mvCorrespond and the reference index refIdxCorrespond are set equal to MvLX[mbPartIdxCorrespond][subMbPartIdxCorrespond] and RefIdxLX[mbPartIdxCorrespond], respectively. MvLX[mbPartIdxCorrespond][subMbPartIdxCorrespond] and RefIdxLX[mbPartIdxCorrespond] are the motion vector mvLX and the reference index refIdxLX that have been assigned to the (sub-)macroblock partition mbAddrCorrespondmbPartIdxCorrespond\subMbPartIdxCorrespond inside the picture InterViewPic.

The derivation process for luma motion vectors for VSP skipped/direct macroblocks in B slices will be described.

Outputs of this process are the motion vector mvL0 and mvL1 and the reference index refIdxL0 and refIdxL1. The reference index refIdxLX for a VSP skipped/direct macroblock is derived as the synthetic reference component that appears first in the reference picture list X. X is replaced by 0 or 1. When there is no synthetic picture in the reference picture list X, refIdxLX is set equal to 0. The motion vector mvLX is set equal to zero motion vector, with X being replaced by 0 or 1.

The derivation process for luma motion vector prediction will be described. Inputs to this process are as follows: the macroblock partition index mbPartIdx, the sub-macroblock partition index subMbPartIdx, the reference index of the current partition refIdxLX (with X being 0 or 1), and the variable currSubMbType.

Output of this process is the prediction mvpLX of the motion vector mvLX (with X being 0 or 1). The specifications of subclause J.8.4.1.3 apply with the following changes.

If refIdxLX is not equal to refIdxLXN for any N=A, B, or C and X equal to 0 or 1, the following applies:
  mbAddrN\mbPartIdxN\subMbPartIdxN is marked as not available. refIdxLXN=−1, mvLXN 0]=0, and mvLXN[1]=0

The derivation process for the neighboring blocks for motion data is invoked with mbPartIdx, subMbPartIdx, currSubMbType, and listSuffixFlag=X (with X being 0 or 1 for refIdxLX being refIdxL0 or refIdxL1, respectively) as the input and with mbAddrN\mbPartIdxN\subMbPartIdxN, reference indices refIdxLXN and the motion vectors mvLXN with N being replaced by A, B, or C as the output.

Otherwise, if refIdxLX is a reference index to an inter-view reference component or an inter-view only reference component, the depth-based derivation process for median luma motion vector prediction is invoked with mbAddrN\mbPartIdxN\subMbPartIdxN, mvLXN, refIdxLXN with N being replaced by A, B, or C, and refIdxLX as the inputs. The output is assigned to the motion vector predictor mvpLX.

Otherwise, if refIdxLX is a reference index to a reference picture which is not an inter-view reference component or an inter-view only reference component, the depth-based derivation process for median luma temporal motion vector prediction is invoked with mbAddrN\mbPartIdxN\subMbPartIdxN, mvLXN, refIdxLXN with N being replaced by A, B, or C, and refIdxLX as the inputs. The output is assigned to the motion vector predictor mvpLX.

Otherwise, if MbPartWidth(mb_type) is equal to 8, MbPartHeight(mb_type) is equal to 16, mbPartIdx is equal to mvpLX=mvLXC to 1, and refIdxLXC is equal to refIdxLX, the motion vector predictor mvpLX is derived by mvpLX=mvLXC.

The depth-based derivation process for median luma inter-view motion vector prediction will be described. Inputs to this process are the neighboring partitions mbAddrN\mbPartIdxN\subMbPartIdxN (with N being replaced by A, B, or C), the motion vectors mvLXN (with N being replaced by A, B, or C) of the neighboring partitions, the reference indices refIdxLXN (with N being replaced by A, B, or C) of the neighboring partitions, and the reference index refIdxLX of the current partition. Output of this process is the motion vector prediction mvpLX.

When either partition mbAddrN\mbPartIdxN\subMbPartIdxN is not available or refIdxLXN is not equal to refIdxLX, mvLXN is derived as specified by the following ordered steps:

1. The inverse macroblock scanning process is invoked with CurrMbAddr as the input and the output is assigned to (x1, y1).

2. The inverse macroblock partition scanning process is invoked with mbPartIdx as the input and the output assigned to (dx1, dy1).

3. The inverse sub-macroblock partition scanning process is invoked with mbPartIdx and subMbPartIdx as the input and the output assigned to (dx2, dy2).

4. When CorDepthFlag is equal to 1, the modification process of inter-view motion vector in median luma motion vector prediction is invoked with depthPic being equal to DepthRefPic, mbx1 being equal to x1, and mby1 being equal to y1 as inputs and the output is assigned to the motion vector mvLXN.

Otherwise, when CorDepthFlag is not equal to 0, defaultDV is assigned to the motion vector mvLXN.

Each component of the motion vector prediction mvpLX is determined based on the median of the corresponding vector components of the motion vector mvLXA, mvLXB, and mvLXC as follows.

TABLE 13

| |
|---|
| mvpLX[0] = Median(mvLXA[0], mvLXB[0], mvLXC[0]) |
| mvpLX[1] = Median(mvLXA[1], mvLXB[1], mvLXC[1]) |

The modification process for the inter-view motion vector in median luma motion vector prediction will be described. Inputs to this process include depth reference view component depthPic and a location of a top-left sample (dbx1, dby1) of a current macroblock partition. Output of this process is a motion vector my.

It is assumed that refViewId is a view_id value of depthPic. partHeight and partWidth are derived as follows.

TABLE 14

| |
|---|
| partHeight = 16 >>reduced_resolution_flag |
| partWidth = 16 >>reduced_resolution_flag |

The motion vector my is derived as follows.

TABLE 15

| |
|---|
| mv[0] = DisparityForBlock(depthPic, (mbx1 >> reduced_resolution_flag), (mby1 >>reduced_resolution_flag), partWidth, partHeight, view_id, refViewId) |
| mv[1] = 0 |

The depth-based derivation process for median luma temporal motion vector prediction will be described. Inputs to this process are the neighboring partitions mbAddrN\mbPartIdxN\subMbPartIdxN (with N being replaced by A, B, or C), the motion vectors mvLXN (with N being replaced by A, B, or C) of the neighboring partitions, the reference indices refIdxLXN (with N being replaced by A, B, or C) of the neighboring partitions, and the reference index refIdxLX of the current partition. Output of this process is the motion vector prediction mvpLX.

When either partition mbAddrN\mbPartIdxN\subMbPartIdxN is not available or refIdxLXN is not equal to refIdxLX, mvLXN is derived as specified by the following ordered steps:

1. The inverse macroblock scanning process is invoked with CurrMbAddr as the input and the output is assigned to (x1, y1).
2. The inverse macroblock partition scanning process is invoked with mbPartIdx as the input and the output assigned to (dx1, dy1).
3. The inverse sub-macroblock partition scanning process is invoked with mbPartIdx and subMbPartIdx as the input and the output assigned to (dx2, dy2).
4. The process specified in subclause J.8.3.1.1 is invoked with depthPic set to DepthCurrPic, mbx1 set to x1, mby1 set to y1, and listSuffixFlag as inputs and InterViewPic, an offset vector dv and an variable InterViewAvailable as outputs.
5. The refIdxCorrespond and mvCorrespond are set as follows. If InterViewAvailable is equal to 0, refIdxCorrespond is set to −1, and mvCorrespond [0] and mvCorrespond [1] are both set to 0.

Otherwise, the following steps apply in order. First, the variable luma4x4BlkIdx is set to (4*mbPartIdx+subMbPartIdx). The inverse 4x4 luma block scanning process is invoked with luma4x4BlkIdx as the input and (x, y) as the output. In addition, (xCorrespond, yCorrespond) is set equal to (x+(dv[0]>>4), y+(dv[1]>>4)) and mbAddrCorrespond is set equal to ((CurrMbAddr/PicWidthInMbs)+(dv[1]>>6))*PicWidthInMbs+(CurrMbAddr % PicWidthInMbs)+(dv[0]>>6). mbTypeCorrespond is set to the syntax element mb_type of the macroblock with address mbAddrCorrespond inside the picture InterViewPic. When mbTypeCorrespond is equal to P_8x8, P_8x8ref0, or B_8x8, subMbTypeCorrespond is set to be the syntax element sub_mb_type of the macroblock with address mbAddrCorrespond inside the picture InterViewPic. mbPartIdxCorrespond is set to the macroblock partition index of the corresponding partition and subMbPartIdxCorrespond is set to the sub-macroblock partition index of the corresponding sub-macroblock partition. The derivation process for macroblock and sub-macroblock partition indices is invoked with the luma location equal to (xCorrespond, yCorrespond), the macroblock type equal to mbTypeCorrespond, and when mbTypeCorrespond is equal to P_8x8, P_8x8ref0, or B_8x8, the list of sub-macroblock types subMbTypeCorrespond as the inputs and the outputs are the macroblock partition index mbPartIdxCorrespond and the sub-macroblock partition index subMbPartIdxCorrespond. The outputs are the macroblock partition index mbPartIdxCorrespond and the sub-macroblock partition index subMbPartIdxCorrespond.

The motion vector mvCorrespond and the reference index refIdxCorrespond are derived as follows. If the macroblock mbAddrCorrespond is coded in an Intra prediction mode, components of mvCorrespond are set equal to 0 and refIdxCorrespond is set equal to −1. Otherwise (the macroblock mbAddrCorrespond is not coded as Intra prediction mode), the prediction utilization flags predFlagLXCorrespond is set equal to PredFlagLX[mbPartIdxCorrespond], the prediction utilization flag of the macroblock partition mbAddrCorrespond\mbPartIdxCorrespond of the picture InterViewPic. In addition, the following applies.

When predFlagLXCorrespond is equal to 1, the mvCorrespond and the reference index refIdxCorrespond are set equal to MvLX[mbPartIdxCorrespond][subMbPartIdxCorrespond] and RefIdxLX[mbPartIdxCorrespond], respectively. MvLX[mbPartIdxCorrespond][subMbPartIdxCorrespond] and RefIdxLX[mbPartIdxCorrespond] are the motion vector mvLX and the reference index refIdxLX that have been assigned to the (sub-)macroblock partition mbAddrCorrespondmbPartIdxCorrespond\subMbPartIdxCorrespond inside the picture InterViewPic.

6. The motion vectors mvLXN are derived based on the following table.

TABLE 16

| |
|---|
| If(refIdxCorrespond is equal to refIdxLX){ |
|     mvLXN[0] = mvCorrespond[0] |
|     mvLXN[1] = mvCorrospond[1] |
| } |
| else{ |
|     mvLXN[0] = 0 |
|     mvLXN[1] = 0 |
| } |

Each component of the motion vector prediction mvpLX is determined based on the median of the corresponding vector components of the motion vector mvLXA, mvLXB, and mvLXC.

TABLE 17

| |
|---|
| mvpLX[0] = Median(mvLXA[0], mvLXB[0], mvLXC[0]) |
| mvpLX[1] = Median(mvLXA[1], mvLXB[1], mvLXC[1]) |

The derivation process for the inter-view reference and the disparity vector will be described. Inputs to this process are depth reference view component depthPic, the location of a top-left sample (mbx1, mby1) of a current macroblock, and listSuffixFlag. Outputs of this process are a picture InterViewPic, an offset vector dv and a variable InterViewAvailable.

InterViewAvailable is set equal to 0. The variables partHeight and partWidth are calculated as follows.

TABLE 18 partHeight = 16 >>reduced_resolution_flag
partWidth = 16 >>reduced_resolution_flag The following table applies to derive an inter-view reference picture or inter-view only reference picture, InterViewPic, with X set to 1 when listFuffixFlag is 1 or 0 otherwise.

TABLE 19 for(cIdx = 0;cIdx<num_ref_idx_l0_active_minus1 + 1
&& !InterViewAvailable; cIdx + + )
    if (view order index of RefPicList0[cIdx] is equal to 0) {
        InterViewPic = RefPicList0[cIdx]
        InterViewAvailable = 1
    }
}

When InterViewAvailable is equal to 1 and CorDepthFlag is equal to 1, the variable refViewId is the same as view_id of InterViewPic, and the variable dv is set equal to the output of the function DisparityForBlock(depthPic, (mbx1>>reduced_resolution_flag), (mby1>>reduced_resolution_flag), partWidth, partHeight, view_id, refViewId).

Otherwise, when InterViewAvailable is equal to 1 and CorDepthFlag is equal to 0, the variable refViewId is set equal to view_id of InterViewPic and the variable dv is set equal to defaultDV.

In addition, as described below, the encoding/decoding methods according to an embodiments may be used for encoding and decoding the 3D image. The following description will be given about an embodiment in which, when there is no depth image block corresponding to a current block, the most recently encoded/decoded disparity vectors are used for the motion and disparity vector prediction part of the current block, and when there are no most recently encoded/decoded disparity vectors, a depth value is set to 128, this value is converted into a disparity vector by using camera parameter, and the disparity vector is used for the motion and disparity vector prediction part of a current block.

The present embodiment may be applied similarly to the embodiment in which, when there is no depth image block corresponding to a current block, the depth value is set to 128, this value is converted into the disparity vector by using camera parameter, and the disparity vector is used for the motion and disparity vector prediction part of a current block. However, the present embodiment may have the following differences.

The disparity vector defaultDV is defined as follows.

TABLE 20 srcIndex = ViewIdTo3DVAcquisitionParamIndex(srcViewId)
refIndex = ViewIdTo3DVAcquisitionParamIndex(refViewId)
defaultDV[0] = (NdrInverse[128] *

TABLE 20-continued

DisparityScale[dps_id][srcIndex][refIndex] +
(DisparityOffset[dps_id][srcIndex][refIndex] << BitDepthY) + (1 <<
(log2Div − 1))) >> log2Div
defaultDV[1] = 0

In addition, in the depth-based derivation process for median luma inter-view motion vector prediction, when CorDepthFlag is equal to 0, defaultDV is set as follows.

TABLE 21 defaultDV[0] = mvpLX[0] + mvd_lX[mbPartIdx][subMbPartIdx][0]
defaultDV[1] = 0

In addition, the aforementioned encoding/decoding methods according to an embodiments may be modified as stated below and may be used for encoding and decoding the 3D image. In a 3D video decoding process, when a 3D-AVC decoding process for configuring a reference picture list is performed, DvMBX indicating a horizontal disparity vector value may be set to 0.

In performing 3D-AVC inter prediction, inter-view prediction, view synthesis prediction, and adaptive luma compensation, when Nal unit type is 21, DepthFlag is equal to 0, TextureFirstFlag is equal to 1, InterViewRefAvailable is equal to 1, and dmvp_flag or seq_view_synthesis_flag is equal to 1, DvMBX is set to 0 and the disparity vector derivation process based on the macroblock level neighboring block is invoked, when address CurrMbAddr of the current macroblock is equal to first_mb_in_slice, the address of the first macroblock in slices.

When the derivation process for the motion vector components and the reference indices derives the derivation of motion vectors mvL0 and mvL1, if TextureFirstFlag has a value of 0, the depth-based disparity value derivation process includes depthPic equal to DepthCurrPic, (textureX, textureY) equal to the location of the top-left sample of the macroblock partition mbPartIdx, tB1Width equal to the width of the macroblock partition mbPartIdx, tB1Height equal to the height of the macroblock partition mbPartIdx, srcViewId equal to view_id, and refViewId equal to view_id of refIdxLX as inputs, and the outputs assigned to mvLX[0] and mvLX[1] are set to 0.

The depth-based disparity vector value derivation process may apply as follows.

The disparity vector values dispVal include the decoded depth view component depthPic, the location (textureX, textureY) of the block in the texture view component from which the disparity vector value is derived, the width tB1Width and the height tB1Height of the block in the texture view component from which the disparity vector value is derived, the view_id value ViewId of the texture view component from which the disparity vector value is derived, and the view_id value refViewId of the reference view for the disparity vector value as inputs, and may be calculated as follows.

First, the variable maxDepth may be specified as follows.

TABLE 22 maxDepth = INT_MIN
for(j = 0; j < blHeight; j += (blHeight − 1))
    for(i = 0; i < blWidth; i += (blWidth − 1))
        if(depthPic[depthX + i, depthY + j] > maxDepth)
            maxDepth = depthPic[depthX + i, depthY + j]

Then, the variable dispVal may be specified as follows.

TABLE 23 log2Div = BitDepthY + 6
    srcIndex = ViewIdTo3DVAcquisitionParamIndex(srcViewId)
    refIndex = ViewIdTo3DVAcquisitionParamIndex(refViewId)
    dispVal = (NdrInverse[maxDepth] *
DisparityScale[dps_id][srcIndex][refIndex] +
(DisparityOffset[dps_id][srcIndex][refIndex] << BitDepthY) + (1 <<
(log2Div − 1))) >> log2Div The variables depthX, depthY, b1Width, and b1Height may be calculated as follows.

TABLE 24 dHM = depth_hor_mult_minus1 + 1
dVM = depth_ver_mult_minus1 + 1
depthX = Clip3(DepthCropLeftCoord, DepthCropRightCoord,
((textureX + grid_pos_x[srcViewId])* dHM) >> depth_hor_rsh)
depthY = Clip3(DepthCropTopCoord, DepthCropBottomCoord,
((textureY + grid_pos_y[srcViewId])* dVM) >> depth_ver_rsh)
depthXN = Clip3(DepthCropLeftCoord, DepthCropRightCoord,
((textureX + grid_pos_x[srcViewId] + tBlWidth − 1) * dHM) >>
depth_hor_rsh)
depthYN = Clip3(DepthCropTopCoord, DepthCropBottomCoord,
((textureY + grid_pos_y[srcViewId] + tBlHeight − 1) * dVM) >>
depth_ver_rsh)
blWidth = depthXN − depthX + 1
blHeight = depthYN − depthY + 1 depth_hor_mult_minus1, depth_ver_mult_minus1, depth_hor_rsh, and depth_ver_rsh are the syntax elements used for depth-based disparity vector derivation and may be obtained from the bitstream generated by the encoding apparatus. If the values are not found, depth_hor_mult_minus1 and depth_ver_mult_minus1 may be used as 1. depth_hor_rsh and depth_ver_rsh may be used as 0.

DepthCropLeftCoord, DepthCropRightCoord, DepthCropTopCoord, and DepthCropBottomCoord are calculated as follows.

TABLE 25

DepthCropLeftCoord = CropUnitX *
  depth_frame_crop_left_offset
DepthCropRightCoord = PicWidthInSamplesL − (CropUnitX *
depth_frame_crop_right_offset + 1)
    DepthCropTopCoord = CropUnitY *
  depth_frame_crop_top_offset
DepthCropBottomCoord = (16 * FrameHeightInMbs) −
(CropUnitY * depth_frame_crop_bottom_offset + 1)

grid_pos_x[grid_pos_view_id[i]] represents the horizontal offset of the depth sampling grid for the luma texture sampling grid in the texture luma sample unit, and grid_pos_y[grid_pos_view_id[i]] represents the vertical offset of the depth sampling grid for the luma texture sampling grid in the texture luma sample unit.

In performing the depth-based derivation process for luma motion vectors for skipped macroblocks in P and SP slices, when the motion vectors mvL0 and refIdxL0 of P_Skip macroblock type are derived, the reference index refIdxL0 may be set to 0 if refIdxL0 m is equal to −1. The derivation process for luma motion vector prediction may be performed with mbPartIdx set to 0, subMbPartIdx set to 0, refIdxL0, and currSubMbType having "na" as inputs and with mvL0 as output.

In the derivation process of luma motion vectors for B_Skip, B_Direct_16×16, and B_Direct_8×8, if the reference indices refIdxL0 and refIdxL1 are equal to −1, the reference index refIdxL0 may be set to 0, and the derivation process for luma motion vector prediction may be performed with mbPartIdx set to 0, subMbPartIdx set to 0, refIdxLX (X is 0 or 1), and currSubMbType as inputs and mvLX as output.

The derivation process for motion vectors in the inter-view reference may apply as follows.

Inputs to this process are mbPartIdx, subMbPartIdx, and listSuffixFlag, and Outputs of this process are the motion vector mvCorrespond and the reference index refIdxCorrespond. Inter-view reference picture InterViewPic and an offset vector dv may be derived as follows.

If TextureFirstFlag is equal to 0, the following steps apply in order.

First, the inverse macroblock scanning process is invoked with CurrMbAddr as the input and the output is assigned to (x1, y1). The inverse macroblock scanning process returns the location (s, y) of the top-left luma sample of the macroblock corresponding to input address.

Then, the inverse macroblock partition scanning process is invoked with mbPartIdx as the input and the output is assigned to (dx1, dy1). The inverse macroblock partition scanning process receives the index of the macroblock partition and returns the location (x, y) of the top-left luma sample of the received macroblock.

Then, the inverse sub-macroblock partition scanning process is invoked with mbPartIdx and subMbPartIdx as the inputs and the output is assigned to (dx2, dy2). The inverse sub-macroblock partition scanning process receives the index of the macroblock partition and the index of the sub-macroblock partition and returns the location (x, y) of the top-left luma sample of the received sub-macroblock.

The following table applies to derive an inter-view reference picture or inter-view only reference picture. InterViewPic, and applies to set the variable interViewAvailable.

TABLE 26 interViewAvailable = 0
for(cIdx = 0; cIdx <= num_ref_idx_l0_active_minus1
&& !interViewAvailable; cIdx++)
    if (view order index of RefPicList0[cIdx] is not equal to
view_idx) {
        InterViewPic = RefPicList0[cIdx]
        interViewAvailable = 1
    }

When interViewAvailable is equal to 1, the depth-based disparity value derivation process is invoked with depthPic equal to DepthCurrPic, textureX equal to x1+dx1+dx2, textureY equal to y1+dy1+dy2, tB1Width equal to the width of the sub-macroblock partition CurrMbAddr\mbPartIdx\subMbPartIdx, tB1Height equal to the height of the sub-macroblock partition CurrMbAddr\mbPartIdx\subMbPartIdx, srcViewId equal to view_id, and refViewId equal to view_id of InterViewPic as inputs, and outputs assigned to dV[0] and dV[1] are set to 0.

Otherwise (TextureFirst Flag is equal to 1), the following steps apply in order.

dV is set to (DvMBX, 0) and interViewAvailable is set to InterViewRefAvailable.

When interViewAvailable is equal to 1, InterViewPic is set to the texture view component of the base view.

refIdxCorrespond and mvCorrespond are set as follows.

When interViewAvailable is equal to 0, refIdxCorrespond is set to −1 and mvCorrespond[0] and mvCorrespond[1] are both set to 0.

Otherwise, the following steps apply in order.

The variable xCorrespond is set to x1+7 30 (dV[0]>>2) and the variable yCorrespond is set to y1+7+(dV[1]>>2).

The variable mbAddrCorrespond is set to ((CurrMbAddr/PicWidthInMbs)+(dV[1]>>6))*PicWidthInMbs+(CurrMbAddr % PicWidthInMbs)+(dV[0]>>6).

The variable xRelative is set to xCorrespond ?((xCorrespond>>4)<<4) and the variable yRelative is set to yCorrespond ?((yCorrespond>>4)<<4).

mbTypeCorrespond is set to the syntax element mb_type of the macroblock having the address of mbAddrCorrespond within the picture InterViewPic. When mbTypeCorrespond is equal to P_8×8, P_8×8ref0, or B_8×8, subMbTypeCorrespond is set to the syntax element sub_mb_type of the macroblock having the address of mbAddrCorrespond within the picture InterViewPic.

mbPartIdxCorrespond is set to the macroblock partition index of the corresponding partition and subMbPartIdxCorrespond is set to the sub-macroblock partition index of the corresponding sub-macroblock partition. The derivation for macroblocks and sub-macroblock indices as specified in subclause 6.4.13.4 uses the luma location equal to (xRelative, yRelative), the macroblock type equal to mbTypeCorrespond, and the list subMbTypeCorrespond of sub-macroblock types when mbTypeCorrespond is equal to P_8×8, P_8×8ref0, or B_8×8 as inputs, and outputs are the macroblock partition index mbPartIdxCorrespond and the sub-macroblock partition index subMbPartIdxCorrespond.

The motion vector mvCorrespond and the reference index refIdxCorrespond are derived as follows.

If the macroblock mbAddrCorrespond is coded in an Intra prediction mode, all components of mvCorrespond are set equal to 0 and refIdxCorrespond is set equal to −1.

Otherwise (the macroblock mbAddrCorrespond is not coded as Intra prediction mode), the prediction utilization flag predFlagLXCorrespond is set equal to PredFlagLX[mbPartIdxCorrespond], the prediction utilization flag of the macroblock partition mbAddrCorrespond\mbPartIdxCorrespond of the picture InterViewPic. In addition, the following applies.

If predFlagLXCorrespond is equal to 1 or less than or equal to RefIdxLX[mbPartIdxCorrespond] num_ref_idx_1X_active_minus1, mvCorrespond and the reference index refIdxCorrespond are respectively set to MvLX[mbPartIdxCorrespond][subMbPartIdxCorrespond] and RefIdxLX[mbPartIdxCorrespond]. MvLX[mbPartIdxCorrespond][subMbPartIdxCorrespond] and RefIdxLX[mbPartIdxCorrespond] are the motion vector mvLX and the reference index refIdxLX that have been assigned to the (sub-)macroblock partition mbAddrCorrespondmbPartIdxCorrespond\subMbPartIdxCorrespond inside the picture InterViewPic.

The derivation process for luma motion vector prediction may be performed as follows. Inputs to this process may include the macroblock partition index mbPartIdx, the sub-macroblock partition index subMbPartIdx, the reference index of the current partition refIdxLX (with X being 0 or 1), and the variable currSubMbType. Outputs of this process may include the prediction mvpLX (with X being 0 or 1) of the motion vector mvLX.

When the derivation process for luma motion vector prediction is performed, the following conditions may be further taken into consideration.

If refIdxLX is not equal to refIdxLXN for any N=A, B, or C and X equal to 0 or 1, the following applies:
mbAddrN\mbPartIdxN\subMbPartIdxN is marked as not available.

TABLE 27

| refIdxLXN = −1 |
| mvLXN 0] = 0 |
| mvLXN[1] = 0 |

When the derivation process for luma motion vector prediction is performed, the derivation process for the neighboring blocks for motion data is invoked with mbPartIdx, subMbPartIdx, currSubMbType, and listSuffixFlag=X (with X being 0 or 1 for refIdxLX being refIdxL0 or refIdxL1, respectively) as the input and with mbAddrN\mbPartIdxN\subMbPartIdxN, reference indices refIdxLXN and the motion vectors mvLXN (N means A, B, or C) as the output.

On the other hand, when refIdxLX is a reference index of an inter-view reference component or an inter-view only reference component, the depth-based derivation process for median luma motion vector prediction in the modification process for inter-view motion vector in the median luma motion prediction is invoked with mbAddrN\mbPartIdxN\subMbPartIdxN, mvLXN, refIdxLXN (with N being replaced by A, B, or C), and refIdxLX as the input and the output is assigned to the motion vector predictor mvpLX.

Otherwise, when refIdxLX is a reference index of a reference picture that is not an inter-view reference component or an inter-view only reference component, the depth-based derivation process for median luma temporal motion vector prediction in subclause J.8.2.1.7.2 is invoked with mbAddrN\mbPartIdxN\subMbPartIdxN, mvLXN, refIdxLXN (with N being replaced by A, B, or C), and refIdxLX as the input and the output is assigned to the motion vector predictor mvpLX.

In addition, when MbPartWidth(mb_type) is equal to 8, MbPartHeight(mb_type) is equal to 16, mbPartIdx is equal to mvpLX=mvLXC to 1, refIdxLXC is equal to refIdxLX. The motion vector predictor mvpLX is derived as mvpLX=mvLXC.

In the depth-based derivation process for median luma motion vector prediction, inputs to this process are the neighboring partitions mbAddrN\mbPartIdxN\subMbPartIdxN (with N being replaced by A, B, or C), the motion vectors mvLXN (with N being replaced by A, B, or C) of the neighboring partitions, the reference indices refIdxLXN (with N being replaced by A, B, or C) of the neighboring partitions, and the reference index refIdxLX of the current partition. Output of this process is the motion vector prediction mvpLX.

When the partition mbAddrN\mbPartIdxN\subMbPartIdxN is available or refIdxLXN is not equal to refIdxLX, mvLXN is derived as specified by the following ordered steps.

If TextureFirstFlag is equal to 0, the following steps apply in order.

The inverse macroblock scanning process is invoked with CurrMbAddr as the input and the output is assigned to (x1, y1).

The inverse macroblock partition scanning process is invoked with mbPartIdx as the input and the output is assigned to (dx1, dy1).

The inverse sub-macroblock partition scanning process is invoked with mbPartIdx and subMbPartIdx as the inputs and the output is assigned to (dx2, dy2).

The modification process of inter-view motion vectors in the median luma motion vector prediction is invoked with depthPic set to DepthRefPicList0[refIdxL0], mbx1 set to x1, and mby1 set to y1 as the input, and the output is assigned to the motion vector mvLXN.

On the other hand, when TextureFirstFlag is equal to 1, mvLXN is set to (DvMBX, 0).

Each component of the motion vector prediction mvpLX is given by the median of the corresponding vector components of the motion vector mvLXA, mvLXB, and mvLXC.

TABLE 28

| |
|---|
| mvpLX[0] = Median(mvLXA[0], mvLXB[0], mvLXC[0]) |
| mvpLX[1] = Median(mvLXA[1], mvLXB[1], mvLXC[1]) |

In the modification process for inter-view motion vector in the median luma motion vector prediction, the input includes the depth reference view component depthPic and the location of a top-left sample (mbx1, mby1) of a current macroblock, and the output includes the motion vector mv. At this time, refViewId may be set to the view_id value of depthPic. The depth-based disparity vector value derivation process may be invoked with depthPic equal to DepthCurrPic, textureX equal to mbx1, textureY equal to mby1, tB1Width equal to 16, tB1Height equal to 16, srcViewId equal to view_id, and refViewId equal to refViewId as the input, and the output is assigned to mv[0]. mv[1] is set to 0.

In the depth-based derivation process for median luma temporal motion vector prediction, inputs to this process are the neighboring partitions mbAddrN\mbPartIdxN\subMbPartIdxN (with N being replaced by A, B, or C), the motion vectors mvLXN (with N being replaced by A, B, or C) of the neighboring partitions, the reference indices refIdxLXN (with N being replaced by A, B, or C) of the neighboring partitions, and the reference index refIdxLX of the current partition. Output of this process may include the motion vector prediction mvpLX.

When the partition mbAddrN\mbPartIdxN\subMbPartIdxN is available or refIdxLXN is not equal to refIdxLX, mvLXN may be derived as specified by the following ordered steps.

1. When TextureFirstFlag is equal to 0, the inverse macroblock scanning process is invoked with CurrMbAddr as the input and the output is assigned to (x1, y1).

2. When TextureFirstFlag is equal to 0, the inverse macroblock partition scanning process is invoked with mbPartIdx as the input and the output is assigned to (dx1, dy1).

3. When TextureFirstFlag is equal to 0, the inverse sub-macroblock partition scanning process is invoked with mbPartIdx and subMbPartIdx as the inputs and the output is assigned to (dx2, dy2).

4. When TextureFirstFlag is equal to 0, the derivation process for inter-view and disparity vector and reference is invoked with depthPic set to DepthCurrPic, mbx1 set to x1, mby1 set to y1, and listSuffixFlag as the inputs, and InterViewPic, an offset vector dV, and the variable interViewAvailable are output.

5. When TextureFirstFlag is equal to 1, dV is set equal to (DvMBX, 0) and the variable interViewAvailable is set equal to InterViewRefAvailable.

6. refIdxCorrespond and mvCorrespond are set as follows.

When interViewAvailable is equal to 0, refIdxCorrespond is set to −1. mvCorrespond [0] and mvCorrespond [1] are both set to 0.

Otherwise, the following steps apply in order.

The variable luma4x4BlkIdx is set to a value of (4*mbPartIdx+subMbPartIdx).

The inverse 4x4 luma block scanning process is invoked with luma4x4BlkIdx as the input and (x, y) as the output. In addition, (xCorrespond, yCorrespond) is set equal to (x+(dV[0]>>4), y+(dV[1]>>4)) and mbAddrCorrespond is set equal to ((CurrMbAddr/PicWidthInMbs)+(dV[1]>>6))*PicWidthInMbs+(CurrMbAddr % PicWidthInMbs)+(dV[0]>>6).

mbTypeCorrespond is set to the syntax element mb_type of the macroblock having the address of mbAddrCorrespond within the picture InterViewPic. When mbTypeCorrespond is equal to P_8x8, P_8x8ref0, or B_8x8, subMbTypeCorrespond is set to the syntax element sub_mb_type of the macroblock having the address of mbAddrCorrespond within the picture InterViewPic.

mbPartIdxCorrespond is set to the macroblock partition index of the corresponding partition and subMbPartIdxCorrespond is set to the sub-macroblock partition index of the corresponding sub-macroblock partition. The derivation for macroblocks and sub-macroblock indices as specified in subclause 6.4.12.4 uses the luma location equal to (xCorrespond, yCorrespond), the macroblock type equal to mbTypeCorrespond, and the list subMbTypeCorrespond of sub-macroblock types when mbTypeCorrespond is equal to P_8x8, P_8x8ref0, or B_8x8 as inputs, and outputs are the macroblock partition index mbPartIdxCorrespond and the sub-macroblock partition index subMbPartIdxCorrespond.

The motion vector mvCorrespond and the reference index refIdxCorrespond are derived as follows. If the macroblock mbAddrCorrespond is coded in an Intra prediction mode, components of mvCorrespond are set equal to 0 and refIdxCorrespond is set equal to −1. Otherwise (the macroblock mbAddrCorrespond is not coded as Intra prediction mode), the prediction utilization flags predFlagLXCorrespond is set equal to PredFlagLX[mbPartIdxCorrespond], the prediction utilization flag of the macroblock partition mbAddrCorrespond\mbPartIdxCorrespond of the picture InterViewPic.

In addition, when predFlagLXCorrespond is equal to 1, the mvCorrespond and the reference index refIdxCorrespond are set equal to MvLX[mbPartIdxCorrespond][subMbPartIdxCorrespond] and RefIdxLX[mbPartIdxCorrespond], respectively.

MvLX[mbPartIdxCorrespond][subMbPartIdxCorrespond] and RefIdxLX[mbPartIdxCorrespond] are the motion vector mvLX and the reference index refIdxLXd that have been as signed to the (sub-)macroblock partition mbAddrCorrespondmbPartIdxCorrespond\subMbPartIdxCorrespond inside the picture InterViewPic.

7. The motion vector mvLXN is derived as follows.

When refIdxCorrespond is equal to refIdxLX, the following applies.

TABLE 29

| |
|---|
| mvLXN[0] = mvCorrespond[0] |
| mvLXN[1] = mvCorrespond[1] |

Otherwise, the following applies.

TABLE 30 mvLXN[0] = 0
mvLXN[1] = 0

8. For the derivation of mvpLX[0] and mvpLX[1], the following equation applies.

TABLE 31 mvpLX[0] = Median(mvLXA[0], mvLXB[0], mvLXC[0])
mvpLX[1] = Median(mvLXA[1], mvLXB[1], mvLXC[1])

The derivation process for disparity vector and inter-view reference may apply as follows.

Inputs to this process include depth reference view component depthPic, the location of a top-left sample (mbx1, mby1) of a current macroblock, and listSuffixFlag, and outputs of this process include a picture InterViewPic, an offset vector dV, and the variable interViewAvailable.

The variable InterViewAvailable is set to 0.

The following algorithm applies to derive an inter-view reference picture or inter-view only reference picture, InterViewPic, with X set to 1 when listFuffixFlag is 1 or 0 otherwise.

TABLE 32

```
for(cIdx = 0;cIdx<num_ref_idx_l0_active_minus1 + 1
&& !interViewAvailable; cIdx + + )
    if (view order index of RefPicList0[cIdx] is not equal to
    view_idx) {
        InterViewPic = RefPicList0[cIdx]
        interViewAvailable = 1
    }
```

When interViewAvailable is equal to 1, the depth-based disparity vector value derivation process is invoked with depthPic equal to DepthCurrPic, textureX equal to mbx1, textureY equal to mby1, tB1Width equal to 16, tB1Height equal to 16, srcViewId equal to view_id, and refViewId equal to refViewId as the input, and the output is assigned to dV.

FIG. 6 is a diagram for describing an operation of an encoding apparatus in detail, according to an embodiment.

Specifically, FIG. 6 illustrates a process by which the encoding apparatus encodes a color image. According to an embodiment, a process by which the encoding apparatus encodes a color image is as follows. The encoding apparatus may receive the color image (610) and select an encoding mode (645). The encoding apparatus may determine a residual signal between the color image and a prediction image derived through a block-based prediction (block prediction), based on the selected encoding mode. The encoding apparatus may perform transformation (615), quantization (620), and entropy encoding (625) on the residual signal.

The block-based prediction process may include a temporal prediction for reducing temporal redundancy and an inter-view prediction for reducing inter-view redundancy.

A deblocking filtering process (675) may be performed for accurate prediction in a next color image. In order to perform the deblocking filtering process (675), a dequantizing process (630) and an inverse transformation process (635) may be performed on the quantized image (620). Reference images generated through the deblocking filtering process (725) may be stored and used in a process of encoding a next color image.

The encoding apparatus may perform a prediction process for removing the temporal redundancy and the inter-view redundancy through intra prediction (650), motion prediction/compensation (655), or disparity prediction/compensation (660). The encoding apparatus may perform the motion prediction/compensation (655) and the disparity prediction/compensation (660). The encoding apparatus may perform a process (665) of transforming depth information (670) (e.g., a depth value) into disparity information (e.g., disparity vector) based on camera parameter (640) for the motion prediction/compensation (655), and perform a process (655) of the motion prediction/compensation by using the disparity information. Alternatively, the encoding apparatus may perform the process of the motion prediction/compensation (655) by using information of the depth value preset for the motion prediction/compensation (655) or information of global disparity vectors.

Alternatively, the encoding apparatus may perform a process of transforming (665) depth information (670) (e.g., a depth value) into disparity information (e.g., disparity vector) based on camera parameter (640) for the disparity prediction/compensation (660), and perform a process of the disparity prediction/compensation (660). Alternatively, as described above, the encoding apparatus may perform the process of the disparity prediction/compensation (660) by using information of the depth value preset for the disparity prediction/compensation (660) or information of global disparity vectors.

As the prediction image derived through the block-based prediction is more similar to the source image, an amount of a residual signal may be reduced and the number of bits encoded and generated may be reduced accordingly. Therefore, the processes of the motion prediction/compensation (655) and the disparity prediction/compensation (660) are important for the efficient encoding of the 3D video.

The encoding apparatus may perform the process of the motion prediction/compensation (655) of the current block by using information of the depth value preset during the motion prediction/compensation (655), information of global disparity vectors, motion vector information of neighboring blocks, encoding information about color images of different views, or a depth image corresponding to the current block. In addition, as described above, the encoding apparatus may perform the process of the disparity prediction/compensation (660) of the current block by using information of the depth value preset during the disparity prediction/compensation (660), information of global disparity vectors, disparity vector information of neighboring blocks, encoding information about color images of different views, or a depth image corresponding to the current block.

FIG. 7 is a diagram for describing an operation of a decoding apparatus in detail, according to an embodiment.

The decoding apparatus may perform the operation of the encoding apparatus of FIG. 6 in reverse order, so as to decode the encoded bitstream and output the color image. According to an embodiment, a process by which the decoding apparatus decodes encoded 3D image data is as follows. The decoding apparatus may receive (705) a bitstream including encoded 3D image data and perform entropy decoding (710).

Then, the decoding apparatus may perform dequantization (715) and inverse transformation (720) and select a decoding mode (740). The decoding apparatus may efficiently decode the bitstream through intra prediction (745), motion prediction/compensation (750), or disparity prediction/compensation (755) according to the selected decoding mode.

The decoding apparatus may perform the motion prediction/compensation (750) and the disparity prediction/compensation (755). The decoding apparatus may perform a process (760) of transforming depth information (765) into disparity information based on camera parameter (735) for the motion prediction/compensation (750), and perform a process of the motion prediction/compensation (750) by using the disparity information. Alternatively, the decoding apparatus may perform the process of the motion prediction/compensation (750) by using information of the depth value preset for the motion prediction/compensation (750) or information of global disparity vectors.

Alternatively, the decoding apparatus may perform a process (760) of transforming depth information (765) into disparity information based on camera parameter (735) for the disparity prediction/compensation (755), and perform a process of the disparity prediction/compensation (755). Alternatively, the decoding apparatus may perform the process of the disparity prediction/compensation (755) by using information of the depth value preset for the motion prediction/compensation (755) or information of global disparity vectors.

As described above, the decoding apparatus may perform the process of the motion prediction/compensation (750) of the current block by using information of the depth value preset during the motion prediction/compensation (750), information of global disparity vectors, motion vector information of neighboring blocks, decoding information about color images of different views, or a depth image corresponding to the current block. In addition, the image processing apparatus may perform the process of the disparity prediction/compensation (755) of the current block by using information of the depth value preset during the disparity prediction/compensation (755), information of global disparity vectors, disparity vector information of neighboring blocks, decoding information about color images of different views, or a depth image corresponding to the current block.

A deblocking filtering process (725) may be performed for decoding of a next color image. Reference images generated through the deblocking filtering process (725) may be stored and used in a process of decoding a next color image.

The video encoding method and the video decoding method, which are performed by the video encoding apparatus and the video decoding apparatus, may be used for encoding and decoding interlayer video in an interlayer video encoding apparatus and an interlayer video decoding method.

The interlayer video encoding apparatus according to various embodiments may classify and encode a plurality of image sequences for each layer according to scalable video coding and may output a separate stream including data encoded for each layer. The interlayer video encoding apparatus may encode first layer image sequences and second layer image sequences according to different layers.

A first layer encoder may encode first layer images and output a first layer stream including encoded data of the first layer images.

A second layer encoder may encode second layer images and output a second layer stream including encoded data of the first layer images.

For example, according to scalable video coding based on spatial scalability, low resolution images may be encoded as the first layer images, and high resolution images may be encoded as the second layer images. An encoding result of the first layer images may be output in a first layer stream. An encoding result of the second layer images may be output in a second layer stream.

As another example, a multi-view video may be encoded according to scalable video coding. Left view images may be encoded as first layer images, and right view images may be encoded as second layer images. Alternatively, center view images, the left view images, and the right view images may be encoded. Among them, the center view images may be encoded as the first layer images, the left view images may be encoded as the first and second layer images, and the right view images may be encoded as second layer images.

As another example, scalable video coding may be performed according to temporal hierarchical prediction based on temporal scalability. A first layer stream including encoding information generated by encoding images of a base frame rate may be output. Temporal levels may be classified for each frame rate and may be respectively encoded in layers. A second layer stream including encoding information of a high speed frame rate may be output by further encoding images of the high frame rate with reference to the images of the basic frame rate.

Scalable video coding may be performed on a first layer and a plurality of second layers. In the presence of three or more second layers, first layer images, first second layer images, second second layers images, . . . , Kth second layer images may be encoded. Accordingly, an encoding result of the first layer images may be output in the first layer stream, and encoding results of the first second layer images, second second layers images, . . . , Kth second layer images may be respectively output in first, second, . . . Kth second layer streams.

The interlayer video encoding apparatus according to various embodiments may perform inter prediction for predicting a current image by referring to images of a single layer. A motion vector indicating motion information between the current image and a reference image and a residual between the current image and the reference image may be generated through inter prediction.

The interlayer video encoding apparatus may perform inter-layer prediction for predicting prediction second layer images by referring to the first layer images.

When the interlayer video encoding apparatus 10 according to an embodiment permits three or more layers such as a first layer, a second layer, a third layer, etc., the interlayer video encoding apparatus 10 may perform inter-layer prediction between a first layer image and a third layer image and inter-layer prediction between a second layer image and the third layer image according to a multi-layer prediction structure.

A position differential component between the current image and a reference image of a different layer and a residual between the current image and the reference image of the different layer may be generated through inter-layer prediction.

The interlayer video encoding apparatus according to various embodiments encodes each video image for each respective block according to each layer. A block may have a square shape, a rectangular shape, or any geometric shape and is not limited to a data unit having a predetermined size. A block may be a largest coding unit, a coding unit, a prediction unit, a transform unit, or the like from among coding units according to a tree structure. The largest coding unit including coding units having the tree structure is diversely referred to as a coding block unit, a block tree, a root block tree, a coding tree, a coding root or a tree trunk.

Video encoding and decoding methods based on coding units having the tree structure will now be described with reference to FIGS. 8 through 20.

In the encoding apparatus according to an embodiment and the interlayer video decoding apparatus according to an embodiment, video data may be split into coding units having a tree structure, and coding units, prediction units, and transform units may be used for inter layer prediction or inter prediction on the coding units. Hereinafter, a video encoding method and apparatus and a video decoding method and apparatus based on coding units having a tree structure according to an embodiment will be described with reference to FIGS. 8 through 20.

In principle, during encoding/decoding for multi-layer video, encoding/decoding processes for first layer images and encoding/decoding processes for second layer images are separately performed. That is, when inter-layer prediction is performed on a multi-layer video, encoding/decoding results of a single-layer video are referred to each other, but separate encoding/decoding processes are performed for respective single-layer videos.

For convenience of description, since a video encoding process and a video decoding process based on a coding unit according to a tree structure, which will be described with reference to FIGS. 8 through 20, are performed on a single-layer video, only inter prediction and motion compensation will be described.

Figure 8:
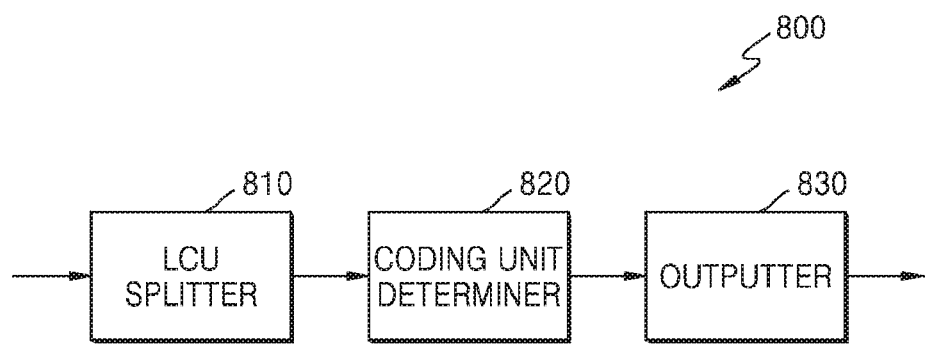
FIG. 8 is a block diagram of a video encoding apparatus based on coding units according to a tree structure, according to an embodiment.

Thus, when the disparity vector determiner of the interlayer video encoding apparatus according to an embodiment encodes a multi-layer video based on a coding unit according to a tree structure, in order to encode a video for each respective single-view video, the interlayer video encoding apparatus includes as many video encoding apparatuses 800 of FIG. 8 as the number of layers of the multi-layer video in order to encode a video such that each video encoding apparatus 800 may be controlled to encode an assigned single-layer video. In addition, the interlayer video encoding apparatus may perform inter-view prediction by using the encoding results of separate single-views of each video encoding apparatus 800. Thus, the disparity vector determiner of the interlayer video encoding apparatus may generate a base layer video stream and a second layer video stream, in which the encoding results for respective layers are recorded, for each respective hierarchy.

Figure 9:
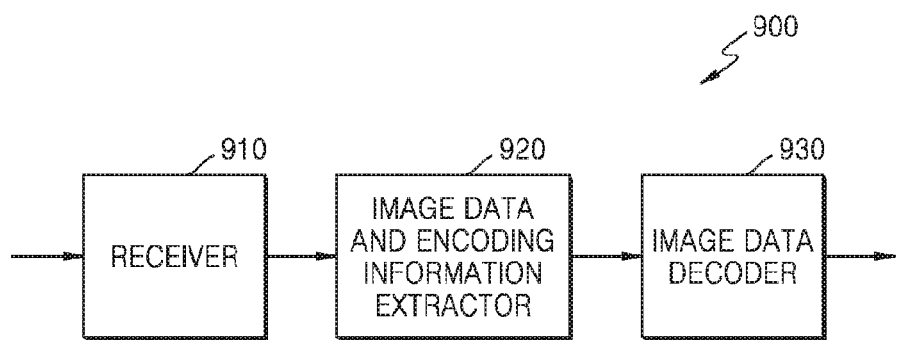
FIG. 9 is a block diagram of a video decoding apparatus based on coding units according to a tree structure, according to an embodiment.

Similarly, when the candidate list determiner of the interlayer video decoding apparatus according to an embodiment decodes a multi-layer video based on a coding unit according to a tree structure, in order to decode the received base layer video stream and second layer video stream for each respective layer, the interlayer video decoding apparatus may include as many video decoding apparatuses 900 of FIG. 9 as the number of layers of the multi-view video and the video decoding apparatuses 900 may be controlled to perform decoding on single-layer videos that are respectively assigned to the video decoding apparatuses 900. In addition, the interlayer video encoding apparatus may perform inter-view compensation by using the decoding result of separate single-layer of each video decoding apparatuses 900. Thus, the candidate list determiner of the interlayer video decoding apparatus may generate first layer images and second layer images, which are reconstructed for respective layers.

FIG. 8 is a block diagram of a video encoding apparatus 800 based on coding units according to a tree structure, according to one or more embodiments.

The video encoding apparatus 800 involving video prediction based on coding units according to a tree structure includes a LCU splitter 810, a coding unit determiner 820, and an outputter 830.

The LCU splitter 810 may split a current picture based on a LCU that is a coding unit having a maximum size for a current picture of an image. If the current picture is larger than the LCU, image data of the current picture may be split into the at least one LCU. The LCU according to one or more embodiments may be a data unit having a size of 32×32, 64×64, 128×128, 256×256, etc., wherein a shape of the data unit is a square having a width and length in squares of 2. The image data may be output to the coding unit determiner 820 according to the at least one LCU.

A coding unit according to one or more embodiments may be characterized by a maximum size and a depth. The depth denotes the number of times the coding unit is spatially split from the LCU, and as the depth deepens, deeper coding units according to depths may be split from the LCU to a smallest coding unit (SCU). A depth of the LCU is an uppermost depth and a depth of the SCU is a lowermost depth. Since a size of a coding unit corresponding to each depth decreases as the depth of the LCU deepens, a coding unit corresponding to an upper depth may include a plurality of coding units corresponding to lower depths.

As described above, the image data of the current picture is split into the LCUs according to a maximum size of the coding unit, and each of the LCUs may include deeper coding units that are split according to depths. Since the LCU according to one or more embodiments is split according to depths, the image data of the space domain included in the LCU may be hierarchically classified according to depths.

A maximum depth and a maximum size of a coding unit, which limit the total number of times a height and a width of the LCU are hierarchically split, may be predetermined.

The coding unit determiner 820 encodes at least one split region obtained by splitting a region of the LCU according to depths, and determines a depth to output a finally encoded image data according to the at least one split region. In other words, the coding unit determiner 820 determines a depth by encoding the image data in the deeper coding units according to depths, according to the LCU of the current picture, and selecting a depth having the least encoding error. The determined depth and the encoded image data according to the determined depth are output to the outputter 830.

The image data in the LCU is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one depth may be selected for each LCU.

The size of the LCU is split as a coding unit is hierarchically split according to depths, and as the number of coding units increases. Also, even if coding units correspond to the same depth in one LCU, it is determined whether to split each of the coding units corresponding to the same depth to a lower depth by measuring an encoding error of the image data of the each coding unit, separately. Accordingly, even when image data is included in one LCU, the encoding errors may differ according to regions in the one LCU, and thus the depths may differ according to regions in the image data. Thus, one or more depths may be determined in one LCU, and the image data of the LCU may be divided according to coding units of at least one depth.

Accordingly, the coding unit determiner 820 may determine coding units having a tree structure included in the LCU. The 'coding units having a tree structure' according to one or more embodiments include coding units corresponding to a depth determined to be the depth, from among all deeper coding units included in the LCU. A coding unit of a depth may be hierarchically determined according to depths in the same region of the LCU, and may be independently determined in different regions. Similarly, a depth in a current region may be independently determined from a depth in another region.

A maximum depth according to one or more embodiments is an index related to the number of splitting times from a LCU to an SCU. A first maximum depth according to one or more embodiments may denote the total number of splitting times from the LCU to the SCU. A second maximum depth according to one or more embodiments may denote the total number of depth levels from the LCU to the SCU. For example, when a depth of the LCU is 0, a depth of a coding unit, in which the LCU is split once, may be set to 1, and a depth of a coding unit, in which the LCU is split twice, may be set to 2. Here, if the SCU is a coding unit in which the LCU is split four times, 5 depth levels of depths 0, 1, 2, 3, and 4 exist, and thus the first maximum depth may be set to 4, and the second maximum depth may be set to 5.

Prediction encoding and transformation may be performed according to the LCU. The prediction encoding and the transformation are also performed based on the deeper coding units according to a depth equal to or depths less than the maximum depth, according to the LCU.

Since the number of deeper coding units increases whenever the LCU is split according to depths, encoding, including the prediction encoding and the transformation, is performed on all of the deeper coding units generated as the depth deepens. For convenience of description, the prediction encoding and the transformation will now be described based on a coding unit of a current depth, in a LCU.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 800 may select not only a coding unit for encoding the image data, but also a data unit different from the coding unit so as to perform the prediction encoding on the image data in the coding unit.

In order to perform prediction encoding in the LCU, the prediction encoding may be performed based on a coding unit corresponding to a depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 800 may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the data unit for the transformation may include a data unit for an intra mode and a data unit for an inter mode.

The transform unit in the coding unit may be recursively split into smaller sized regions in the similar manner as the coding unit according to the tree structure. Thus, residues in the coding unit may be divided according to the transform unit having the tree structure according to transformation depths.

A transformation depth indicating the number of splitting times to reach the transform unit by splitting the height and width of the coding unit may also be set in the transform unit. For example, in a current coding unit of 2N×2N, a transformation depth may be 0 when the size of a transform unit is 2N×2N, may be 1 when the size of the transform unit is N×N, and may be 2 when the size of the transform unit is N/2×N/2. In other words, the transform unit having the tree structure may be set according to the transformation depths.

Encoding information according to coding units corresponding to a depth requires not only information about the depth, but also about information related to prediction encoding and transformation. Accordingly, the coding unit determiner 820 not only determines a depth having a least encoding error, but also determines a partition mode in a prediction unit, a prediction mode according to prediction units, and a size of a transform unit for transformation.

Coding units according to a tree structure in a LCU and methods of determining a prediction unit/partition, and a transform unit, according to one or more embodiments, will be described in detail below with reference to FIGS. 7 through 19.

The coding unit determiner 820 may measure an encoding error of deeper coding units according to depths by using Rate-Distortion Optimization based on Lagrangian multipliers.

The outputter 830 outputs the image data of the LCU, which is encoded based on the at least one depth determined by the coding unit determiner 820, and information about the encoding mode according to the depth, in bitstreams.

The encoded image data may be obtained by encoding residues of an image.

The information about the encoding mode according to depth may include information about the depth, about the partition mode in the prediction unit, the prediction mode, and the size of the transform unit.

The information about the depth may be defined by using splitting information according to depths, which indicates whether encoding is performed on coding units of a lower depth instead of a current depth. If the current depth of the current coding unit is the depth, image data in the current coding unit is encoded and output, and thus the splitting information may be defined not to split the current coding unit to a lower depth. Alternatively, if the current depth of the current coding unit is not the depth, the encoding is performed on the coding unit of the lower depth, and thus the splitting information may be defined to split the current coding unit to obtain the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one LCU, and information about at least one encoding mode is determined for a coding unit of a depth, information about at least one encoding mode may be determined for one LCU. Also, a depth of the image data of the LCU may be different according to locations since the image data is hierarchically split according to depths, and thus splitting information may be set for the image data.

Accordingly, the outputter 830 may assign corresponding splitting information to at least one of the coding unit, the prediction unit, and a minimum unit included in the LCU.

The minimum unit according to one or more embodiments is a square data unit obtained by splitting the SCU constituting the lowermost depth by 4. Alternatively, the minimum unit according to an embodiment may be a maximum square data unit that may be included in all of the coding units, prediction units, partition units, and transform units included in the LCU.

For example, the encoding information output by the outputter 830 may be classified into encoding information according to deeper coding units, and encoding information according to prediction units. The encoding information according to the deeper coding units may include the information about the prediction mode and about the size of the partitions.

The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transform unit permitted with respect to a current video, and information about a minimum size of the transform unit may also be output through a header of a bitstream, a sequence parameter set, or a picture parameter set.

The outputter 830 may encode and output SAO parameter related to the SAO operation described above with reference to FIGS. 1A through 14.

In the video encoding apparatus 800, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×N may include a maximum of 4 of the coding units with the lower depth.

Accordingly, the video encoding apparatus 800 may form the coding units having the tree structure by determining coding units having an optimum shape and an optimum size for each LCU, based on the size of the LCU and the maximum depth determined considering characteristics of the current picture. Also, since encoding may be performed on each LCU by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 800, image compression efficiency may be increased since a coding unit is adjusted while considering characteristics of an image while increasing a maximum size of a coding unit while considering a size of the image.

The interlayer video encoding apparatus including the structure described with reference to FIG. 1A may include as many video encoding apparatuses 800 as the number of layers in order to encode single-layer images for respective layers of a multi-layer video. For example, the disparity vector determiner may include a single video encoding apparatus 800 and the motion information obtainer may include as many video encoding apparatuses 800 as the number of additional views.

When the video encoding apparatus 800 encodes first layer images, the coding determiner 820 may determine a prediction unit for inter prediction for each respective coding unit according to a tree structure for each largest coding unit and may perform inter prediction for each respective prediction unit.

When the video encoding apparatus 800 encodes second layer images, the coding determiner 820 may also determine a prediction unit and a coding unit according to a tree structure for each largest coding unit and may perform inter prediction for each respective prediction unit.

The video encoding apparatus 800 may encode a brightness difference between first and second layer images for compensating for the brightness difference. However, whether to perform brightness compensation may be determined according to an encoding mode of a coding unit. For example, the brightness compensation may be performed only on a prediction unit of 2N×2N.

FIG. 9 is a block diagram of a video decoding apparatus 900 based on coding units having a tree structure, according to one or more embodiments.

The video decoding apparatus 900 that involves video prediction based on coding units having a tree structure includes a receiver 910, an image data and encoding information extractor 920, and an image data decoder 930.

Definitions of various terms, such as a coding unit, a depth, a prediction unit, a transform unit, and information about various encoding modes, for decoding operations of the video decoding apparatus 900 are identical to those described with reference to FIG. 8 and the video encoding apparatus 800.

The receiver 910 receives and parses a bitstream of an encoded video. The image data and encoding information extractor 920 extracts encoded image data for each coding unit from the parsed bitstream, wherein the coding units have a tree structure according to each LCU, and outputs the extracted image data to the image data decoder 930. The image data and encoding information extractor 920 may extract information about a maximum size of a coding unit of a current picture, from a header about the current picture, a sequence parameter set, or a picture parameter set.

Also, the image data and encoding information extractor 920 extracts splitting information and encoding information for the coding units having a tree structure according to each LCU, from the parsed bitstream. The extracted splitting information and encoding information are output to the image data decoder 930. In other words, the image data in a bit stream is split into the LCU so that the image data decoder 930 decodes the image data for each LCU.

The splitting information and encoding information according to the LCU may be set for at least one piece of splitting information corresponding to the depth, and encoding information according to the depth may include information about a partition mode of a corresponding coding unit corresponding to the depth, information about a prediction mode, and splitting information of a transform unit. Also, splitting information according to depths may be extracted as the information about a final depth.

The splitting information and the encoding information according to each LCU extracted by the image data and encoding information extractor 920 is splitting information and encoding information determined to generate a minimum encoding error when an encoder, such as the video encoding apparatus 800, repeatedly performs encoding for each deeper coding unit according to depths according to each LCU. Accordingly, the video decoding apparatus 900 may reconstruct an image by decoding the image data according to a depth and an encoding mode that generates the minimum encoding error.

Since the splitting information and the encoding information may be assigned to a predetermined data unit from among a corresponding coding unit, a prediction unit, and a minimum unit, the image data and encoding information extractor 920 may extract the splitting information and the encoding information according to the predetermined data units. If splitting information and encoding information of a corresponding LCU are recorded according to predetermined data units, the predetermined data units to which the same splitting information and encoding information are assigned may be inferred to be the data units included in the same LCU.

The image data decoder 930 reconstructs the current picture by decoding the image data in each LCU based on the splitting information and the encoding information according to the LCUs. In other words, the image data decoder 930 may decode the encoded image data based on the extracted information about the partition mode, the prediction mode, and the transform unit for each coding unit from among the coding units having the tree structure included in each LCU. A decoding process may include a prediction including intra prediction and motion compensation, and an inverse transformation.

The image data decoder 930 may perform intra prediction or motion compensation according to a partition and a prediction mode of each coding unit, based on the information about the partition mode and the prediction mode of the prediction unit of the coding unit according to depths.

In addition, the image data decoder 930 may read information about a transform unit according to a tree structure for each coding unit so as to perform inverse transformation based on transform units for each coding unit, for inverse transformation for each LCU. Via the inverse transformation, a pixel value of the space domain of the coding unit may be reconstructed.

The image data decoder 930 may determine a final depth of a current LCU by using splitting information according to depths. If the splitting information indicates that image data is no longer split in the current depth, the current depth is the final depth. Accordingly, the image data decoder 930 may decode encoded data in the current LCU by using the information about the partition mode of the prediction unit, the information about the prediction mode, and the splitting information of the transform unit for each coding unit corresponding to the depth.

In other words, data units containing the encoding information including the same splitting information may be gathered by observing the encoding information set assigned for the predetermined data unit from among the coding unit, the prediction unit, and the minimum unit, and the gathered data units may be considered to be one data unit to be decoded by the image data decoder 930 in the same encoding mode. As such, the current coding unit may be decoded by obtaining the information about the encoding mode for each coding unit.

The interlayer video decoding apparatus including the structure described with reference to FIG. 2A may include as many video decoding apparatuses 900 as the number of views in order to decode the received first layer image stream and second layer image stream to reconstruct first layer images and second layer images.

When a first layer image stream is received, the image data decoder 930 of the video decoding apparatus 900 may split samples of first layer images that are extracted from the first layer image stream by the extractor 920 into coding units according to a tree structure of a largest coding unit. The image data decoder 930 may perform motion compensation on respective prediction units for inter prediction for each respective coding unit according to a tree structure of the samples of the first layer images, to reconstruct the first layer images.

When a second layer image stream is received, the image data decoder 930 of the video decoding apparatus 900 may split samples of second layer images that are extracted from the second layer image stream by the extractor 920 into coding units according to a tree structure of a largest coding unit. The image data decoder 930 may perform motion compensation on respective prediction units for inter prediction of the samples of the second layer images to reconstruct the second layer images.

The extractor 920 may obtain information relating to a brightness order between first and second layer images from a bitstream in order to compensate for the brightness difference. However, whether to perform brightness compensation may be determined according to an encoding mode of a coding unit. For example, the brightness compensation may be performed only on a prediction unit of 2N×2N.

The video decoding apparatus 900 may obtain information about at least one coding unit that generates the minimum encoding error when encoding is recursively performed for each largest coding unit, and may use the information to decode the current picture. In other words, the coding units having the tree structure determined to be the optimum coding units in each largest coding unit may be decoded. Also, the maximum size of a coding unit is determined considering a resolution and an amount of image data.

Accordingly, even if image data has high resolution and a large amount of data, the image data may be efficiently decoded and reconstructed by using a size of a coding unit and an encoding mode, which are adaptively determined according to characteristics of the image data, by using information about an optimum encoding mode received from an encoder.

Figure 10:
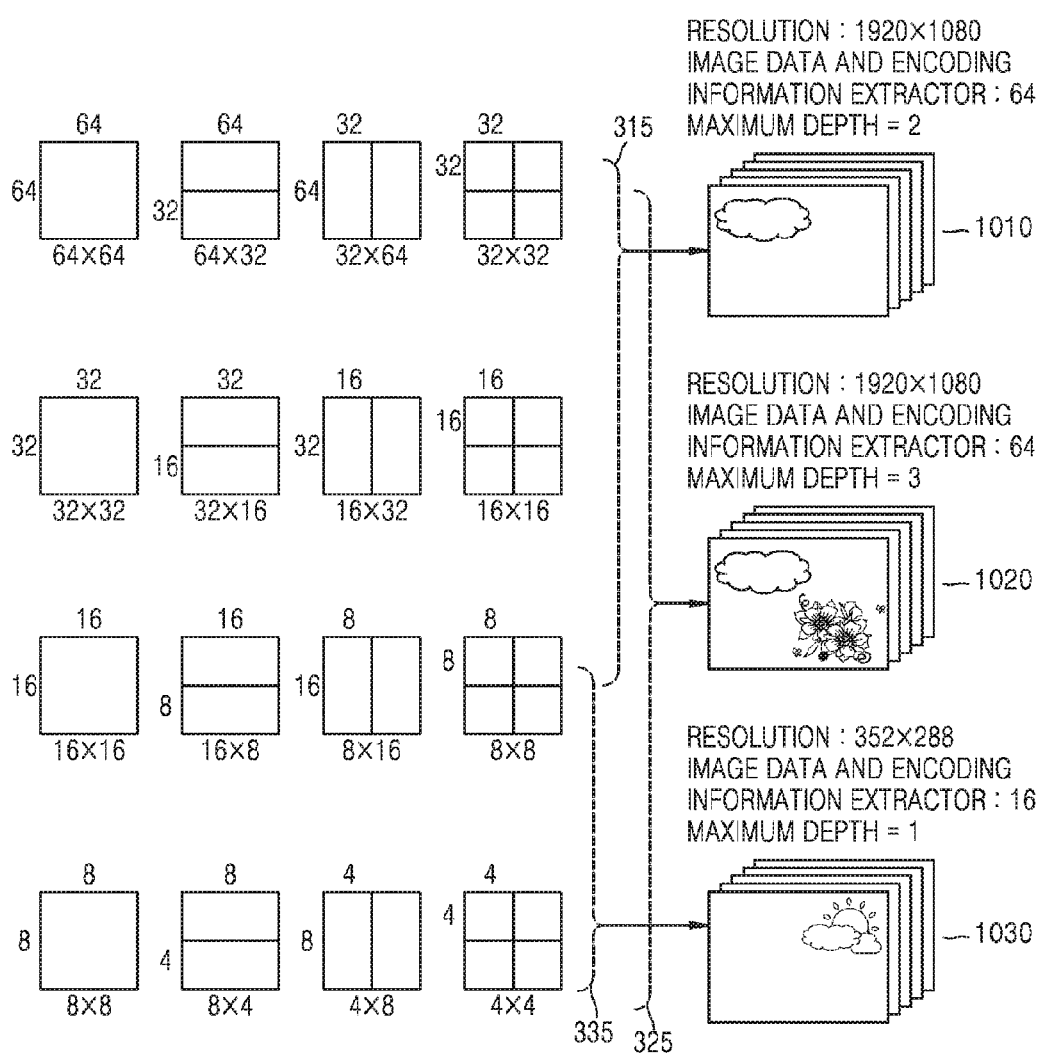
FIG. 10 is a diagram for describing a concept of coding units according to an embodiment.

FIG. 10 is a diagram for describing a concept of coding units according to various embodiments.

A size of a coding unit may be expressed by width x height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 1010, a resolution is 1920×1080, a maximum size of a coding unit is 64, and a maximum depth is 2. In video data 1020, a resolution is 1920×1080, a maximum size of a coding unit is 64, and a maximum depth is 3. In video data 1030, a resolution is 352×288, a maximum size of a coding unit is 16, and a maximum depth is 1. The maximum depth shown in FIG. 10 denotes a total number of splits from a LCU to a smallest decoding unit.

If a resolution is high or a data amount is large, a maximum size of a coding unit may be large so as to not only increase encoding efficiency but also to accurately reflect characteristics of an image. Accordingly, the maximum size of the coding unit of the video data 1010 and 1020 having a higher resolution than the video data 1030 may be 64.

Since the maximum depth of the video data 1010 is 2, coding units 1015 of the vide data 1010 may include a LCU having a long axis size of 64, and coding units having long axis sizes of 32 and 16 since depths are deepened to two layers by splitting the LCU twice. Since the maximum depth of the video data 1030 is 1, coding units 1035 of the video data 1030 may include a LCU having a long axis size of 16, and coding units having a long axis size of 8 since depths are deepened to one layer by splitting the LCU once.

Since the maximum depth of the video data 1020 is 3, coding units 1025 of the video data 1020 may include a LCU having a long axis size of 64, and coding units having long axis sizes of 32, 16, and 8 since the depths are deepened to 3 layers by splitting the LCU three times. As a depth deepens, detailed information may be precisely expressed.

Figure 11:
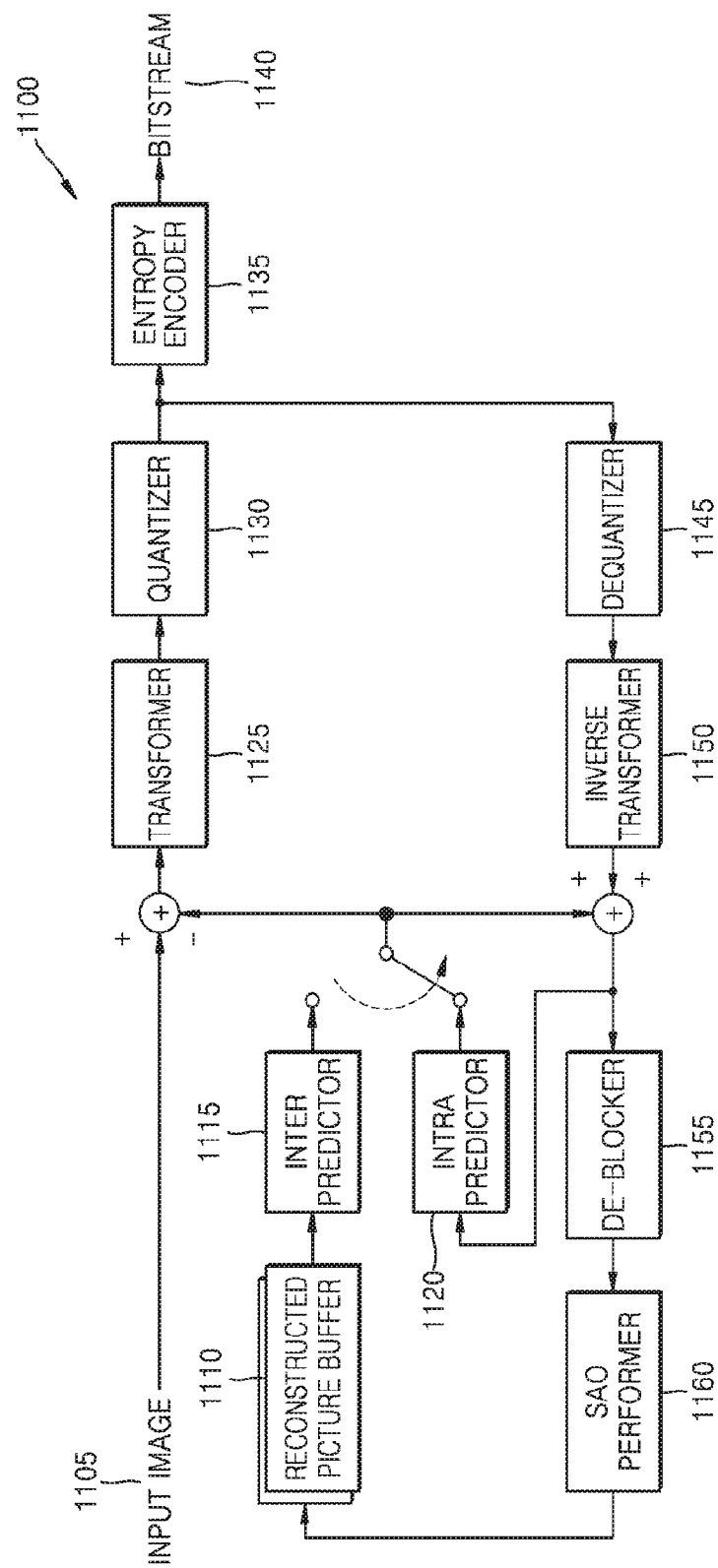
FIG. 11 is a block diagram of a video encoder based on coding units, according to an embodiment.

FIG. 11 is a block diagram of a video encoder 1100 based on coding units, according to one or more embodiments.

The video encoder 1100 performs operations necessary for encoding image data in the coding unit determiner 1520 of the video encoding apparatus 800. In other words, an intra predictor 1120 performs intra prediction on coding units in an intra mode according to prediction units, from among a current frame 1105, and an inter predictor 1115 performs inter prediction on coding units in an inter mode by using a current image 1105 and a reference image obtained from a reconstructed picture buffer 1110 according to prediction units. The current image 1105 may be split into LCUs and then the LCUs may be sequentially encoded. In this regard, the LCUs that are to be split into coding units having a tree structure may be encoded.

Residue data is generated by removing prediction data regarding coding units of each mode that is output from the intra predictor 1120 or the inter predictor 1115 from data regarding encoded coding units of the current image 1105, and is output as a quantized transformation coefficient according to transform units through a transformer 1125 and a quantizer 1130. The quantized transformation coefficient is reconstructed as the residue data in a space domain through a dequantizer 1145 and an inverse transformer 1150. The reconstructed residue data in the space domain is added to prediction data for coding units of each mode that is output from the intra predictor 1120 or the inter predictor and thus is reconstructed as data in a space domain for coding units of the current image 1105. The reconstructed data in the space domain is generated as reconstructed images through a de-blocker 1155 and an SAO performer 1160 and the reconstructed images are stored in the reconstructed picture buffer 1110. The reconstructed images stored in the reconstructed picture buffer 1110 may be used as reference images for inter prediction of another image. The transformation coefficient quantized by the transformer 1125 and the quantizer 1130 may be output as a bitstream 1140 through an entropy encoder 1135.

In order for the video encoder 1100 to be applied in the video encoding apparatus 800, all elements of the video encoder 1100, i.e., the inter predictor 1115, the intra predictor 1120, the transformer 1125, the quantizer 1130, the entropy encoder 1135, the dequantizer 1145, the inverse transformer 1150, the de-blocker 1155, and the SAO performer 1160, perform operations based on each coding unit among coding units having a tree structure according to each LCU.

Specifically, the intra predictor 1120 and the inter predictor 1115 may determine a partition mode and a prediction mode of each coding unit among the coding units having a tree structure in consideration of a maximum size and a maximum depth of a current LCU, and the transformer 1125 may determine whether to split a transform unit having a quad tree structure in each coding unit among the coding units having a tree structure.

Figure 12:
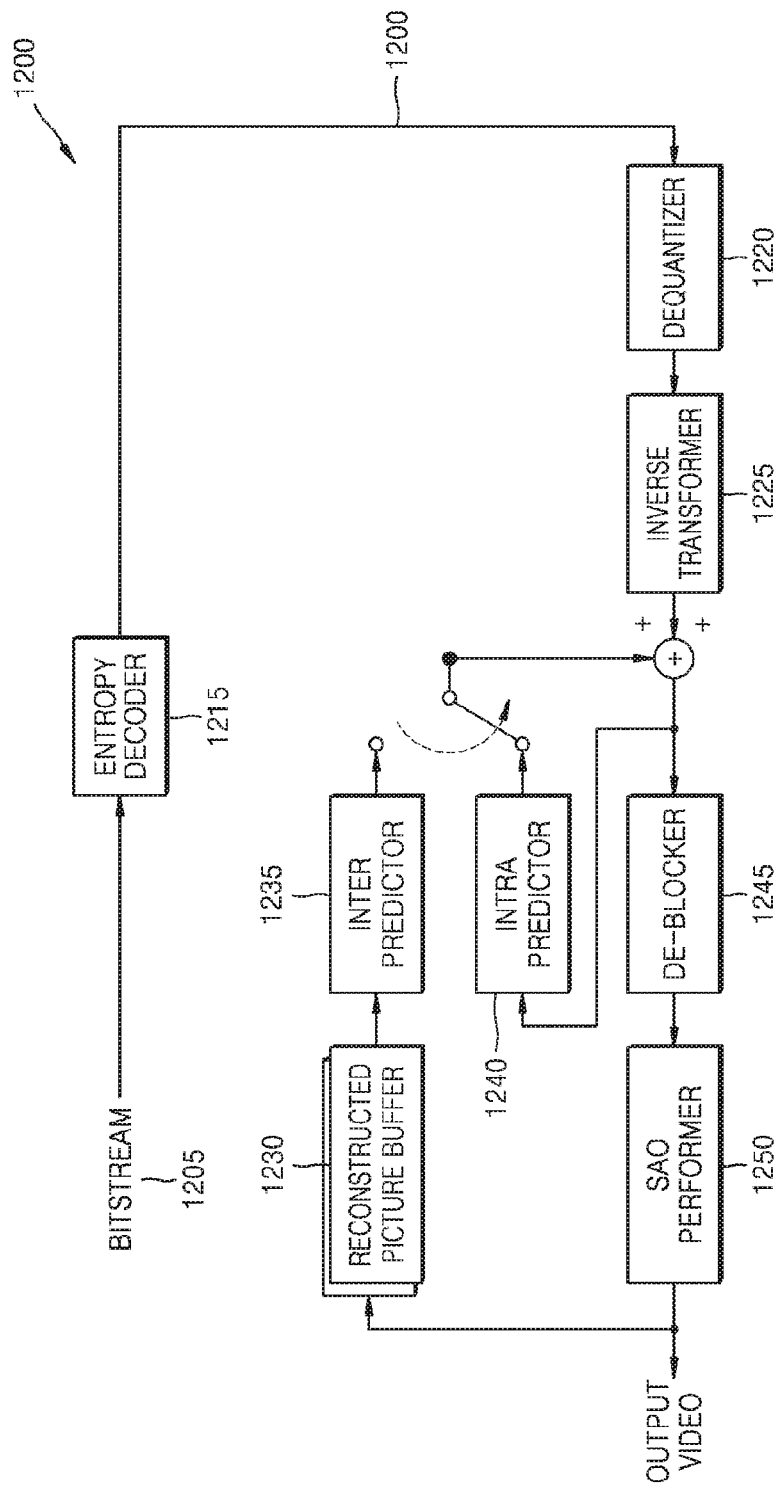
FIG. 12 is a block diagram of a video decoder based on coding units, according to an embodiment.

FIG. 12 is a block diagram of a video decoder 1200 based on coding units, according to one or more embodiments.

An entropy decoder 1215 parses encoded image data to be decoded and information about encoding required for decoding from a bitstream 1205. The encoded image data is a quantized transformation coefficient from which residue data is reconstructed by a dequantizer 1220 and an inverse transformer 1225.

An intra predictor 1240 performs intra prediction on coding units in an intra mode according to each prediction unit. An inter predictor 1235 performs inter prediction on coding units in an inter mode from among the current image for each prediction unit by using a reference image obtained from a reconstructed picture buffer 1230.

Prediction data and residue data regarding coding units of each mode, which passed through the intra predictor 1240 and the inter predictor 1235, are summed, and thus data in a space domain regarding coding units of the current image 405 may be reconstructed, and the reconstructed data in the space domain may be output as a reconstructed image 1260 through a de-blocker 1245 and an SAO performer 1250. Reconstructed images stored in the reconstructed picture buffer 1230 may be output as reference images.

In order to decode the image data in the image data decoder 930 of the video decoding apparatus 900, operations after the entropy decoder 1215 of the video decoder 1200 according to an embodiment may be performed.

In order for the video decoder 1200 to be applied in the video decoding apparatus 900 according to an embodiment, all elements of the video decoder 1200, i.e., the entropy decoder 1215, the dequantizer 1220, the inverse transformer 1225, the inter predictor 1235, the de-blocker 1245, and the SAO performer 1250 may perform operations based on coding units having a tree structure for each LCU.

In particular, the intra predictor 1240 and the inter predictor 1235 may determine a partition and a prediction mode for each of the coding units having a tree structure, and the inverse transformer 1225 may determine whether to split a transform unit having a quad tree structure for each of the coding units.

The encoding operation of FIG. 10 and the encoding operation of FIG. 11 describe video stream encoding and decoding operations in a single layer, respectively. Thus, if the disparity vector determiner 12 of FIG. 1A encodes video streams of two or more layers, the video encoder 1100 may be provided for each layer. Similarly, if the candidate list determiner 26 of FIG. 1A decodes video streams of two or more layers, the video decoder 1200 may be provided for each layer.

Figure 13:
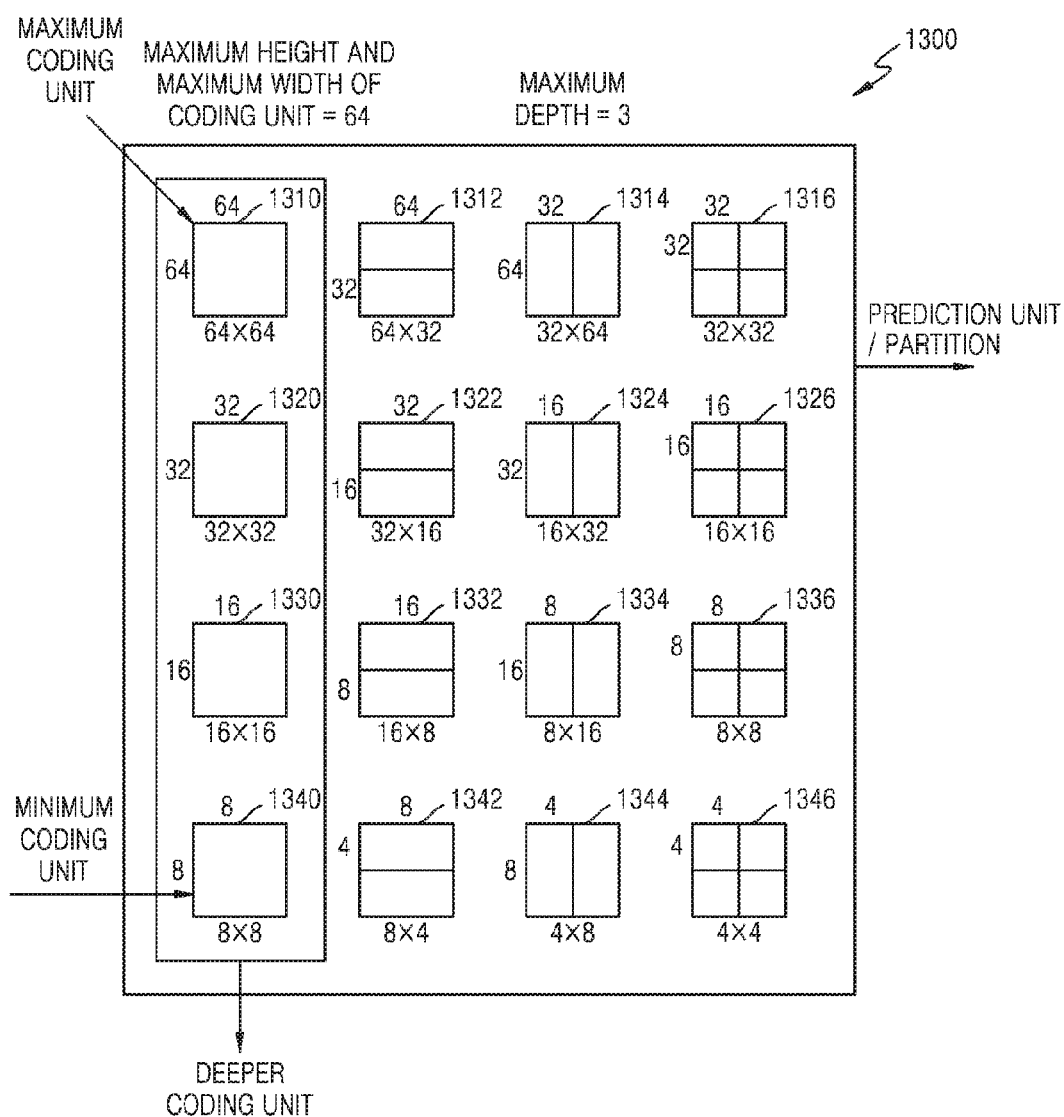
FIG. 13 is a diagram illustrating coding units and partitions according to an embodiment.

FIG. 13 is a diagram illustrating deeper coding units according to depths, and partitions, according to one or more embodiments.

The video encoding apparatus 800 and the video decoding apparatus 900 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 1300 of coding units, according to one or more embodiments, the maximum height and the maximum width of the coding units are each 64, and the maximum depth is 3. In this case, the maximum depth refers to a total number of times the coding unit is split from the LCU to the SCU. Since a depth deepens along a vertical axis of the hierarchical structure 1300, a height and a width of the deeper coding unit are each split. Also, a prediction unit and partitions, which are bases for prediction encoding of each deeper coding unit, are shown along a horizontal axis of the hierarchical structure 1300.

In other words, a coding unit 1310 is a LCU in the hierarchical structure 1300, wherein a depth is 0 and a size, i.e., a height by width, is 64×64. The depth deepens along the vertical axis, and a coding unit 1320 having a size of 32×32 and a depth of 1, a coding unit 1330 having a size of 16×16 and a depth of 2, and a coding unit 1340 having a size of 8×8 and a depth of 3. The coding unit 1340 having a size of 8×8 and a depth of 3 is an SCU.

The prediction unit and the partitions of a coding unit are arranged along the horizontal axis according to each depth. In other words, if the coding unit 1310 having a size of 64×64 and a depth of 0 is a prediction unit, the prediction unit may be split into partitions include in the coding unit 1310, i.e. a partition 1310 having a size of 64×64, partitions 1312 having the size of 64×32, partitions 1314 having the size of 32×64, or partitions 1316 having the size of 32×32.

Similarly, a prediction unit of the coding unit 1320 having the size of 32×32 and the depth of 1 may be split into partitions included in the coding unit 1320, i.e. a partition 1320 having a size of 32×32, partitions 1322 having a size of 32×16, partitions 1324 having a size of 16×32, and partitions 1326 having a size of 16×16.

Similarly, a prediction unit of the coding unit 1330 having the size of 16×16 and the depth of 2 may be split into partitions included in the coding unit 1330, i.e. a partition having a size of 16×16 included in the coding unit 1330, partitions 1332 having a size of 16×8, partitions 1334 having a size of 8×16, and partitions 1336 having a size of 8×8.

Similarly, a prediction unit of the coding unit 1340 having the size of 8×8 and the depth of 3 may be split into partitions included in the coding unit 1340, i.e. a partition having a size of 8×8 included in the coding unit 1340, partitions 1342 having a size of 8×4, partitions 1344 having a size of 4×8, and partitions 1346 having a size of 4×4.

In order to determine a final depth of the coding units constituting the LCU 1310, the coding unit determiner 820 of the video encoding apparatus 800 performs encoding for coding units corresponding to each depth included in the LCU 1310.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 1300. Alternatively, the minimum encoding error may be searched for by comparing the least encoding errors according to depths, by performing encoding for each depth as the depth deepens along the vertical axis of the hierarchical structure 1300. A depth and a partition having the minimum encoding error in the coding unit 1310 may be selected as the final depth and a partition mode of the coding unit 1310.

Figure 14:
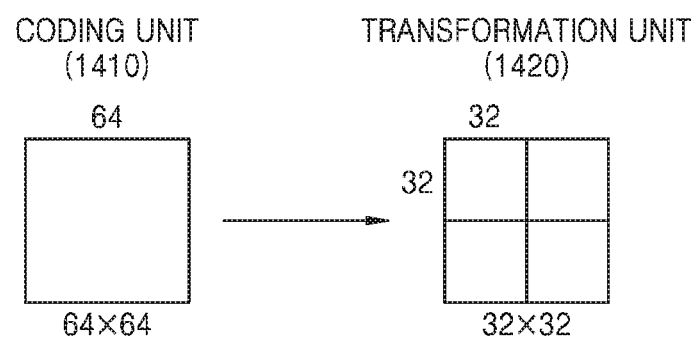
FIG. 14 is a diagram for describing a relationship between a coding unit and transform units, according to an embodiment.

FIG. 14 is a diagram for describing a relationship between a coding unit 1410 and transform units 1420, according to one or more embodiments.

The video encoding apparatus 800 or the video decoding apparatus 900 encodes or decodes an image according to coding units having sizes smaller than or equal to a LCU for each LCU. Sizes of transform units for transformation during encoding may be selected based on data units that are not larger than a corresponding coding unit.

For example, in the video encoding apparatus 800 or the video decoding apparatus 900, if a size of the coding unit 1410 is 64×64, transformation may be performed by using the transform units 1420 having a size of 32×32.

Also, data of the coding unit 1410 having the size of 64×64 may be encoded by performing the transformation on each of the transform units having the size of 32×32, 16×16, 8×8, and 4×4, which are smaller than 64×64, and then a transform unit having the least coding error may be selected.

Figure 15:
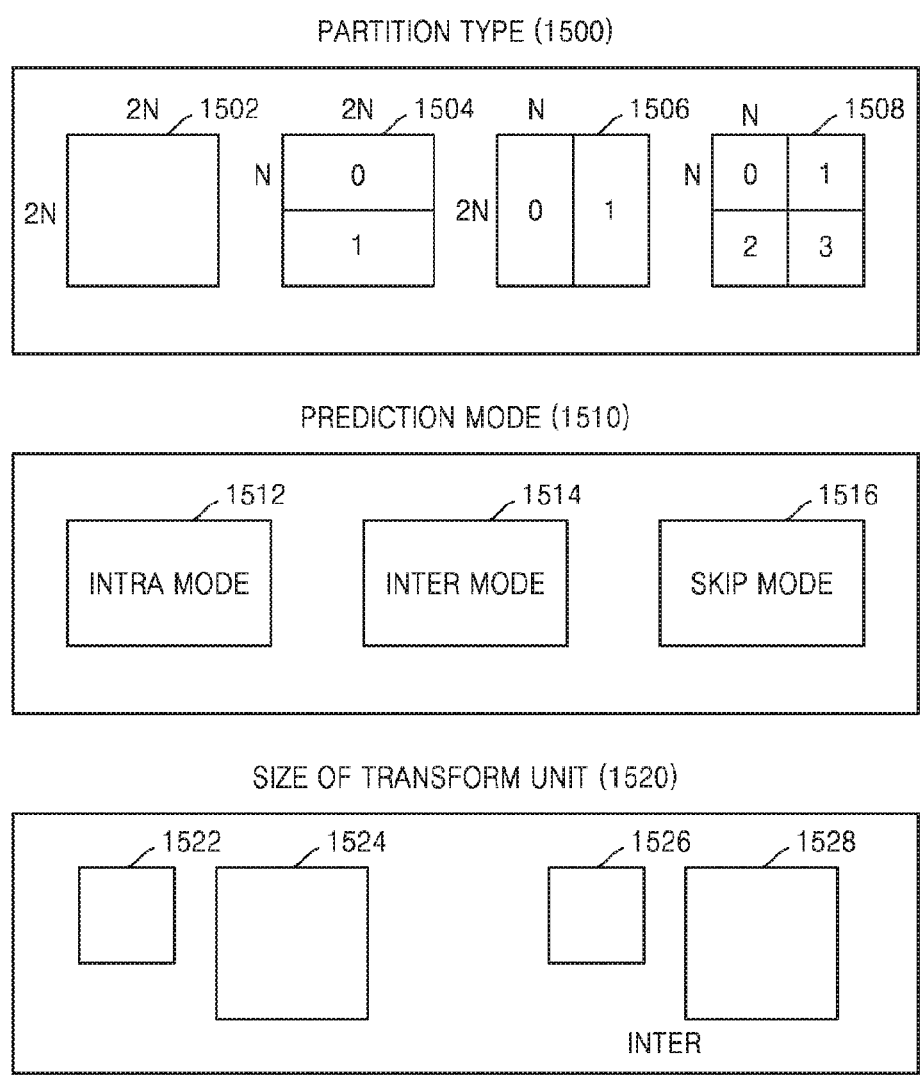
FIG. 15 is a diagram for describing encoding information of coding units, according to an embodiment.

FIG. 15 is a diagram for describing encoding information of coding units corresponding to a depth, according to one or more embodiments.

The outputter 830 of the video encoding apparatus 800 may encode and transmit information 1500 about a partition mode, information 1510 about a prediction mode, and information 1520 about a size of a transform unit for each coding unit corresponding to a final depth, as information about an encoding mode.

The information 1500 indicates information about a mode of a partition obtained by splitting a prediction unit of a current coding unit, wherein the partition is a data unit for prediction encoding the current coding unit. For example, a current coding unit CU_0 having a size of 2N×2N may be split into any one of a partition 1502 having a size of 2N×2N, a partition 1504 having a size of 2N×N, a partition 1506 having a size of N×2N, and a partition 1508 having a size of N×N. Here, the information 1500 about the partition mode is set to indicate one of the partition 1504 having a size of 2N×N, the partition 1506 having a size of N×2N, and the partition 1508 having a size of N×N.

The information 1510 indicates a prediction mode of each partition. For example, the information 1510 may indicate a mode of prediction encoding performed on a partition indicated by the information 1500, i.e., an intra mode 1512, an inter mode 1514, or a skip mode 1516.

The information 1520 indicates a transform unit to be based on when transformation is performed on a current coding unit. For example, the transform unit may be a first intra transform unit 1522, a second intra transform unit 1524, a first inter transform unit 1526, or a second inter transform unit 1528.

The image data and encoding information extractor 1620 of the video decoding apparatus 900 may extract and use the information 1500, 1510, and 1520 for decoding, according to each deeper coding unit.

Figure 16:
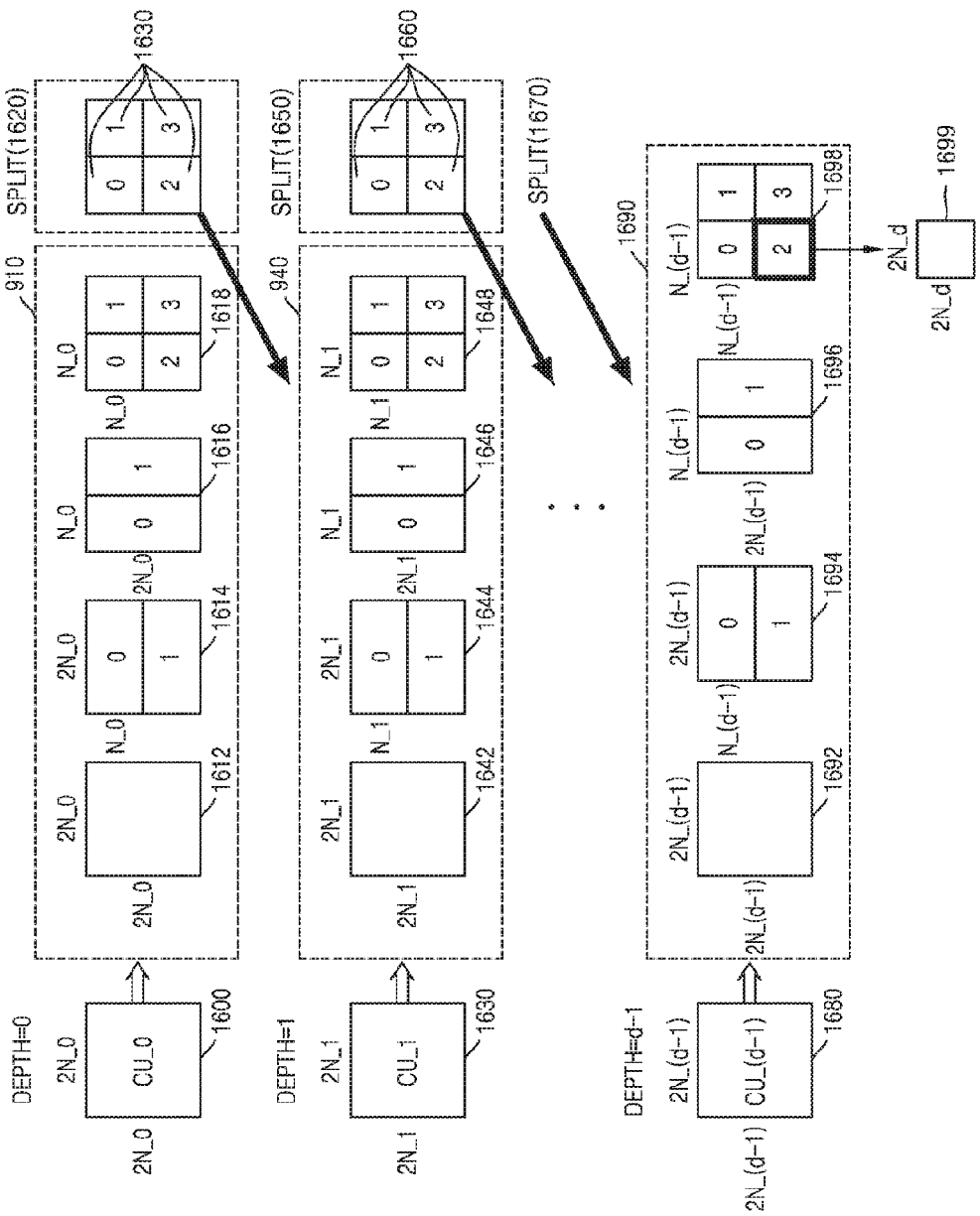
FIG. 16 is a diagram of coding units, according to an embodiment.

FIG. 16 is a diagram of deeper coding units according to depths, according to one or more embodiments.

Splitting information may be used to indicate a change of a depth. The spilt information indicates whether a coding unit of a current depth is split into coding units of a lower depth.

A prediction unit 1610 for prediction encoding a coding unit 1600 having a depth of 0 and a size of 2N_0×2N_0 may include partitions of a partition mode 1612 having a size of 2N_0×2N_0, a partition mode 1614 having a size of 2N_0×N_0, a partition mode 1616 having a size of N_0×2N_0, and a partition mode 1618 having a size of N_0×N_0. FIG. 16 only illustrates the partition modes 1612 through 1618 which are obtained by symmetrically splitting the prediction unit 1610, but a partition mode is not limited thereto, and the partitions of the prediction unit 1610 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition mode. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition modes 1612 through 1616, the prediction unit 1610 may not be split into a lower depth.

If the encoding error is the smallest in the partition mode 1618, a depth is changed from 0 to 1 to split the partition mode 1618 in operation 1620, and encoding is repeatedly performed on coding units 1630 having a depth of 2 and a size of N_0×N_0 to search for a minimum encoding error.

A prediction unit 1640 for prediction encoding the coding unit 1630 having a depth of 1 and a size of 2N_1×2N_1 (=N_0×N_0) may include partitions of a partition mode 1642 having a size of 2N_1×2N_1, a partition mode 1644 having a size of 2N_1×N_1, a partition mode 1646 having a size of N_1×2N_1, and a partition mode 1648 having a size of N_1×N_1.

If an encoding error is the smallest in the partition mode 1648, a depth is changed from 1 to 2 to split the partition mode 1648 in operation 1650, and encoding is repeatedly performed on coding units 1660, which have a depth of 2 and a size of N_2×N_2 to search for a minimum encoding error.

When a maximum depth is d, split operation according to each depth may be performed up to when a depth becomes d−1, and splitting information may be encoded as up to when a depth is one of 0 to d−2. In other words, when encoding is performed up to when the depth is d−1 after a coding unit corresponding to a depth of d−2 is split in operation 1670, a prediction unit 1690 for prediction encoding a coding unit 1680 having a depth of d−1 and a size of 2N_(d−1)×2N_(d−1) may include partitions of a partition mode 1692 having a size of 2N_(d−1)×2N_(d−1), a partition mode 1694 having a size of 2N_(d−1)×N_(d−1), a partition mode 1696 having a size of N_(d−1)×2N_(d−1), and a partition mode 1698 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes 1692 through 1698 to search for a partition mode having a minimum encoding error.

Even when the partition mode 1698 has the minimum encoding error, since a maximum depth is d, a coding unit CU_(d−1) having a depth of d−1 is no longer split to a lower depth, and a depth for the coding units constituting a current LCU 1600 is determined to be d−1 and a partition mode of the current LCU 1600 may be determined to be N_(d−1)×N_(d−1). Also, since the maximum depth is d and an SCU 1680 having a lowermost depth of d−1 is no longer split to a lower depth, splitting information for the SCU 1680 is not set.

A data unit 1699 may be a 'minimum unit' for the current LCU. A minimum unit according to one or more embodiments may be a square data unit obtained by splitting an SCU 1680 by 4. By performing the encoding repeatedly, the video encoding apparatus 800 may select a depth having the least encoding error by comparing encoding errors according to depths of the coding unit 1600 to determine a depth, and set a corresponding partition mode and a prediction mode as an encoding mode of the depth.

As such, the minimum encoding errors according to depths are compared in all of the depths of 1 through d, and a depth having the least encoding error may be determined as a depth. The depth, the partition mode of the prediction unit, and the prediction mode may be encoded and transmitted as information about an encoding mode. Also, since a coding unit is split from a depth of 0 to a depth, only splitting information of the depth is set to 0, and splitting information of depths excluding the depth is set to 1.

The image data and encoding information extractor 920 of the video decoding apparatus 900 may extract and use the information about the depth and the prediction unit of the coding unit 1600 to decode the partition 1612. The video decoding apparatus 900 may determine a depth, in which splitting information is 0, as a depth by using splitting information according to depths, and use information about an encoding mode of the corresponding depth for decoding.

Figure 17:
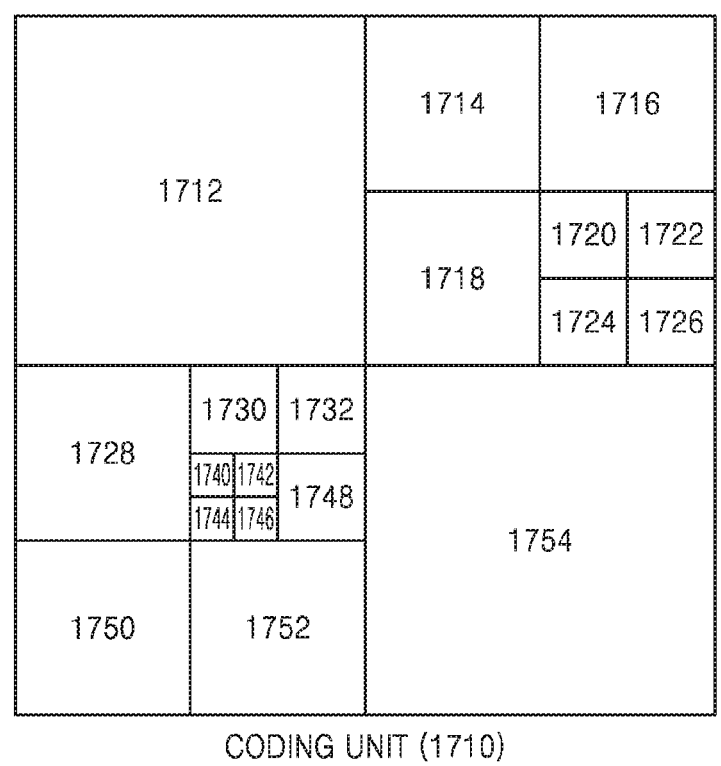
FIGS. 17 through 19 are diagrams for describing a relationship between coding units, prediction units, and transform units, according to an embodiment.
Figure 18:
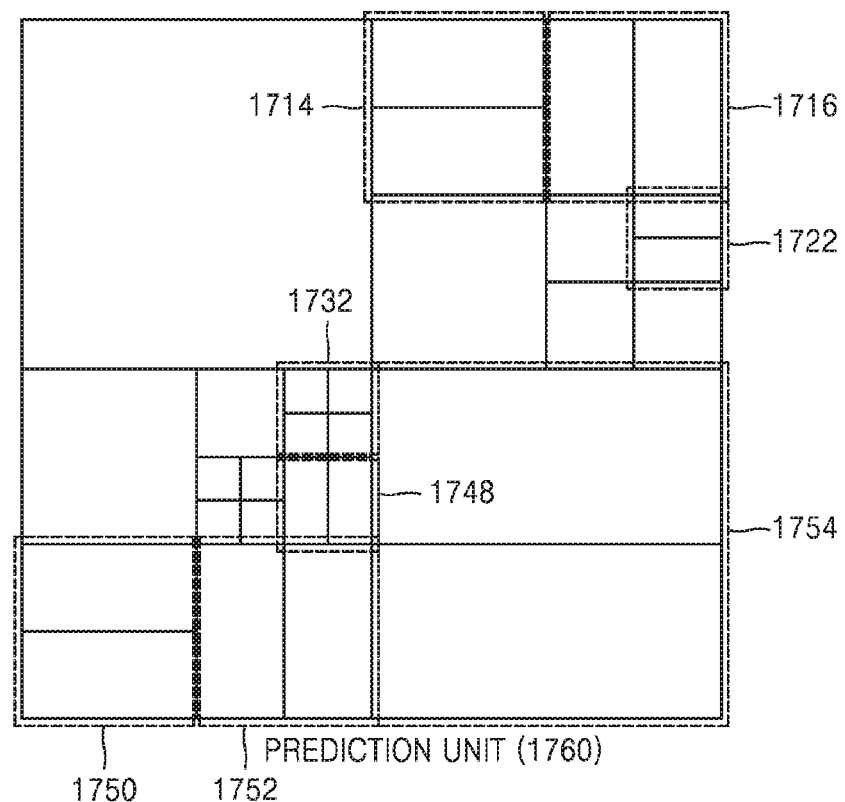
Figure 19:
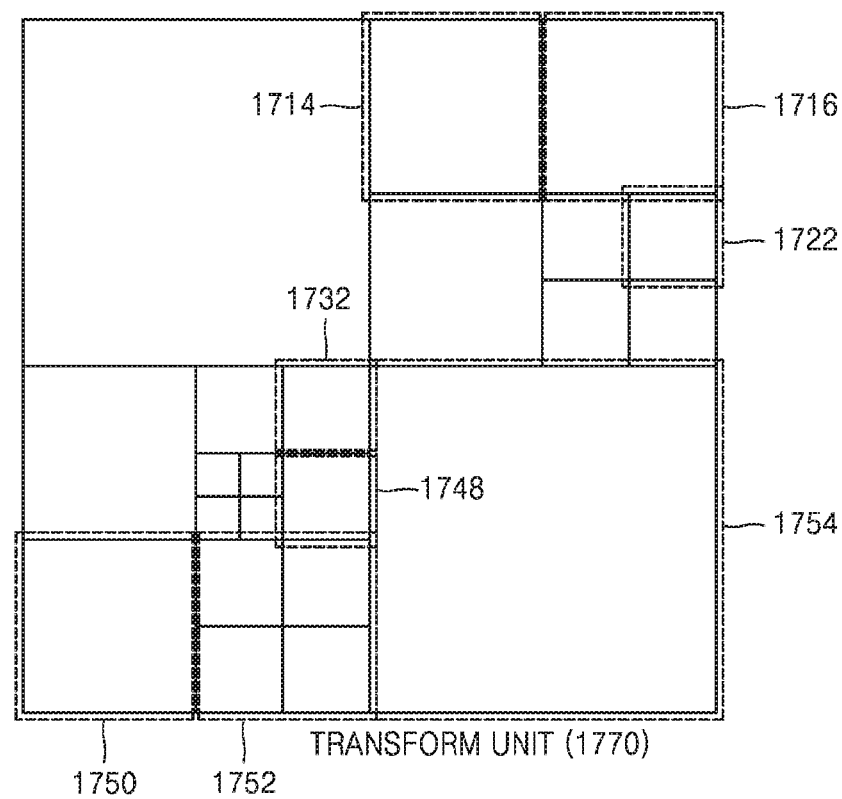

FIGS. 17 through 19 are diagrams for describing a relationship between coding units 1710, prediction units 1760, and transform units 1770, according to one or more embodiments.

The coding units 1710 are coding units having a tree structure, corresponding to depths determined by the video encoding apparatus 800, in a LCU. The prediction units 1760 are partitions of prediction units of each of the coding units 1710, and the transform units 1770 are transform units of each of the coding units 1710.

When a depth of a LCU is 0 in the coding units 1710, depths of coding units 1712 and 1754 are 1, depths of coding units 1714, 1716, 1718, 1728, 1750, and 1752 are 2, depths of coding units 1720, 1722, 1724, 1726, 1730, 1732, and 1748 are 3, and depths of coding units 1740, 1742, 1744, and 1746 are 4.

In the prediction units 1760, some coding units 1714, 1716, 1722, 1732, 1748, 1750, 1752, and 1754 are obtained by splitting the coding units in the coding units 1710. In other words, partition modes in the coding units 1714, 1722, 1750, and 1754 have a size of 2N×N, partition modes in the coding units 1716, 1748, and 1752 have a size of N×2N, and a partition mode of the coding unit 1732 has a size of N×N. Prediction units and partitions of the coding units 1710 are smaller than or equal to each coding unit.

Transformation or inverse transformation is performed on image data of the coding unit 1752 in the transform units 1770 in a data unit that is smaller than the coding unit 1752. Also, the coding units 1714, 1716, 1722, 1732, 1748, 1750, and 1752 in the transform units 1770 are different from those in the prediction units 1760 in terms of sizes and shapes. In other words, the video encoding and decoding apparatuses 800 and 900 may perform intra prediction, motion estimation, motion compensation, transformation, and inverse transformation individually on a data unit in the same coding unit.

Accordingly, encoding is recursively performed on each of coding units having a hierarchical structure in each region of a LCU to determine an optimum coding unit, and thus coding units having a recursive tree structure may be obtained. Encoding information may include splitting information about a coding unit, information about a partition mode, information about a prediction mode, and information about a size of a transform unit. Table 33 shows the encoding information that may be set by the video encoding and decoding apparatuses 800 and 900.

further split according to the splitting information, encoding is independently performed on four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The information about the partition mode may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1

The size of the transform unit may be set to be two types in the intra mode and two types in the inter mode. In other words, if splitting information of the transform unit is 0, the size of the transform unit may be 2N×2N, which is the size of the current coding unit. If splitting information of the transform unit is 1, the transform units may be obtained by splitting the current coding unit. Also, if a partition mode of the current coding unit having the size of 2N×2N is a symmetrical partition mode, a size of a transform unit may be N×N, and if the partition mode of the current coding unit is an asymmetrical partition mode, the size of the transform unit may be N/2×N/2.

The encoding information about coding units having a tree structure may include at least one of a coding unit corresponding to a depth, a prediction unit, and a minimum unit. The coding unit corresponding to the depth may

TABLE 33

Splitting information 0
(Encoding on Coding Unit having Size of 2N×2N and Current Depth of d)

| | Partition mode | | Size of Transform unit | | |
|---|---|---|---|---|---|
| Prediction Mode | Symmetrical Partition mode | Asymmetrical Partition mode | Splitting information 0 of Transform unit | Splitting information 1 of Transform unit | Splitting information 1 |
| Intra Inter Skip (Only 2N×2N) | 2N×2N 2N×N N×2N N×N | 2N×nU 2N×nD nL×2N nR×2N | 2N×2N | N×N (Symmetrical Type) N/2×N/2 (Asymmetrical Type) | Repeatedly Encode Coding Units having Lower Depth of d+1 |

The outputter 830 of the video encoding apparatus 800 may output the encoding information about the coding units having a tree structure, and the image data and encoding information extractor 920 of the video decoding apparatus 900 may extract the encoding information about the coding units having a tree structure from a received bitstream.

Splitting information indicates whether a current coding unit is split into coding units of a lower depth. If splitting information of a current depth d is 0, a depth, in which a current coding unit is no longer split into a lower depth, is a final depth, and thus information about a partition mode, prediction mode, and a size of a transform unit may be defined for the final depth. If the current coding unit is include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a LCU may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 20:
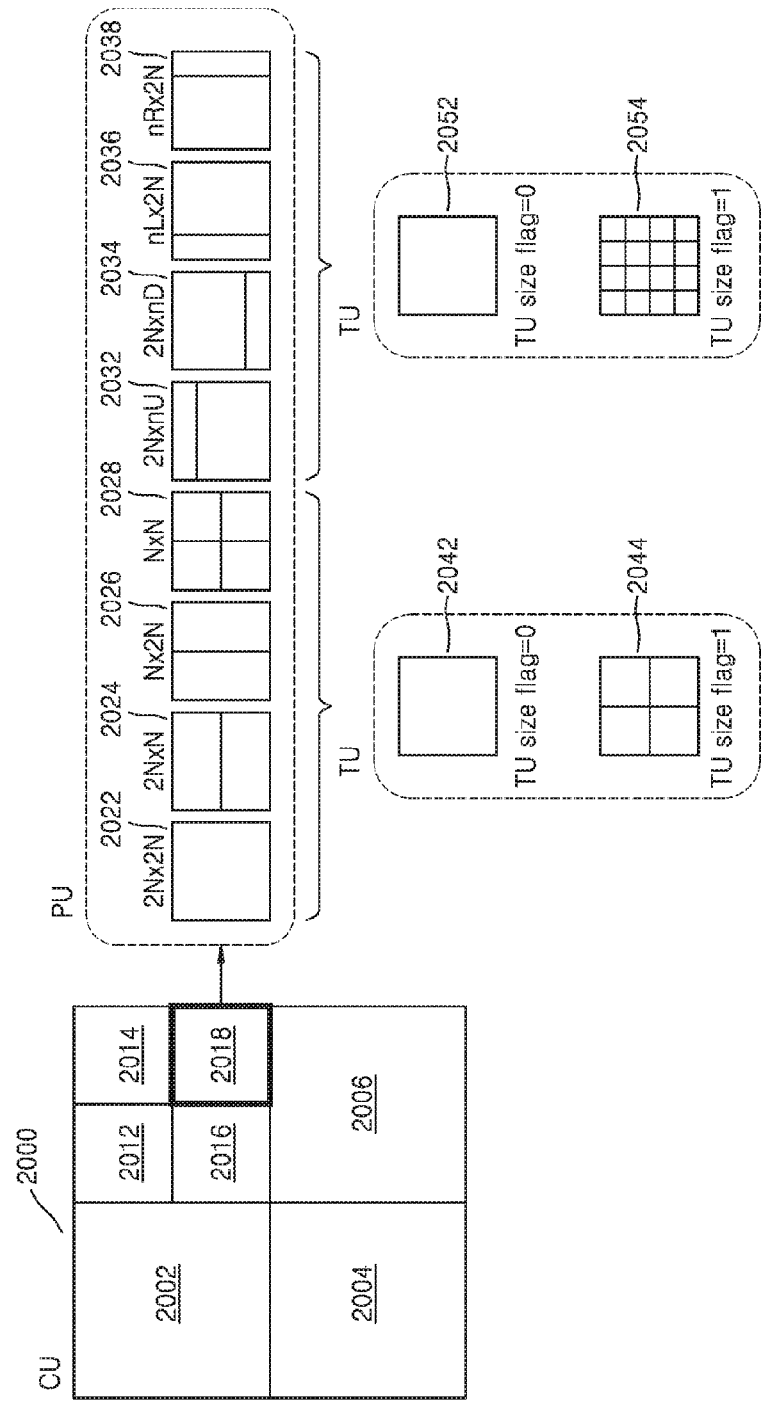
FIG. 20 is a diagram for describing a relationship between a coding unit, a prediction unit, and a transform unit, according to encoding mode information of Table 33.

FIG. 20 is a diagram for describing a relationship between a coding unit, a prediction unit, and a transform unit, according to encoding mode information of Table 33.

A LCU 2000 includes coding units 2002, 2004, 2006, 2012, 2014, 2016, and 2018 of depths. Here, since the coding unit 2018 is a coding unit of a depth, splitting information may be set to 0. Information about a partition mode of the coding unit 2018 having a size of 2N×2N may be set to be one of a partition mode 2022 having a size of 2N×2N, a partition mode 2024 having a size of 2N×N, a partition mode 2026 having a size of N×2N, a partition mode 2028 having a size of N×N, a partition mode 2032 having a size of 2N×nU, a partition mode 2034 having a size of 2N×nD, a partition mode 2036 having a size of nL×2N, and a partition mode 2038 having a size of nR×2N.

Splitting information (TU size flag) of a transform unit is a type of a transformation index. The size of the transform unit corresponding to the transformation index may be changed according to a prediction unit type or partition mode of the coding unit.

For example, when the partition mode is set to be symmetrical, i.e. the partition mode 2022, 2024, 2026, or 2028, a transform unit 2042 having a size of 2N×2N is set if a TU size flag of a transform unit is 0, and a transform unit 1344 having a size of N×N is set if a TU size flag is 1.

When the partition mode is set to be asymmetrical, i.e., the partition mode 2032, 2034, 2036, or 2038, a transform unit 2052 having a size of 2N×2N is set if a TU size flag is 0, and a transform unit 2054 having a size of N/2×N/2 is set if a TU size flag is 1.

Referring to FIG. 19, the TU size flag is a flag having a value or 0 or 1, but the TU size flag is not limited to 1 bit, and a transform unit may be hierarchically split having a tree structure while the TU size flag increases from 0. Splitting information (TU size flag) of a transform unit may be an example of a transformation index.

In this case, the size of a transform unit that has been actually used may be expressed by using a TU size flag of a transform unit, according to one or more embodiments, together with a maximum size and minimum size of the transform unit. The video encoding apparatus 800 is capable of encoding maximum transform unit size information, minimum transform unit size information, and a maximum TU size flag. The result of encoding the maximum transform unit size information, the minimum transform unit size information, and the maximum TU size flag may be inserted into an SPS. The video decoding apparatus 900 may decode video by using the maximum transform unit size information, the minimum transform unit size information, and the maximum TU size flag.

For example, (a) if the size of a current coding unit is 64×64 and a maximum transform unit size is 32×32, (a-1) then the size of a transform unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transform unit size is 32×32, (b-1) then the size of the transform unit may be 32×32 when the TU size flag is 0. Here, the TU size flag cannot be set to a value other than 0, since the size of the transform unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transform unit size is 'MinTransformSize', and a transform unit size is 'RootTuSize' when the TU size flag is 0, then a current minimum transform unit size 'CurrMinTuSize' that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transform unit size 'CurrMinTuSize' that can be determined in the current coding unit, a transform unit size 'RootTuSize' when the TU size flag is 0 may denote a maximum transform unit size that can be selected in the system. In Equation (1), 'RootTuSize/(2^MaxTransformSizeIndex)' denotes a transform unit size when the transform unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transform unit size 'CurrMinTuSize' that can be determined in the current coding unit.

According to one or more embodiments, the maximum transform unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transform unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transform unit size 'RootTuSize', when the TU size flag is 0, may be a smaller value from among the maximum transform unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the transform unit size 'RootTuSize' when the TU size flag is 0 may be a smaller value from among the maximum transform unit size and the size of the current partition unit.

However, the current maximum transform unit size 'RootTuSize' that varies according to the type of a prediction mode in a partition unit is just an example and the embodiments are not limited thereto.

According to the video encoding method based on coding units having a tree structure as described with reference to FIGS. 8 through 20, image data of the space domain is encoded for each coding unit of a tree structure. According to the video decoding method based on coding units having a tree structure, decoding is performed for each LCU to reconstruct image data of the space domain. Thus, a picture and a video that is a picture sequence may be reconstructed. The reconstructed video may be reproduced by a reproducing apparatus, stored in a storage medium, or transmitted through a network.

The embodiments may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs).

For convenience of description, the video encoding method and/or the video encoding method described above with reference to FIGS. 1A through 20, will be referred to as a 'video encoding method according to the various embodiments'. In addition, the video decoding method and/or the video decoding method described above with reference to FIGS. 1A through 20, will be referred to as a 'video decoding method according to the various embodiments'.

A video encoding apparatus including the video encoding apparatus, the video encoding apparatus 800, or the video encoder 1100, which is described above with reference to FIGS. 1A through 20, will be referred to as a 'video encoding apparatus according to the various embodiments'. In addition, a video decoding apparatus including the inter layer video decoding apparatus, the video decoding apparatus 900, or the video decoder 1200, which is described above with reference to FIGS. 1A through 20, will be referred to as a 'video decoding apparatus according to the various embodiments'.

A computer-readable recording medium storing a program, e.g., a disc 26000, according to various embodiments will now be described in detail.

Figure 21:
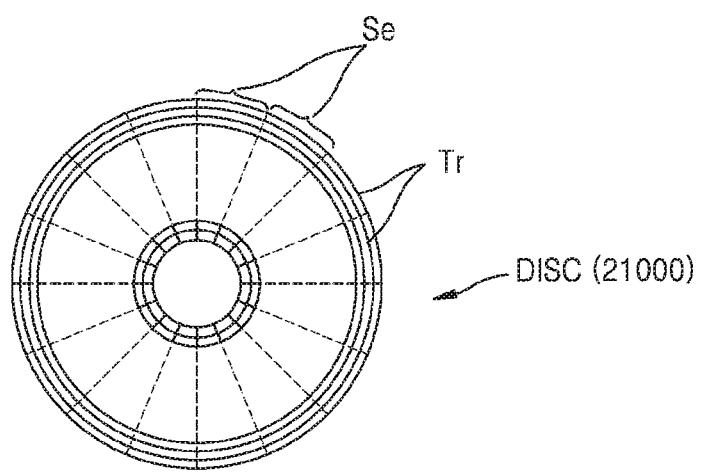
FIG. 21 is a diagram of a physical structure of a disc in which a program is stored, according to an embodiment.

FIG. 21 is a diagram of a physical structure of the disc 26000 in which a program is stored, according to one or more embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantization parameter determination method, the video encoding method, and the video decoding method described above may be assigned and stored.

A computer system embodied using a storage medium that stores a program for executing the video encoding method and the video decoding method as described above will now be described with reference to FIG. 29.

Figure 22:
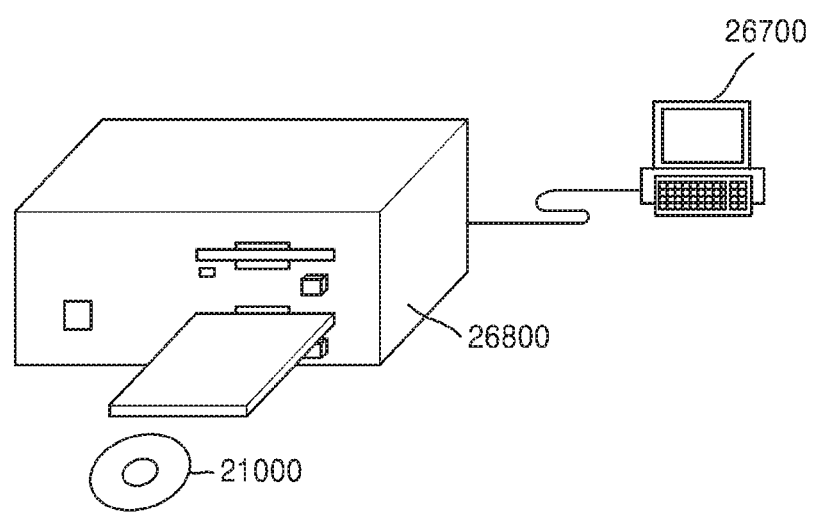
FIG. 22 is a diagram of a disc drive for recording and reading a program by using a disc.

FIG. 22 is a diagram of a disc drive 26800 for recording and reading a program by using the disc 26000. A computer system 26700 may store a program that executes at least one of a video encoding method and a video decoding method according to one or more embodiments, in the disc 26000 via the disc drive 26800. To run the program stored in the disc 26000 in the computer system 26700, the program may be read from the disc 26000 and be transmitted to the computer system 26700 by using the disc drive 26700.

The program that executes at least one of a video encoding method and a video decoding method according to one or more embodiments may be stored not only in the disc 26000 illustrated in FIG. 21 or 22 but also in a memory card, a ROM cassette, or a solid state drive (SSD).

A system to which the video encoding method and a video decoding method described above are applied will be described below.

Figure 23:
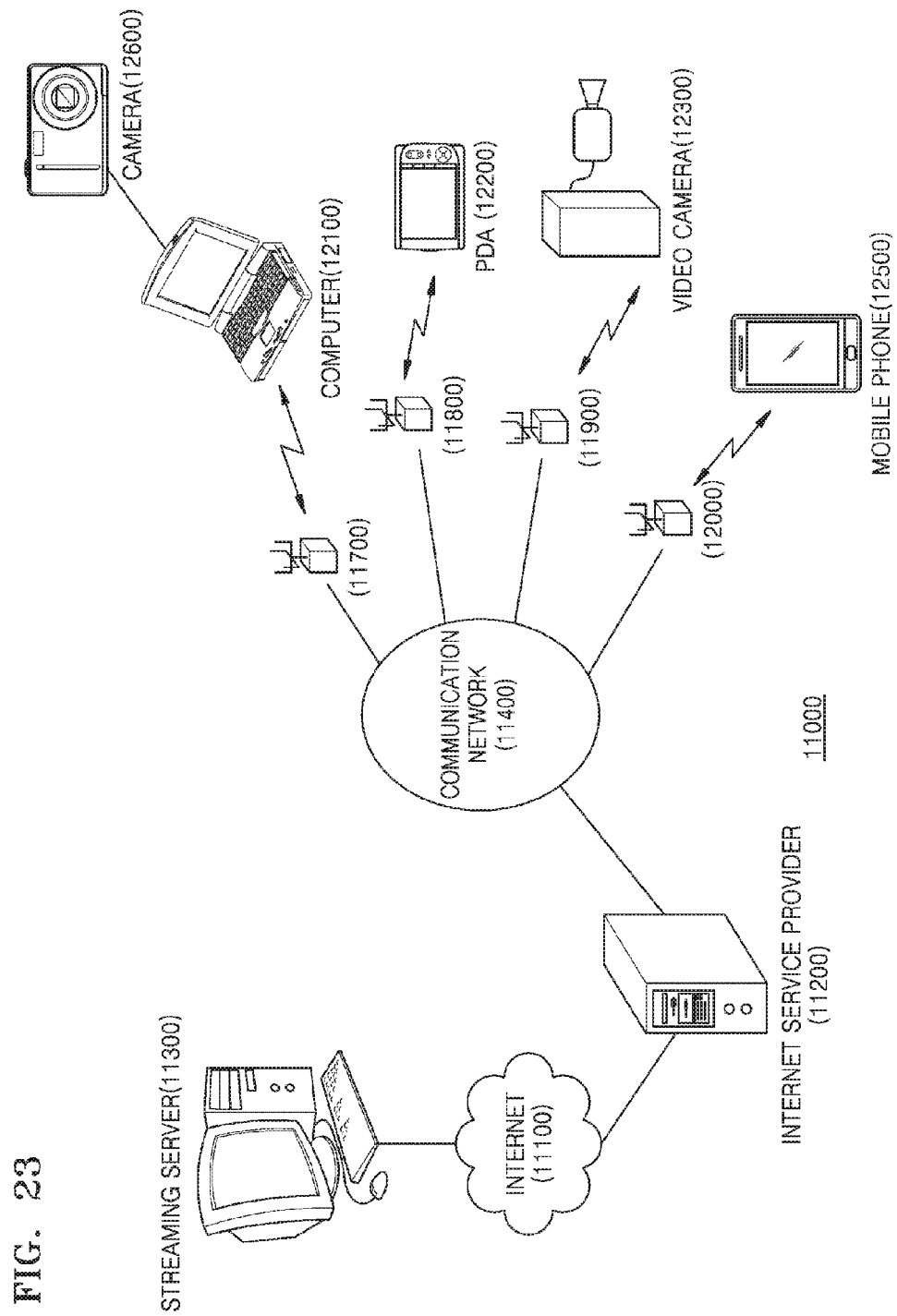
FIG. 23 is a diagram of an overall structure of a content supply system for providing a content distribution service.

FIG. 23 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 23, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to one or more embodiments.

The mobile phone 12500 included in the content supply system 11000 according to one or more embodiments will now be described in greater detail with referring to FIGS. 24 and 25.

Figure 24:
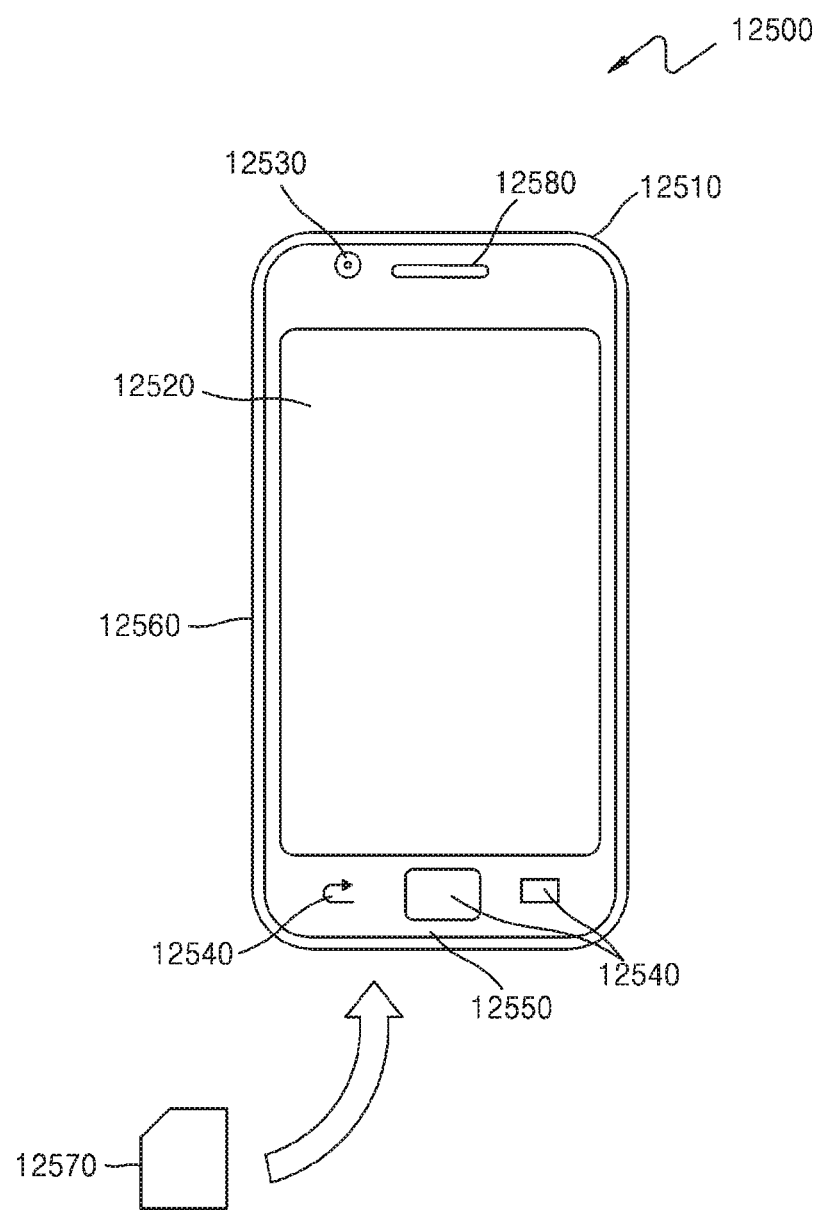
FIGS. 24 and 25 are diagrams respectively of an external structure and an internal structure of a mobile phone to which a video encoding method and a video decoding method are applied, according to an embodiment.

FIG. 24 illustrates an external structure of the mobile phone 12500 to which a video encoding method and a video decoding method are applied, according to one or more embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 21, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound outputter, and a microphone 12550 for inputting voice and sound or another type sound inputter. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 25:
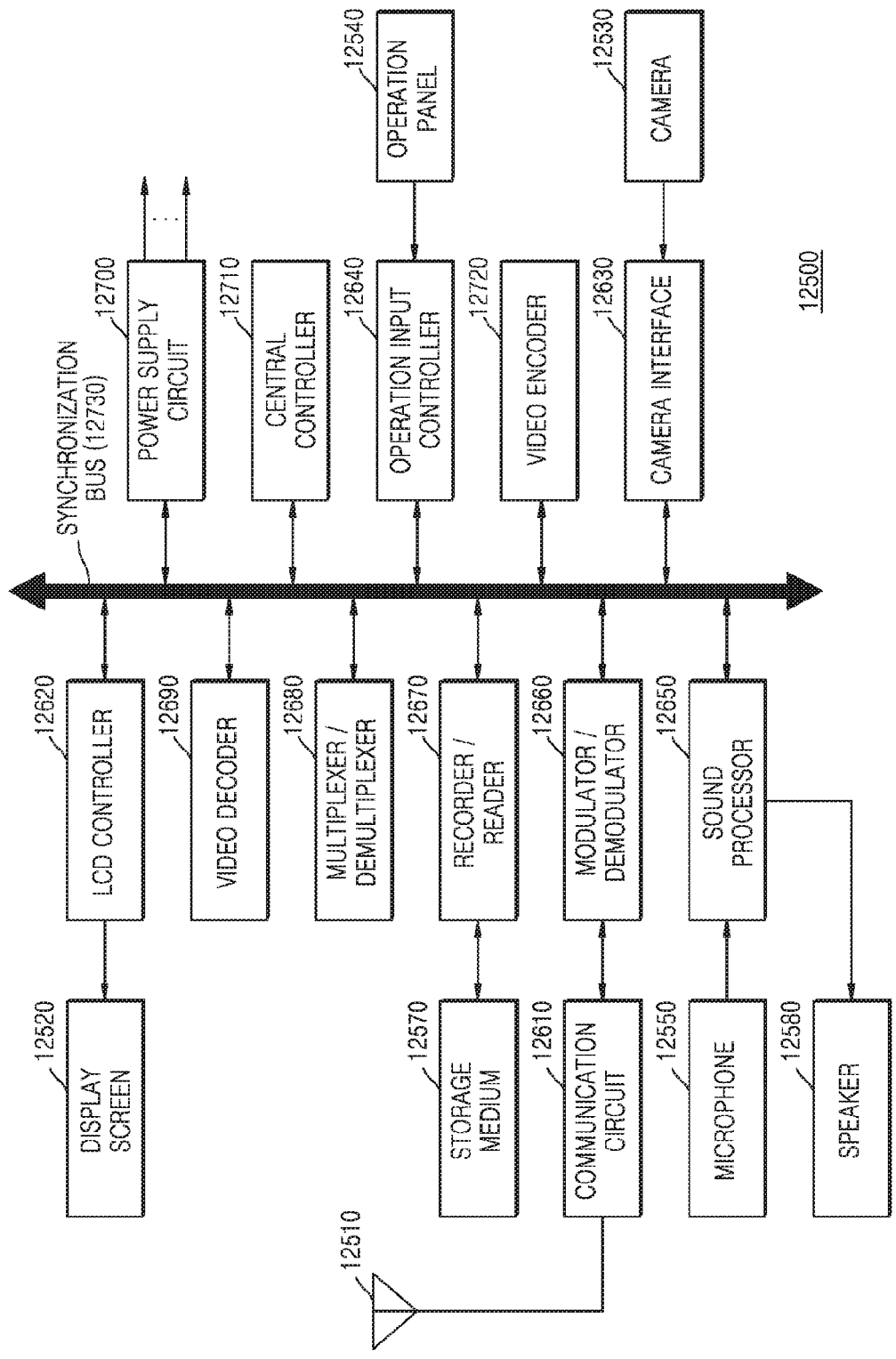

FIG. 25 illustrates an internal structure of the mobile phone 12500, according to one or more embodiments. To systemically control parts of the mobile phone 12500 including the display screen 12520 and the operation panel 12540, a power supply circuit 12700, an operation input controller 12640, a video encoder 12720, a camera interface 12630, an LCD controller 12620, a video decoder 12690, a multiplexer/demultiplexer 12680, a recorder/reader 12670, a modulator/demodulator 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the video encoder 12720 may generate a digital image signal, and text data of a message may be generated via the operation panel 12540 and the operation input controller 12640. When a digital signal is transmitted to the modulator/demodulator 12660 under control of the central controller 12710, the modulator/demodulator 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulator/demodulator 12660 and the communication circuit 12610, and may be transmitted via the antenna 12510.

When a text message, e.g., email, is transmitted in a data communication mode, text data of the text message is input via the operation panel 12540 and is transmitted to the central controller 12710 via the operation input controller 12640. Under control of the central controller 12710, the text data is transformed into a transmission signal via the modulator/demodulator 12660 and the communication circuit 12610 and is transmitted to the wireless base station 12000 via the antenna 12510.

To transmit image data in the data communication mode, image data captured by the camera 12530 is provided to the video encoder 12720 via the camera interface 12630. The captured image data may be directly displayed on the display screen 12520 via the camera interface 12630 and the LCD controller 12620.

A structure of the video encoder 12720 may correspond to that of the above-described video encoding method according to the one or more embodiments. The video encoder 12720 may transform the image data received from the camera 12530 into compressed and encoded image data based on the above-described video encoding method according to the one or more embodiments, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the video encoder 12720, together with the sound data received from the sound processor 12650. A result of multiplexing the data may be transformed into a transmission signal via the modulator/demodulator 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulator/demodulator 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulator/demodulator 12660 and the sound processor 12650, and the analog sound signal is output via the speaker 12580, under control of the central controller 12710.

When in the data communication mode, data of a video file accessed at an Internet website is received, a signal received from the wireless base station 12000 via the antenna 12510 is output as multiplexed data via the modulator/demodulator 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the video decoder 12690 may correspond to that of the above-described video decoding method according to the one or more embodiments. The video decoder 12690 may decode the encoded video data to obtain reconstructed video data and provide the reconstructed video data to the display screen 12520 via the LCD controller 12620, by using the above-described video decoding method according to the one or more embodiments.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to one or more embodiments, may be a transceiving terminal including only the video encoding apparatus, or may be a transceiving terminal including only the video decoding apparatus.

Figure 26:
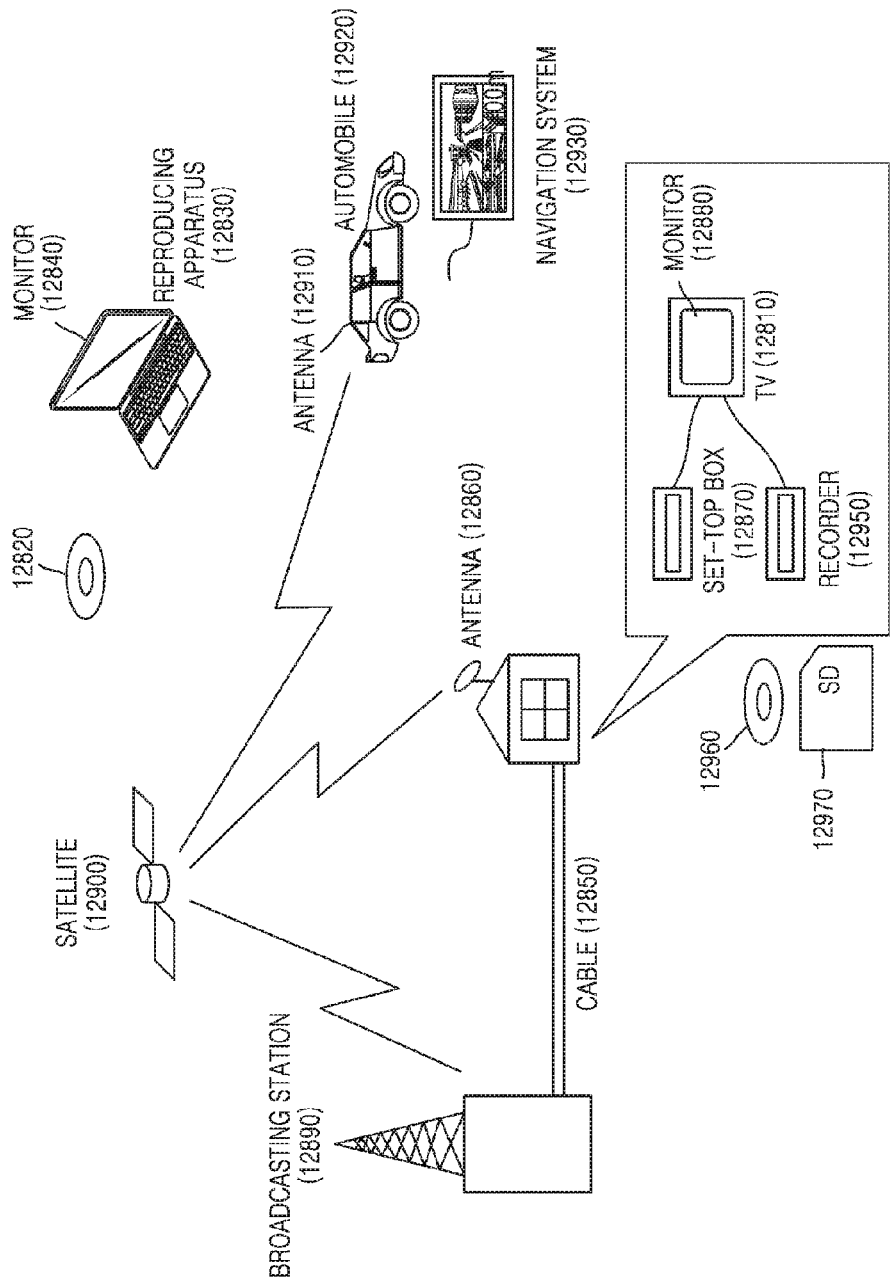
FIG. 26 is a diagram of a digital broadcast system to which a communication system is applied, according to an embodiment.

A communication system according to the one or more embodiments is not limited to the communication system described above with reference to FIG. 24. For example, FIG. 26 illustrates a digital broadcasting system employing a communication system, according to one or more embodiments. The digital broadcasting system of FIG. 26 may receive a digital broadcast transmitted via a satellite or a terrestrial network by using a video encoding apparatus and a video decoding apparatus according to one or more embodiments.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus according to one or more embodiments is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus according to one or more embodiments may be installed. Data output from the set-top box 12870 may also be reproduced on a TV monitor 12880.

As another example, a video decoding apparatus according to one or more embodiments may be installed in the TV receiver 12810 instead of the set-top box 12870.

An automobile 12920 that has an appropriate antenna 12910 may receive a signal transmitted from the satellite 12900 or the wireless base station 11700 of FIG. 21. A decoded video may be reproduced on a display screen of an automobile navigation system 12930 installed in the automobile 12920.

A video signal may be encoded by a video encoding apparatus according to one or more embodiments and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to one or more embodiments, a video signal recorded on the DVD disc 12960, the SD card 12970, or another storage medium may be reproduced on the TV monitor 12880.

The automobile navigation system 12930 may not include the camera 12530 of FIG. 26, and the camera interface 12630 and the video encoder 12720 of FIG. 26. For example, the computer 12100 and the TV receiver 12810 may not include the camera 12530, the camera interface 12630, and the video encoder 12720.

Figure 27:
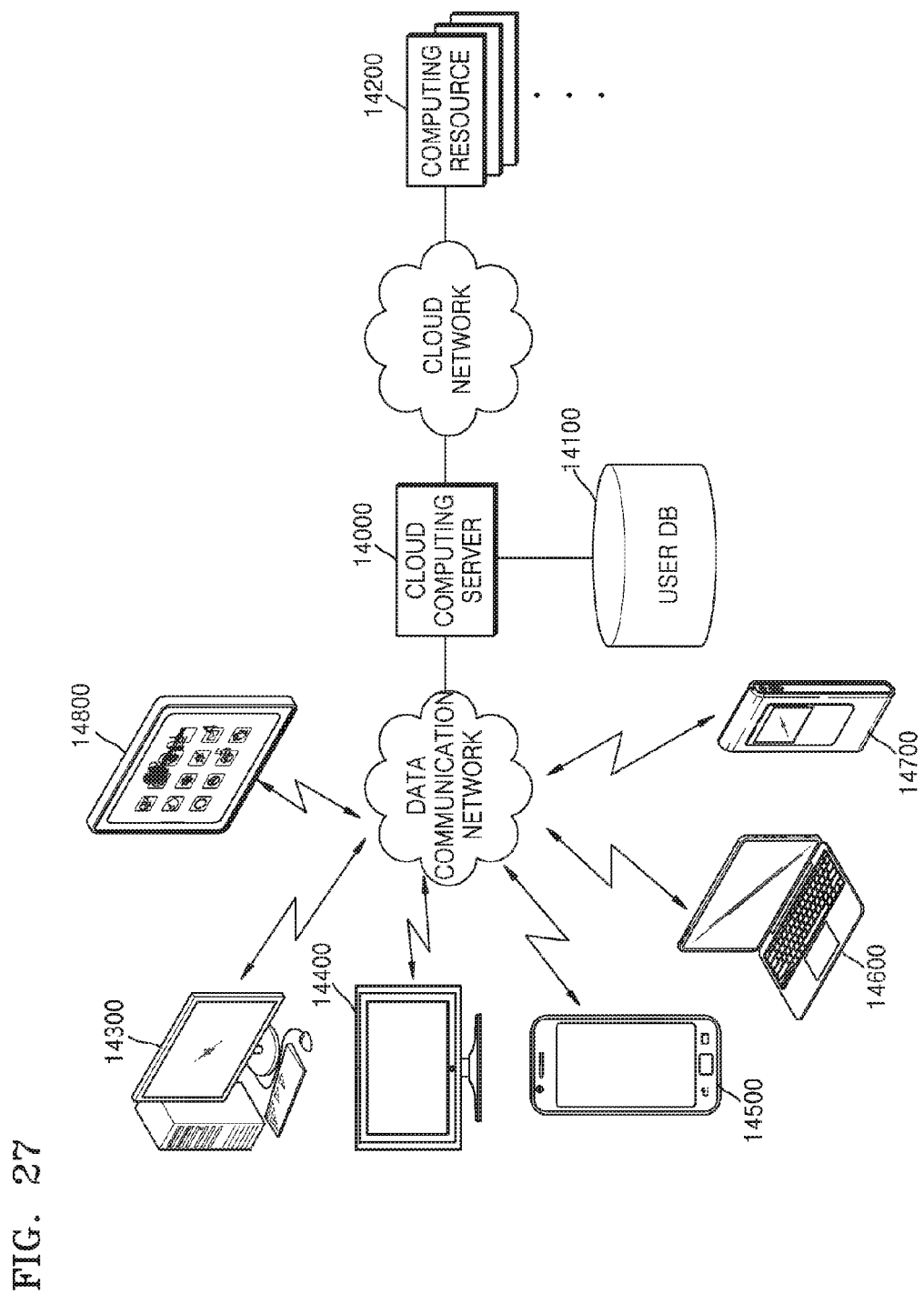
FIG. 27 is a diagram illustrating a network structure of a cloud computing system using a video encoding apparatus and a video decoding apparatus, according to an embodiment.

FIG. 27 is a diagram illustrating a network structure of a cloud computing system using a video encoding apparatus and a video decoding apparatus, according to one or more embodiments.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include a video decoding apparatus as described above with reference to FIGS. 1A through 20. As another example, the user terminal may include a video encoding apparatus as described above with reference to FIGS. 1A through 20. Alternatively, the user terminal may include both the video decoding apparatus and the video encoding apparatus as described above with reference to FIGS. 1A through 20.

Various applications of a video encoding method, a video decoding method, a video encoding apparatus, and a video decoding apparatus according to the one or more embodiments described above with reference to FIGS. 1A through 20 have been described above with reference to FIGS. 21 to 27. However, methods of storing the video encoding method and the video decoding method in a storage medium or methods of implementing the video encoding apparatus and the video decoding apparatus in a device, according to various embodiments, described above with reference to FIGS. 1A through 20 are not limited to the embodiments described above with reference to FIGS. 21 to 27.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

The invention claimed is:

1. A video decoding method, which is performed by a video decoding apparatus, the video decoding method comprising:
   obtaining a bitstream of an encoded image;
   determining a prediction mode of a current block by using prediction mode information of the current block that is included in the bitstream;
   determining a type of a reference vector, which indicates a reference block used for decoding the current block according to the prediction mode of the current block, as one of a motion vector type and a disparity vector type;
   when a neighboring block adjacent to the current block does not have the determined type of the reference vector, generating a reference vector of the neighboring block having the determined type;
   determining the reference vector of the current block indicating the reference block by using the generated reference vector of the neighboring block;
   obtaining information of the reference block by using the reference vector of the current block; and
   decoding the current block by using the information of the reference block.

2. The video decoding method of claim 1, wherein the determining of the type of the reference vector, which indicates the reference block used for decoding the current block according to the prediction mode of the current block, as one of the motion vector type and the disparity vector type comprises, when the prediction mode of the current block is an inter-view prediction mode, determining the type of the reference vector of the current block as the disparity vector type.

3. The video decoding method of claim 1, wherein the determining of the type of the reference vector, which indicates the reference block used for decoding the current block according to the prediction mode of the current block, as one of the motion vector type and the disparity vector type comprises, when the prediction mode of the current block is an inter prediction mode, determining the type of the reference vector of the current block as the disparity vector type.

4. The video decoding method of claim 1, wherein the generating of the reference vector of the neighboring block further comprises:
   when the type of the reference vector used for decoding the current block is the motion vector type, generating a motion vector of the neighboring block; and
   generating the generated motion vector of the neighboring block as the reference vector of the neighboring block.

5. The video decoding method of claim 4, wherein the generating of the motion vector of the neighboring block further comprises:

generating a disparity vector of the neighboring block indicating a block having a different view from the neighboring block; and generating the motion vector of the neighboring block by using the disparity vector of the neighboring block.

6. The video decoding method of claim 5, wherein the generating of the motion vector of the neighboring block by using the disparity vector of the neighboring block comprises determining a motion vector of a block indicated by the disparity vector of the neighboring block as the motion vector of the neighboring block.

7. The video decoding method of claim 1, wherein the generating of the reference vector of the neighboring block comprises:

generating a depth value of the neighboring block by using a preset value;

generating a disparity vector of the neighboring block by using the depth value; and generating the reference vector of the neighboring block by using the disparity vector of the neighboring block.

8. The video decoding method of claim 7, wherein the preset value is 0, 128, or a settable maximum depth value.

9. The video decoding method of claim 1, wherein the generating of the reference vector of the neighboring block comprises:

determining a disparity vector of a block having a decoding order one ahead of a decoding order of the current block, a disparity vector of a recently decoded block, or a zero vector, as the disparity vector of the neighboring block; and generating the reference vector of the neighboring block by using the disparity vector of the neighboring block.

10. A video encoding method, which is performed by a video encoding apparatus, the video encoding method comprising:

determining a prediction mode of a current block;

determining a type of a reference vector, which indicates a reference block used for encoding the current block according to the prediction mode of the current block, as one of a motion vector type and a disparity vector type;

when a neighboring block adjacent to the current block does not have the determined type of the reference vector, generating a reference vector of the neighboring block having the determined type;

determining the reference vector of the current block indicating the reference block by using the generated reference vector of the neighboring block;

obtaining information of the reference block by using the reference vector of the current block;

encoding the current block by using the information of the reference block; and generating a bitstream of the encoded current block.

11. The video encoding method of claim 10, wherein the generating of the reference vector of the neighboring block comprises:

generating a depth value of the neighboring block by using a preset value;

generating a disparity vector of the neighboring block by using the depth value; and generating the reference vector of the neighboring block by using the disparity vector of the neighboring block.

12. The video encoding method of claim 10, wherein the generating of the reference vector of the neighboring block comprises:

determining a disparity vector of a block having an encoding order one ahead of an encoding order of the current block, a disparity vector of a recently decoded block, or a zero vector, as the disparity vector of the neighboring block; and generating the reference vector of the neighboring block by using the disparity vector of the neighboring block.

13. A non-transitory computer-readable recoding recording medium having recorded thereon a computer program for executing the decoding method of claim 1.

14. A video decoding apparatus comprising:

a bitstream obtainer configured to obtain a bitstream of an encoded image; and a video decoder configured to:

determine a prediction mode of a current block by using prediction mode information of the current block that is included in the bitstream;

determine a type of a reference vector, which indicates a reference block used for decoding the current block according to the prediction mode of the current block, as one of a motion vector type and a disparity vector type;

when a neighboring block adjacent to the current block does not have the determined type of the reference vector, generate the reference vector of the neighboring block having the determined type;

determine the reference vector of the current block indicating the reference block by using the generated reference vector of the neighboring block;

obtain the information of the reference block by using the reference vector of the current block; and decode the current block by using the information of the reference block.

15. A video encoding apparatus comprising:

a video encoder configured to:

determine a prediction mode of a current block;

determine a type of a reference vector, which indicates a reference block used for encoding the current block according to the prediction mode of the current block, as one of a motion vector type and a disparity vector type;

when a neighboring block adjacent to the current block does not have the determined type of the reference vector, generate a reference vector of the neighboring block having the determined type;

determine the reference vector of the current block indicating the reference block by using the generated reference vector of the neighboring block;

obtain information of the reference block by using the reference vector of the current block; and encode the current block by using the information of the reference block; and a bitstream generator configured to generate a bitstream of the encoded current block.

* * * * *